United States Patent [19]
Miyazawa et al.

[11] Patent Number: 5,227,903
[45] Date of Patent: Jul. 13, 1993

[54] LIQUID CRYSTAL DISPLAY DEVICE WITH AT LEAST ONE BIAXIAL RETARDATION FILM HAVING $N_x > N_z > N_y$

[75] Inventors: Yoshinaga Miyazawa, Fussa; Takashi Miyashita, Hachioji; Zenta Kikuchi, Hamura, all of Japan

[73] Assignee: Casio Computer Co., Ltd., Tokyo, Japan

[21] Appl. No.: 945,339

[22] Filed: Sep. 15, 1992

[30] Foreign Application Priority Data

| | | | |
|---|---|---|---|
| Sep. 20, 1991 | [JP] | Japan | 3-268612 |
| Feb. 18, 1992 | [JP] | Japan | 4-060901 |
| Feb. 18, 1992 | [JP] | Japan | 4-060902 |
| Jul. 20, 1992 | [JP] | Japan | 4-213234 |
| Jul. 23, 1992 | [JP] | Japan | 4-196657 |
| Jul. 23, 1992 | [JP] | Japan | 4-196658 |

[51] Int. Cl.⁵ ............................................. G02F 1/1335
[52] U.S. Cl. ............................................. 359/73
[58] Field of Search ............................................. 359/73

[56] References Cited

U.S. PATENT DOCUMENTS

| | | | |
|---|---|---|---|
| 5,016,988 | 5/1991 | Iimura et al. | 359/63 |
| 5,056,896 | 10/1991 | Iimura et al. | 359/63 |
| 5,093,739 | 3/1992 | Aida et al. | 359/73 |

FOREIGN PATENT DOCUMENTS

| | | | |
|---|---|---|---|
| 0367288 | 5/1990 | European Pat. Off. | 359/73 |
| 0-253230 | 10/1990 | Japan | 359/73 |
| 0-285324 | 11/1990 | Japan | 359/73 |
| 0-308128 | 12/1990 | Japan | 359/73 |

Primary Examiner—William L. Sikes
Assistant Examiner—Anita Pellman Gross
Attorney, Agent, or Firm—Frishauf, Holtz, Goodman & Woodward

[57] ABSTRACT

An STN liquid crystal display device includes a polarizer and an analyzer which are arranged to sandwich an STN liquid crystal cell, and two biaxial retardation plates arranged between a substrate of the liquid crystal cell and the analyzer. The polarizer is arranged such that its light-transmitting axis is inclined at about 140° with respect to an incident-side aligning treatment direction of the liquid crystal cell. The analyzer is arranged such that its light-transmitting axis is inclined at about 55° with respect to the incident-side aligning treatment direction. The biaxial retardation plate on the liquid crystal cell side is arranged such that its phase delay axis is inclined at about 40° with respect to the incident-side aligning treatment direction. The biaxial retardation plate on the analyzer side is arranged such that its phase delay axis is inclined at about 5° with respect to the incident-side aligning treatment direction. Each biaxial retardation plate has a refractive index $n_X$ in the extending direction of the retardation plate, a refractive index $n_Y$ in the direction perpendicular to the extending direction, and a refractive index $n_Z$ in the direction of thickness, which satisfy $n_Y < n_Z \leq n_Y + 0.3 \cdot \Delta n$ (for $\Delta n = n_X - n_Y$).

18 Claims, 74 Drawing Sheets

(COMPARATIVE EXAMPLE)

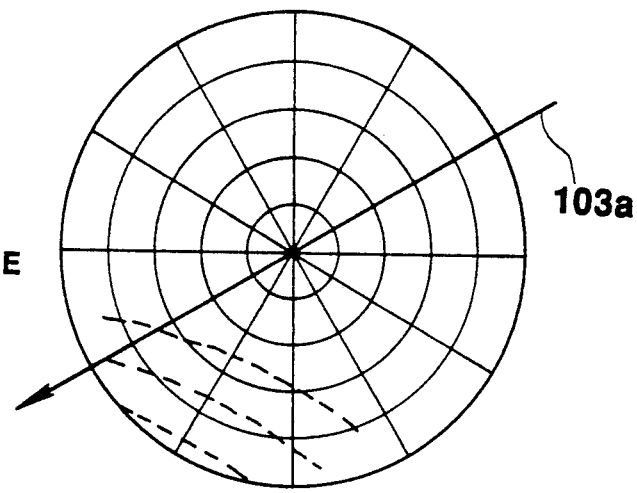
FIG.7A (COMPARATIVE EXAMPLE)
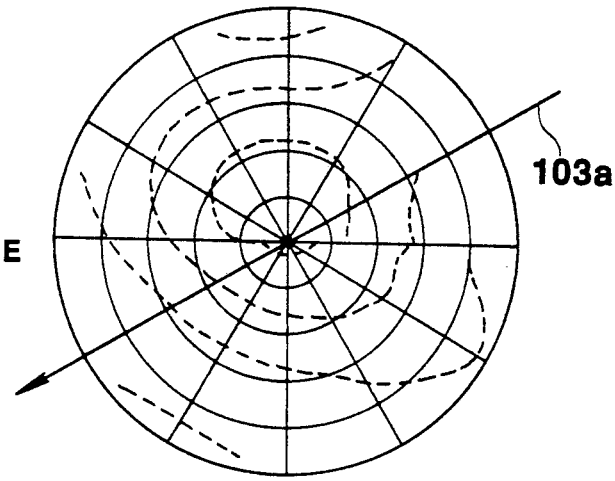
FIG.7B (COMPARATIVE EXAMPLE)
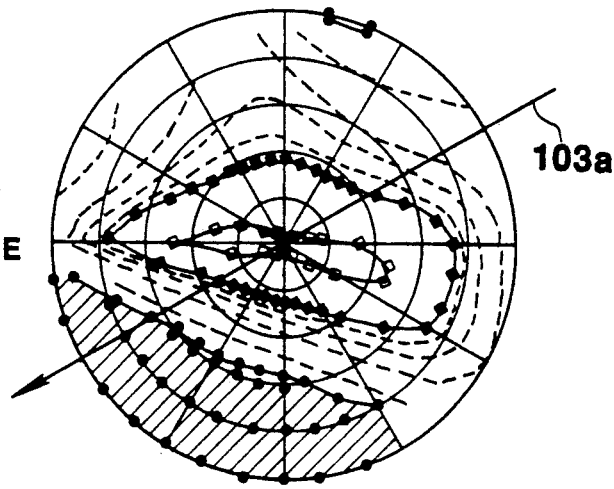
FIG.7C (COMPARATIVE EXAMPLE)

(COMPARATIVE EXAMPLE)

(COMPARATIVE EXAMPLE)

(COMPARATIVE EXAMPLE)

(COMPARATIVE EXAMPLE)

103a

103a

103a

103a

103a

103a

103a

103a

103a

103a

103a

103a

103a

103a

103a

103a

103a

103a

103a

103a (COMPARATIVE EXAMPLE)

103a (COMPARATIVE EXAMPLE)

103a (COMPARATIVE EXAMPLE)

103a

103a

103a

103a

103a

103a

103a

103a

103a

103a

103a

103a

103a

103a

103a

103a (COMPARATIVE EXAMPLE)

(COMPARATIVE EXAMPLE)

(COMPARATIVE EXAMPLE)

(COMPARATIVE EXAMPLE)

(COMPARATIVE EXAMPLE)

(COMPARATIVE EXAMPLE)

(COMPARATIVE EXAMPLE)

(COMPARATIVE EXAMPLE)

(COMPARATIVE EXAMPLE)

(COMPARATIVE EXAMPLE)

(COMPARATIVE EXAMPLE)

(COMPARATIVE EXAMPLE)

(COMPARATIVE EXAMPLE)

(COMPARATIVE EXAMPLE)

(COMPARATIVE EXAMPLE)

(COMPARATIVE EXAMPLE)

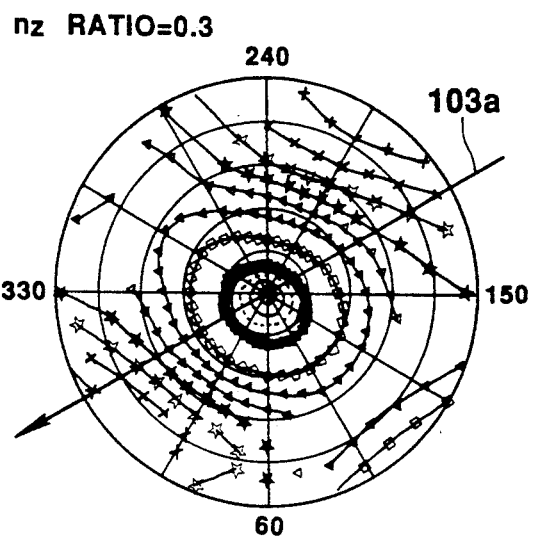
FIG.69A
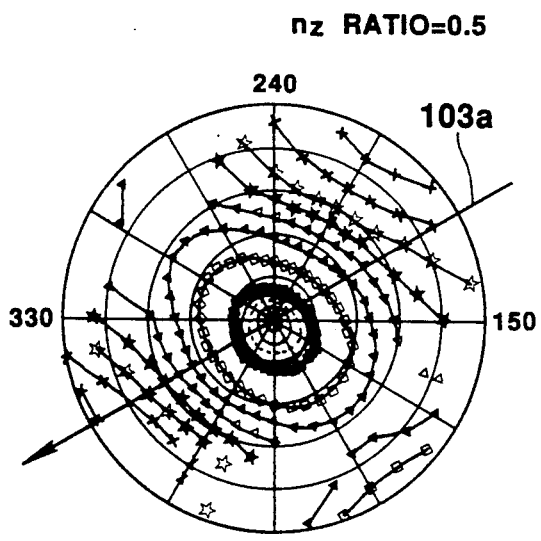
FIG.69B
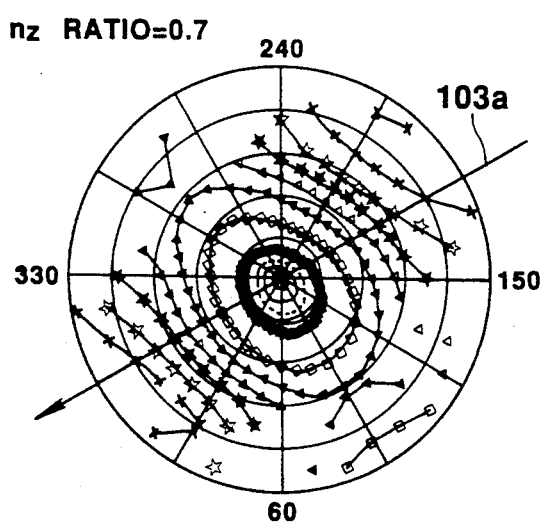
FIB.69C
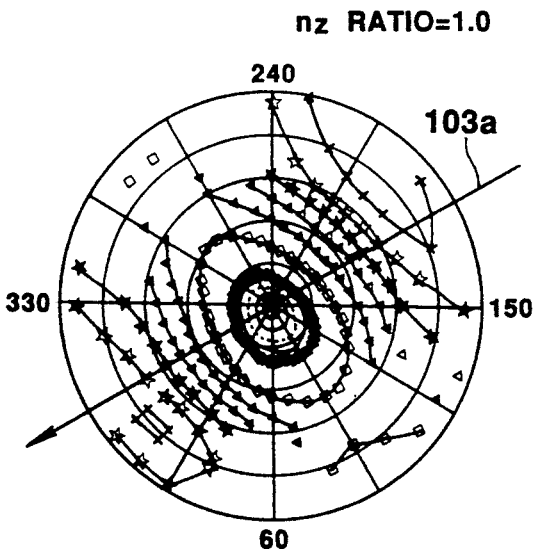
FIG.69D

LIQUID CRYSTAL DISPLAY DEVICE WITH AT LEAST ONE BIAXIAL RETARDATION FILM HAVING $N_x > N_z > N_y$

BACKGROUND OF THE INVENTION

1. Field of the Invention

The present invention relates to a super-twisted nematic (to be referred to as an STN hereinafter) simple matrix type liquid crystal display device.

2. Description of the Related Art

Liquid crystal display devices are widely used as display devices for office automation equipment. Such a display device is required to realize high-definition display and hence needs to have a large number of pixels and perform high time-division driving. In addition, with regard to display characteristics, the device is required to realize high contrast and a wide viewing angle. In order to meet these requirements, an STN simple matrix type liquid crystal display device, which is capable of high time-division driving and has relatively high contrast as compared with other types of liquid crystal display devices, is used as a display device for a personal computer or the like.

This STN simple matrix type liquid crystal display device comprises a pair of substrates arranged to oppose each other through a predetermined gap, electrodes arranged on the opposing inner surfaces of the pair of substrates to cross each other at right angles, a pair of aligning films respectively covering the electrode-formed surfaces of the substrate to align liquid crystal molecules in a predetermined direction, a liquid crystal material sealed between the aligning films, and a pair of polarizing plates arranged outside the pair of substrates to sandwich these components. The molecules of the liquid crystal material sealed between the pair of aligning films, which molecules are located near the respective aligning films, are aligned in the aligning treatment direction predetermined by the alignment forces of the aligning films, so that the molecules may be twisted at an angle of about 240° from one substrate to the other substrate.

When the liquid crystal display device is driven by a time-division driving scheme, and an electric field is applied between the opposing electrodes, the alignment of the liquid crystal molecules is changed. An optical change accompanying this alignment change is visualized by the pair of polarizing plates, thus performing desired display.

In the above-described liquid crystal display device, however, in order to realize high time-division driving, the twist angle of the liquid crystal molecular alignment is set to be large, while a birefringent effect is used to achieve high visual contrast. For this reason, coloration of display contents is caused. In addition, the viewing angle is not sufficiently wide, and a change in display color occurs depending on a visual angle.

In order to solve these problems, a two-layered STN liquid crystal display device has been proposed, in which a drive cell having drive electrodes formed on the above-mentioned pair of substrates and a compensation cell having liquid crystal molecules twisted in a direction opposite to the twist direction of the liquid crystal molecules of the drive cell are stacked to form a two-layered structure. In this two-layered STN liquid crystal display device, differences in phase difference caused by light components having different wavelengths in the drive cell can be corrected by the compensation cell to suppress coloration of the display contents, thus allowing display close to monochrome display.

In such a two-layered STN liquid crystal display device, since a liquid crystal cell similar to the drive cell is used as the compensation cell, the manufacturing process of the compensation cell is complicated, resulting in an increase in cost and size of the display device. In addition, coloration of the display contents is not sufficiently eliminated, and the conventional problems, i.e., an insufficient viewing angle and changes in display color with visual angle are left unsolved.

SUMMARY OF THE INVENTION

The present invention has been made in consideration of the above situation, and has as its object to provide a liquid crystal display device which is improved in terms of display coloration, the visual angle dependence of display colors, and the viewing angle (to be referred to as visual angle characteristics hereinafter). The term "visual angle dependency of display color" means the degree to which the display color changes with changes in the visual angle. The word "dependence" used hereinafter is of the same meaning.

In order to achieve the above object, according to the present invention, there is provided a liquid crystal display device comprising: a pair of substrates having opposing surfaces on which crossing electrodes and aligning films covering the electrodes are formed, the aligning films having undergone aligning treatment in a predetermined direction; a liquid crystal material existing between the aligning films and having molecules twisted at an angle falling within a range of 230° to 250° from one substrate to the other substrate of the pair of substrates; a pair of polarizing plates arranged outside the pair of substrates to sandwich the substrates; and a plurality of retardation plates including at least one biaxial retardation plate arranged between the polarizing plates and having a refractive index $n_X$ in an extending direction of the retardation plate, a refractive index $n_Y$ in a direction perpendicular to the extending direction, and a refractive index $n_Z$ in a direction of thickness, which satisfy $n_Y < n_Z < n_X$, the directions being perpendicular to each other.

With the above-described arrangement, differences in phase difference, caused when light components having different wavelengths are transmitted through the liquid crystal cell, can be almost completely corrected, and the problem of coloration of the display contents is solved. In addition, changes in display color with visual angle can be suppressed, and the viewing angle is increased.

In the above-described liquid crystal display device, the plurality of retardation plates may comprise two biaxial retardation plates or a combination of a biaxial retardation plate and a uniaxial retardation plate. When two retardation plates are to be used, these two retardation plates may be arranged between one of the pair of polarizing plates and one of the substrates which opposes it, or may be arranged to sandwich the pair of substrates.

When the biaxial retardation plates are to be arranged between one of the polarizing plates and one of the substrates, each retardation plate preferably comprises a biaxial retardation plate having refractive indexes $n_X$, $n_Y$, and $n_Z$ in three directions which satisfy $n_Y < n_Z \leq n_Y + 0.3 \cdot \Delta n$ where $\Delta n$ is a refractive index anisotropy defined by $n_X - n_Y$. In this case, a product $\Delta n_c \cdot d_c$ of a refractive index anisotropy $\Delta n_c$ and a liquid crystal layer thickness $d_c$ of the liquid crystal material preferably falls within the range of 800 to 910 nm, and a product $\Delta n \cdot d$ of a refractive index anisotropy $\Delta n$ and a thickness d of each of the biaxial retardation plates preferably falls within the range of 350 to 420 nm.

When the two biaxial retardation plates are to be arranged to sandwich the pair of substrates, each retardation plate preferably comprises a biaxial retardation plate having refractive indexes $n_X$, $n_Y$, and $n_Z$ in three directions which satisfy $n_Y + 0.3 \cdot \Delta n \leq n_Z \leq n_Y + 0.7 \cdot \Delta n$ where $\Delta n$ is a refractive index anisotropy defined by $n_X - n_Y$. Similarly, in this case, the product $\Delta n_c \cdot d_c$ of the refractive index anisotropy $\Delta n_c$ and the liquid crystal layer thickness $d_c$ of the liquid crystal material preferably falls within the range of 800 to 910 nm, and the product $\Delta n \cdot d$ of the refractive index anisotropy $\Delta n$ and the thickness d of each of the biaxial retardation plates preferably falls within the range of 340 to 450 nm.

When one biaxial retardation plate and one uniaxial retardation plate are to be arranged between one of the polarizing plates and one of the substrates, the biaxial retardation plate preferably comprises a biaxial retardation plate having refractive indexes $n_X$, $n_Y$, and $n_Z$ in three directions which satisfy $n_Y < n_Z < n_Y + 0.5 \cdot \Delta n$ where $\Delta n$ is a refractive index anisotropy defined by $n_X - n_Y$. In this case, the biaxial retardation plate may be arranged between the uniaxial retardation plate and one of the polarizing plates or between the uniaxial retardation plate and one of the substrates.

When one biaxial retardation plate and one uniaxial retardation plate are to be arranged to sandwich the pair of substrates, the biaxial retardation plate preferably comprises a biaxial retardation plate having refractive indexes $n_X$, $n_Y$, and $n_Z$ in three directions which satisfy $n_Y + 0.3 \cdot \Delta n \leq n_Z \leq n_Y + 0.7 \cdot \Delta n$ where $\Delta n$ is a refractive index anisotropy defined by $n_X - n_Y$. In this case, the biaxial retardation plate may be arranged between the polarizing plate and the substrate which are located on the side from which light emerges, or between the polarizing plate and the substrate which are located on the side on which light is incident.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 7A, 7B, and 7C are equi-brightness curve charts of dark and bright states and an equi-contrast curve chart in a comparative example of the first embodiment;

FIGS. 69A, 69B, 69C. and 69D are equi-ΔC* curve charts for the four different values of the $n_Z$ ratio in the liquid crystal display device of the sixth embodiment.

DETAILED DESCRIPTION OF THE PREFERRED EMBODIMENTS

Figure 1:
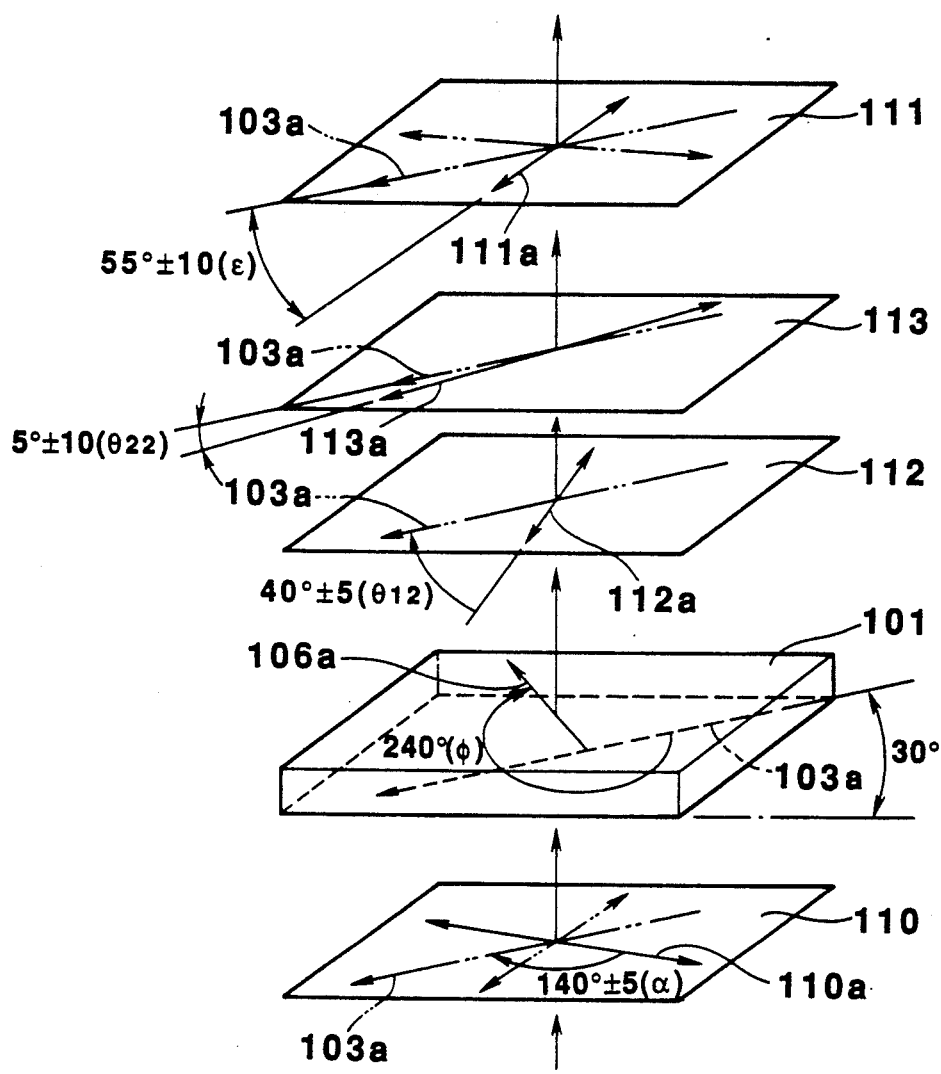
FIG. 1 is an exploded perspective view showing the schematic arrangement of a first embodiment of the present invention.

Embodiments of the present invention will be described in detail below with reference to FIGS. 1 to 69D.

First Embodiment

Figure 2:
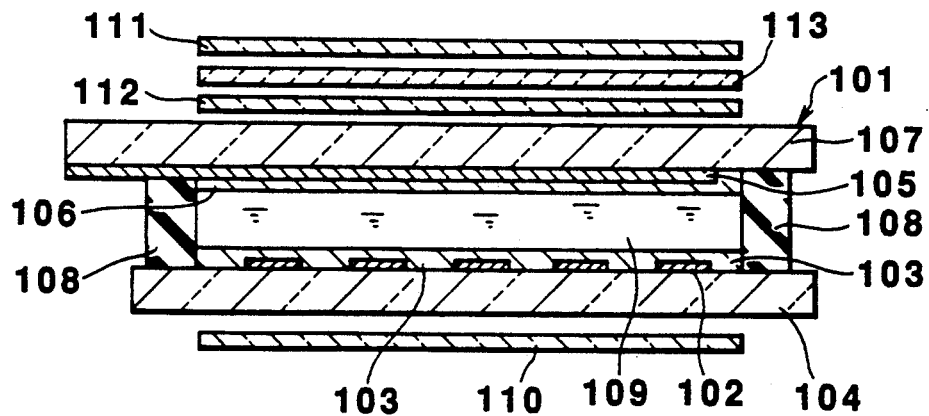
FIG. 2 is a sectional view showing the first embodiment of the present invention.

In the first embodiment, two biaxial retardation plates are arranged on one side of a liquid crystal cell. FIGS. 1 and 2 are an exploded perspective view and a sectional view, respectively, of the first embodiment. Referring to FIGS. 1 and 2, a liquid crystal cell 101 comprises a lower substrate 104 on which one set of electrodes 102 and an aligning film 103 covering the electrodes 102 are formed, an upper substrate 107 on which the other set of electrodes 105 and an aligning film 106 covering the electrodes 105 are formed, a seal member 108 for bonding the upper and lower substrates 104 and 107 to each other through a predetermined gap, and a liquid crystal material 109 sealed in a region enclosed with the upper and lower substrates 104 and 107 and the seal member 108 and having a dielectric constant ratio $\Delta\epsilon/\epsilon\perp=1.93$, an elastic constant ratio $K33/K11=1.83$, and a ratio d/p of a gap d to a natural pitch p=0.5.

Light is incident on this liquid crystal cell 101 from below in FIGS. 1 and 2 (as shown by arrows in FIG. 2). Hence, the lower substrate 104 will be referred to as the incident-side substrate; and the upper substrate 107, the exit-side substrate.

A polarizer 110 constituted by a linearly polarizing plate is arranged outside the incident-side substrate 104 of the liquid crystal cell 101, whereas an analyzer 111 constituted by a linearly polarizing plate is arranged above the exit-side substrate 107. First and second retardation plates 112 and 113 optically having biaxial properties (to be referred to as biaxial retardation plates hereinafter) are arranged between the exit-side substrate 107 of the liquid crystal cell 101 and the analyzer 111 in the order named.

The aligning films 103 and 106 respectively formed on the opposing surfaces of the incident-side substrate 104 and the exit-side substrate 107 have undergone aligning treatment such as rubbing. More specifically, aligning treatment is performed with respect to the aligning film 103 on the incident-side substrate 104 in a direction 103a inclined at about 30° from the upper right to the lower left with respect to the longitudinal direction of the liquid crystal cell 101 extending along the horizontal direction, when viewed from the front surface side (exit side) of the liquid crystal cell 101, as shown in FIG. 2.

Aligning treatment is performed with respect to the aligning film 106 on the exit-side substrate 107 opposite to the incident-side substrate 104 in a direction 106a rotated in a clockwise direction (to be referred to as a negative or − rotational direction hereinafter) through 60° with respect to the aligning treatment direction 103a of the incident-side substrate 104 (to be referred to as an incident-side aligning treatment direction hereinafter). With such aligning treatment, the molecules of the liquid crystal material are aligned at a pretilt angle of about 8° and are twisted at 240° ($\phi$) in the negative rotational direction from the incident-side substrate 104 to the exit-side substrate 107. A product $\Delta n_c \cdot d_c$ of a gap $d_c$ and a refractive index anisotropy $\Delta n_c$ of the liquid crystal cell 101 preferably falls within the range of 750 to 950 nm and is set to be 864 nm (measurement wavelength: 589 nm) in this embodiment.

The polarizer 110 is arranged such that its light-transmitting axis 110a is rotated through 140°±5 ($\alpha$) in a counterclockwise direction (to be referred to as a positive or + rotational direction hereinafter) with respect to the incident-side aligning treatment direction 103a. The analyzer 111 is arranged such that its light-transmitting axis 111a crosses the incident-side aligning treatment direction 103a at 55°±10 ($\epsilon$). That is, the light-transmitting axis 111a of the analyzer 111 is inclined at −85° with respect to the transmission axis 110a of the polarizer 110.

Each of the first and second biaxial retardation plates 112 and 113 is composed of polycarbonate and has a retardation delay axis or show axis in the extending direction. Each retardation plate has refractive indexes in three orthogonal directions, i.e., a refractive index $n_X$ in the extending direction, a refractive index $n_Y$ in the direction perpendicular to the extending direction, and a refractive index $n_Z$ in the direction of thickness. These refractive indexes in the three directions satisfy a relation $n_Y < n_Z < n_X$. The range of a product $\Delta n \cdot d$ of a refractive index anisotropy $\Delta n$ ($= n_X - n_Y$) and a thickness d of each of the biaxial retardation plates 112 and 113 is optimally set in accordance with the product $\Delta n_c \cdot d_c$ of the liquid crystal cell 101. The first biaxial retardation plate 112 is arranged such that a phase delay axis 112a in the extending direction is set at 40°±5 ($\theta_{12}$) with respect to the incident-side aligning treatment direction 103a. The second biaxial retardation plate 113 is arranged such that a phase delay axis 113a is set at 5°±10 ($\theta_{22}$) with respect to the incident-side aligning treatment direction 103a.

In this embodiment, the two biaxial retardation plates 112 and 113, each having refractive indexes in the three directions which satisfy the relation $n_Y < n_Z < n_X$, are arranged between the liquid crystal cell 101 and the analyzer 111 so that differences in phase difference, caused when light components having different wavelengths are transmitted through the liquid crystal cell 101, can be almost completely corrected by the two biaxial retardation plates 112 and 113, thus preventing display coloration. In addition, changes in display color and contrast with changes in visual angle can be suppressed to broaden the viewing angle and improve the visual angle characteristics.

Figure 3:
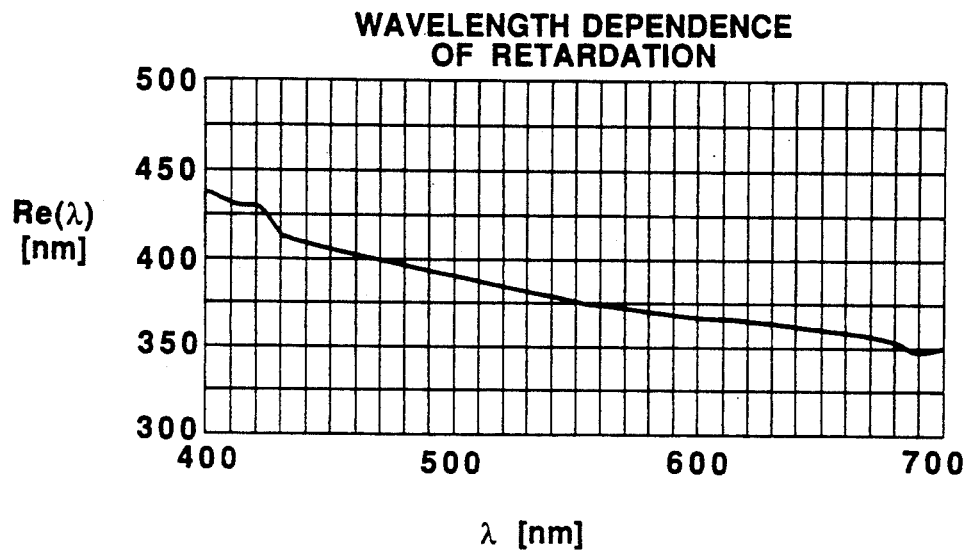
FIG. 3 is a graph showing the wavelength dependence of the retardation of a biaxial retardation plate used in the first embodiment.

In the STN liquid crystal display device having such an arrangement, when each of the first and second biaxial retardation plates 112 and 113 has a retardation Re = 368.8 nm and a thickness d = 64 μm, the refractive indexes $n_X$, $n_Y$, and $n_Z$ are 1.5857, 1.5802, and 1.5836, respectively, and the ratio of $(n_Z - n_Y)$ to $(n_X - n_Z)$ is 34:21, i.e., nearly 6:4. Since polycarbonate as the material for the biaxial retardation plates 112 and 113 has a benzene ring in its structural formula, each retardation plate exhibits the wavelength dependence of the refractive index anisotropy $\Delta n$, as shown in FIG. 3.

Figure 4:
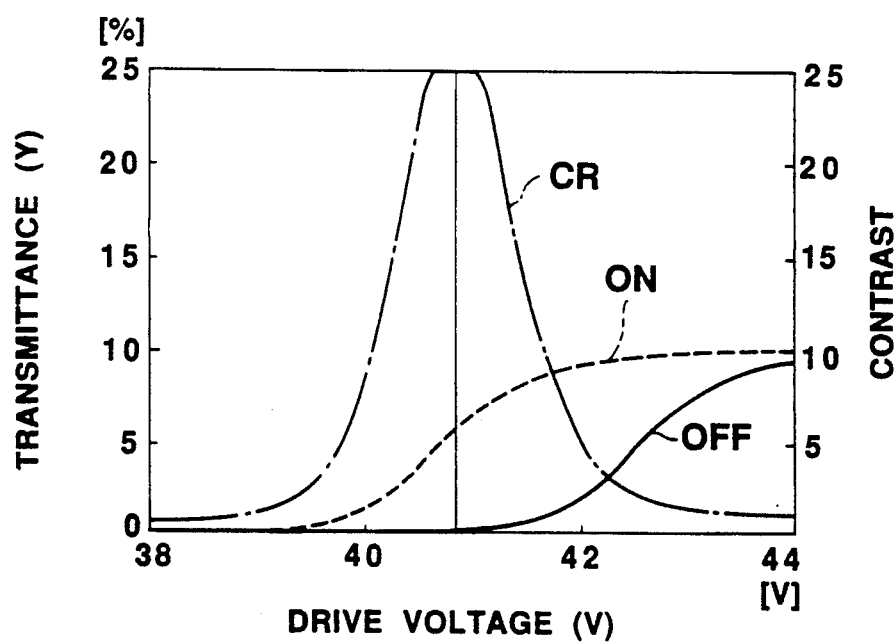
FIG. 4 is a graph showing the relationship between the transmittance and the applied voltage in a liquid crystal display device of the first embodiment.
Figure 5:
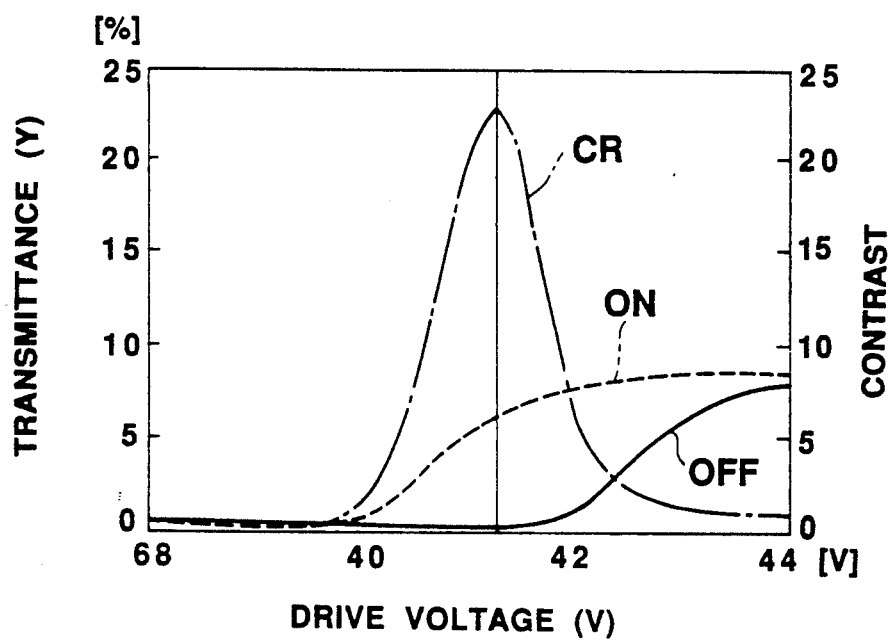
FIG. 5 is a graph showing the relationship between the transmittance and the applied voltage in a comparative example of the first embodiment.

FIG. 4 shows Y-V characteristics representing the relationship between the drive voltage (V) and the transmittance (Y), obtained when time-division driving of the liquid crystal display device using the first and second biaxial retardation plates 112 and 113 is performed at a 1/480 duty and a 1/15 bias, and the contrast. Referring to FIG. 4, a solid curve OFF represents a transmission curve obtained upon application of an OFF waveform voltage; a broken curve ON, a transmission curve obtained upon application of an ON waveform voltage; and a one-dot chain curve CR, contrast. FIG. 5 shows similar Y-V characteristic curves in an STN liquid crystal display device, as a comparative example, which includes two uniaxial retardation plates. As is apparent from FIGS. 4 and 5, in the liquid crystal display device of this embodiment, the contrast CR is 27 and a transmittance YS (obtained upon application of a selection voltage) is 5.8, that is, high contrast can be achieved, while bright display is realized, and the viewing angle is increased as compared with the liquid crystal display device as the comparative example.

Figure 6A:
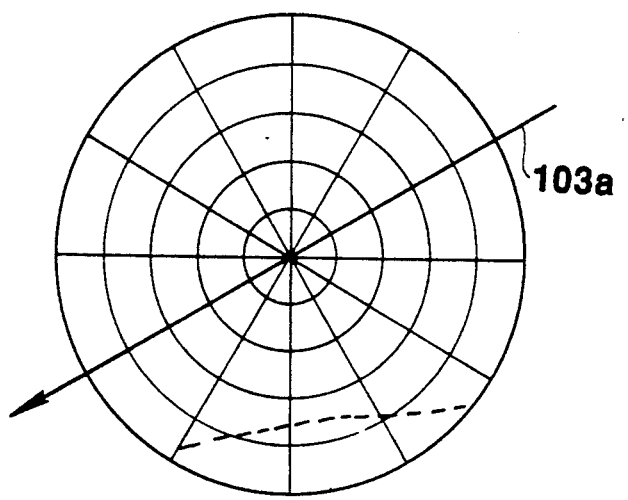
FIGS. 6A, 6B, and 6C are equi-brightness curve charts of dark and bright states and an equi-contrast curve chart in the liquid crystal display device of the first embodiment.
Figure 6B:
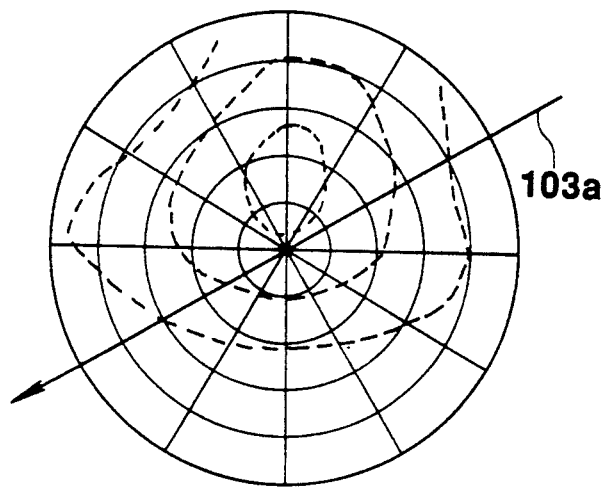
Figure 6C:
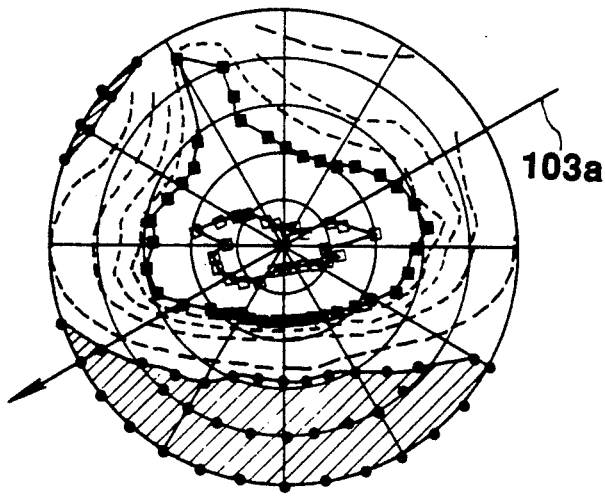

FIGS. 6A to 6C respectively show equi-brightness curves and equi-contrast curves based on measurement on the liquid crystal display device of the embodiment. Equi-brightness curves and equi-contrast curves in the comparative example are shown in FIGS. 7A to 7C. FIGS. 6A and 7A show the equi-brightness curves in a dark state. FIGS. 6B and 7B show the equi-brightness curves in a bright state. FIGS. 6C and 7C show the equi-contrast curves. In each of the charts shown in FIGS. 6A to 7C, the concentric circles respectively represent, from the innermost circle, visual angles of 10°, 20°, 30°, 40°, and 50° with respect to the normal direction of the display surface of a corresponding liquid crystal display device, and a radiating line indicates an angle representing the azimuth (to be referred to as an azimuth angle hereinafter) of the display surface with reference to the aligning treatment direction 103a on the incident-side substrate of the liquid crystal cell 101. In addition, each black circle (●) represents that the contrast is less than 1, i.e., brightness/darkness inversion occurs, each black square (■) represents that the contrast is 10, and each white square (□) represents that the contrast is 20. As is apparent from these charts, in the apparatus of the embodiment, the inversion region indicated by the hatched portion in FIG. 6C is slightly reduced, and the region in which the contrast CR is 10 or more is broadened, as compared with the STN liquid crystal display device as the comparative example shown in FIGS. 7A to 7C. A characteristic feature based on the biaxial retardation plates 112 and 113 is that a wide dark region is wide in a Y-V curve obtained upon application of a non-selection voltage (Vns), i.e., the amount of leakage light is small.

Figure 8A:
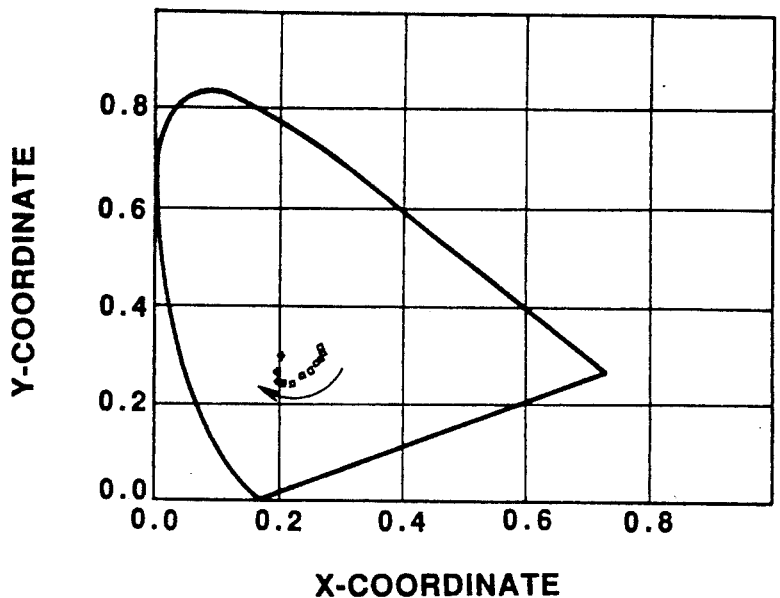
FIGS. 8A and 8B are a CIE chromaticity diagram representing changes in hue with respect to visual angles in a rightward direction and a CIE chromaticity diagram representing changes in hue with respect to visual angles in a leftward direction in the liquid crystal display device of the first embodiment.
Figure 8B:
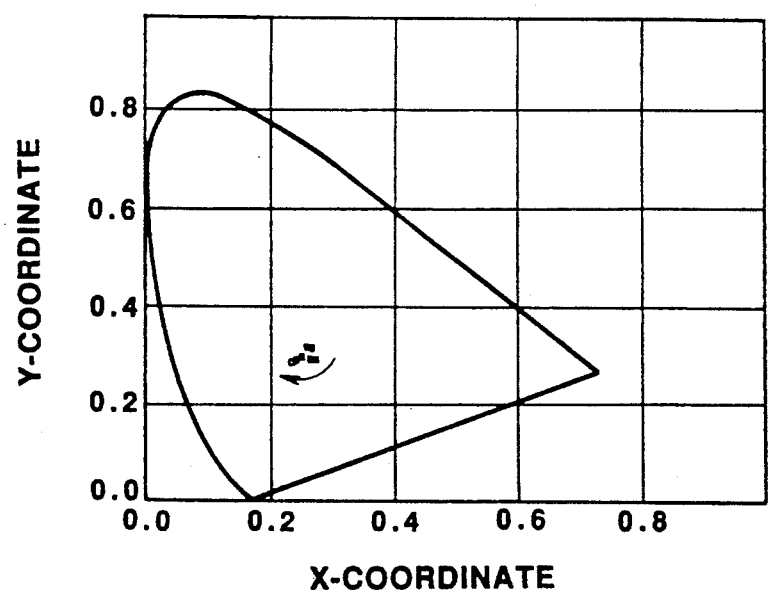
Figure 9A:
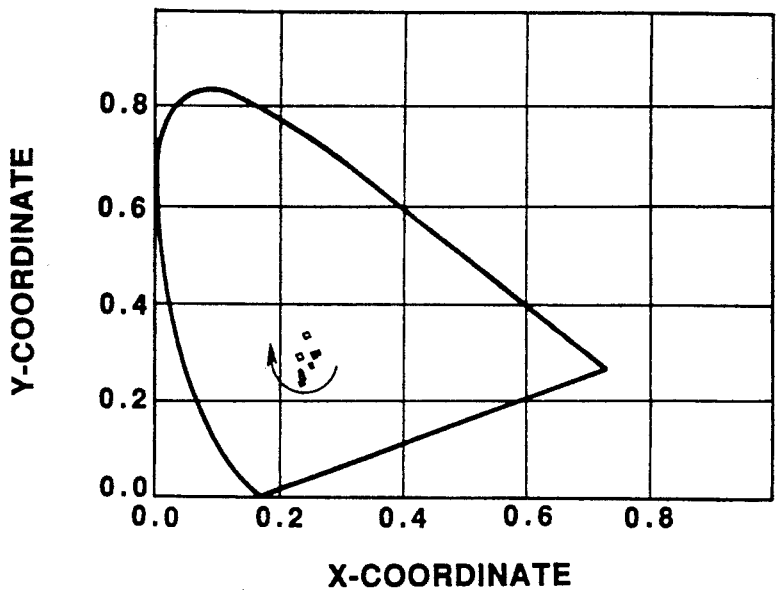
FIGS. 9A and 9B are a CIE chromaticity diagram representing changes in hue with respect to visual angles in a downward direction and a CIE chromaticity diagram representing changes in hue with respect to visual angles in an upward direction in the liquid crystal display device of the first embodiment.
Figure 9B:
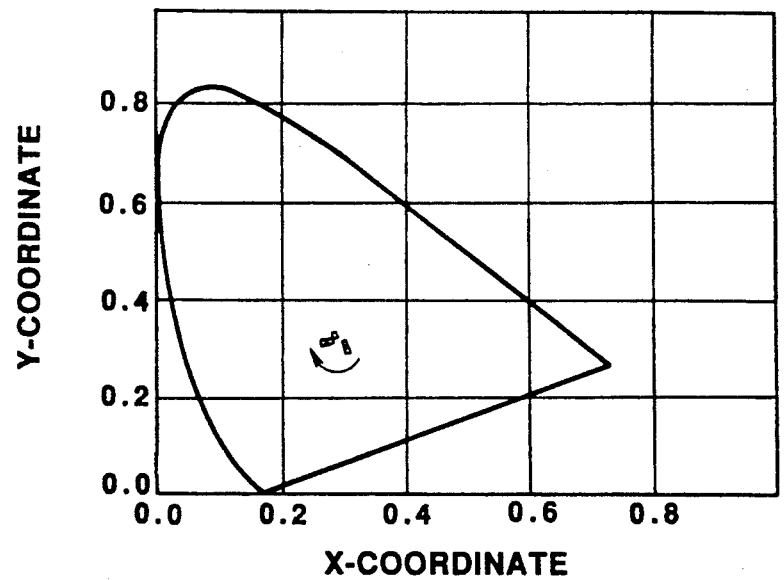
Figure 10:
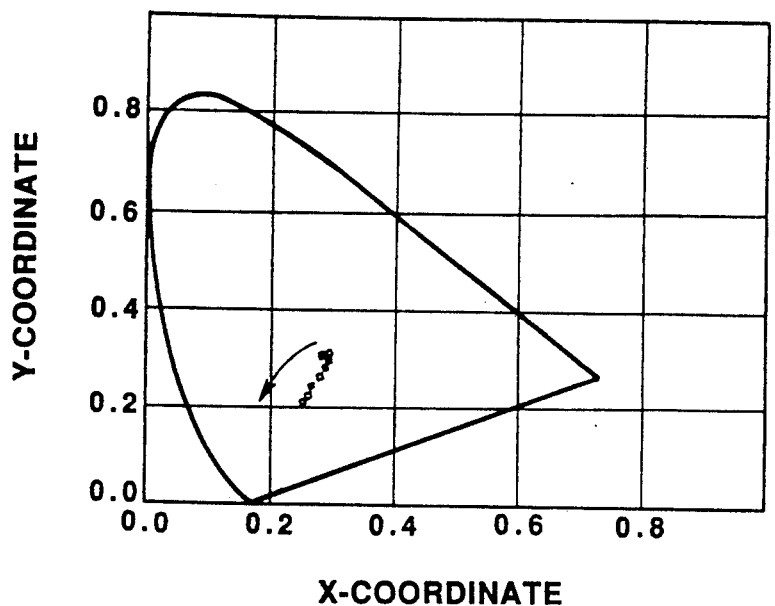
FIGS. 10A and 10B are a CIE chromaticity diagram representing changes in hue with respect to visual angles in a rightward direction and a CIE chromaticity diagram representing changes in hue with respect to visual angles in a leftward direction in the comparative example of the first embodiment.
Figure 10:
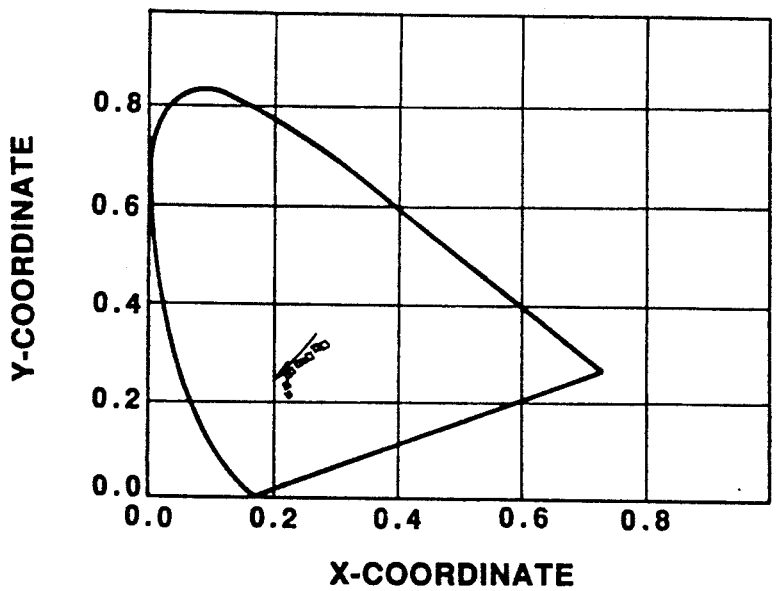
Figure 11A:
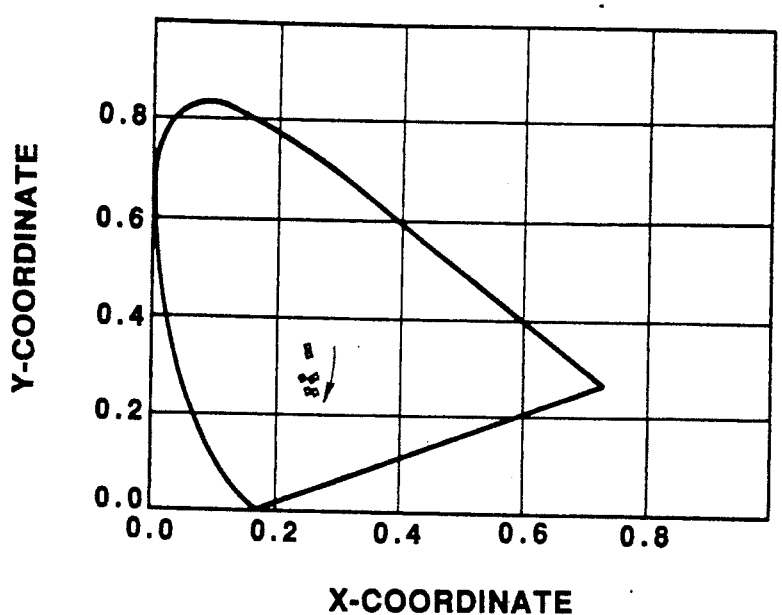
FIGS. 11A and 11B are a CIE chromaticity diagram representing changes in hue with respect to visual angles in a downward direction and a CIE chromaticity diagram representing changes in hue with respect to visual angles in an upward direction in the comparative example of the first embodiment.
Figure 11B:
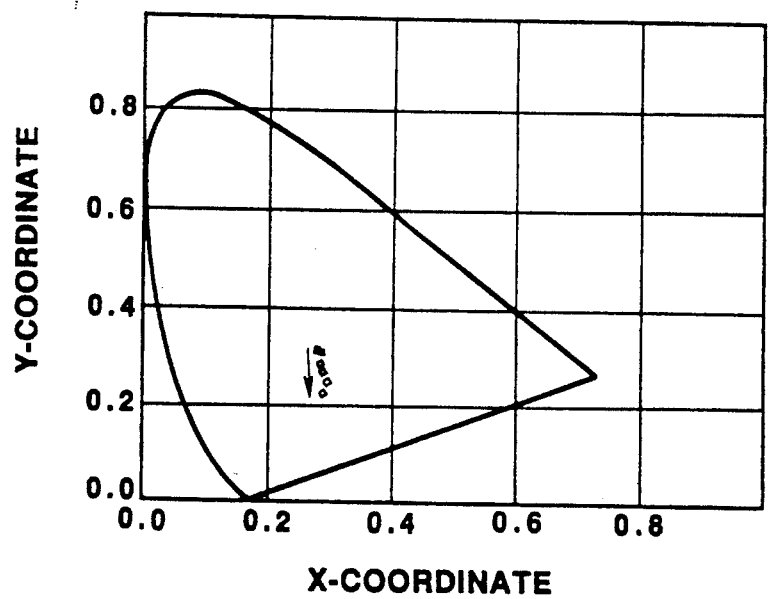

FIGS. 8A to 9B are CIE chromaticity diagrams representing changes in hue of light when the visual angle is sequentially changed every 10° up to 50°, rightward, leftward, downward, and upward, respectively, with respect to the normal direction of the substrate in the liquid crystal display device of the embodiment. In each diagram, the direction of hue change is indicated by the arrow. FIGS. 10A to 11B are CIE chromaticity diagrams respectively showing similar hue changes in the comparative example. FIGS. 8A and 10A show the changes in hue of transmitted light when the visual angle is changed to the right of each liquid crystal display device. FIGS. 8B and 10B show the changes in hue of transmitted light when the visual angle is changed to the left. FIGS. 9A and 11A show the changes in hue of transmitted light when the visual angle is changed downward. FIGS. 9B and 11B show the changes in hue of transmitted light when the visual angle is changed upward. As is apparent from these diagrams, according to the liquid crystal display device of the embodiment, the hue of transmitted light hardly varies with changes in visual angle in the respective directions of the liquid crystal display device. That is, in comparison with the comparative example, changes in hue are reduced, and changes in display color with observation direction are small. This tendency is conspicuous especially when the visual angle is changed leftward and upward.

The optimal range of the refractive indexes of the biaxial retardation plates 112 and 113 will be described below, in a case wherein the product $\Delta n_c \cdot d_c$ of the liquid crystal cell 101 is set to be about 860 nm, and the product $\Delta n \cdot d$ of each of the biaxial retardation plates 112 and 113 is set to be about 350 nm in the liquid crystal display device described above. Note that the $n_Z$ ratio represented by the following equation (1) is used as an index indicating the relationship between the refractive indexes $n_X$, $n_Y$, and $n_Z$ in the three directions.

$$n_Z \text{ ratio} = (n_X - n_Y)/(n_Z - n_Y) \tag{1}$$

Figure 12A:
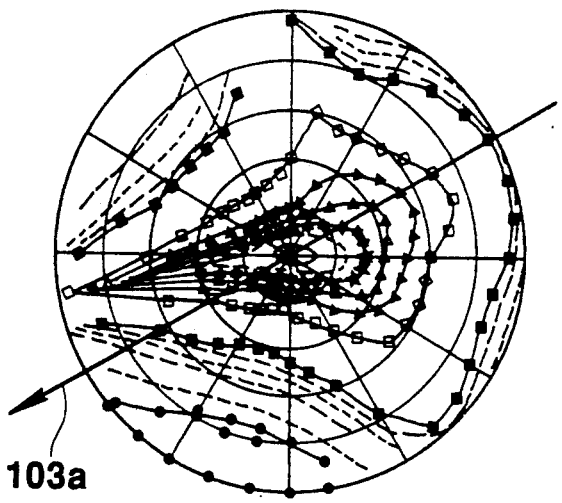
FIGS. 12A, 12B, 12C, 12D, and 12E are equi-contrast curve charts, respectively, for five different values of the $n_Z$ ratio in the liquid crystal display device of the first embodiment.
Figure 12B:
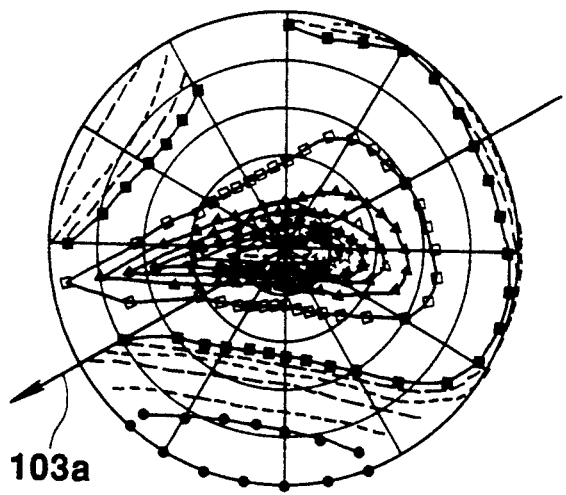
Figure 12C:
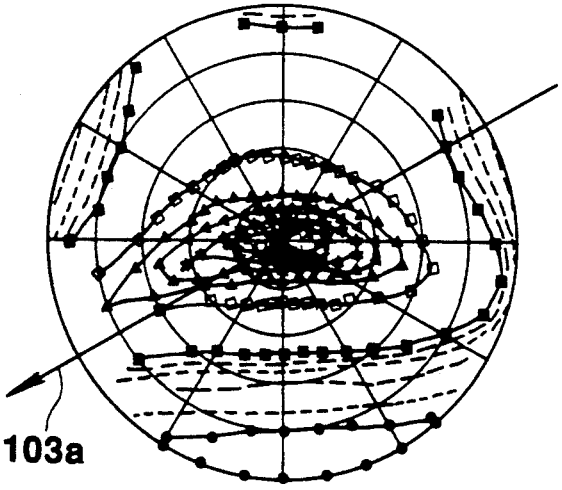
Figure 12D:
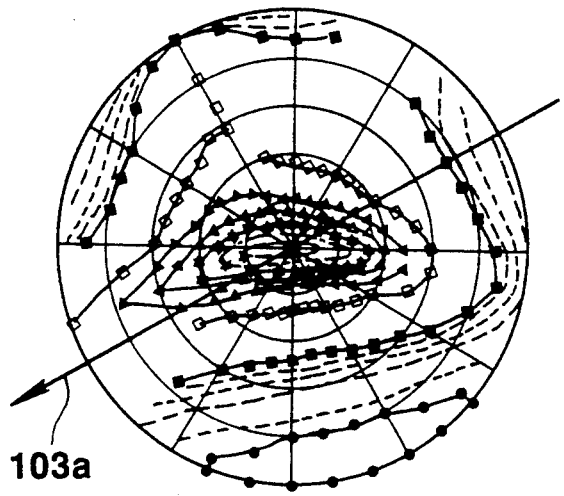
Figure 12E:
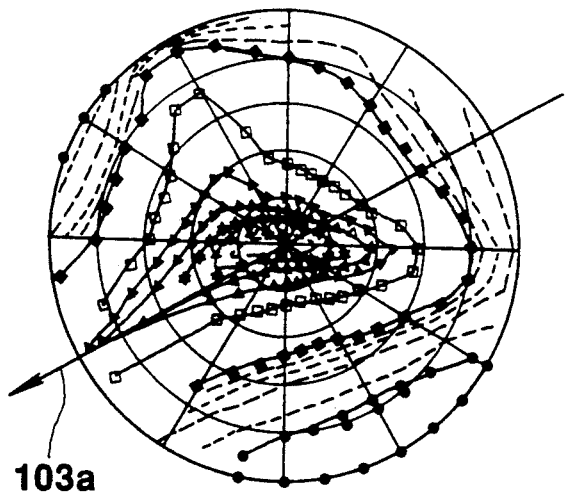

FIGS. 12A to 12E show the dependence of equi-contrast curves on the $n_Z$ ratio in the liquid crystal display device. FIG. 12A is an equi-contrast curve chart in which the $n_Z$ ratio is set to be $-0.3$. FIG. 12B is an equi-contrast curve chart in which the $n_Z$ ratio is set to be 0.0. FIG. 12C is an equi-contrast curve chart in which the $n_Z$ ratio is set to be 0.3. FIG. 12D is an equi-contrast curve chart in which the $n_Z$ ratio is set to be 0.5. FIG. 12E is an equi-contrast curve chart in which the $n_Z$ ratio is set to be 0.7. In each chart, the concentric circles respectively represent, from the innermost circle, visual angles of 10°, 20°, 30°, 40°, and 50° with respect to the normal direction of the display surface of the liquid crystal display device, and each radiating line indicates the azimuth angle of the display surface. In addition, each black circle (●) represents that the contrast is less than 1, i.e., brightness/darkness inversion occurs. Similarly, each black square (■) represents that the contrast is 10; each white square (□), 50; each black triangle (▲), 100; and each white triangle (△), 150. With regard to the contrast characteristics, high contrast can be uniformly obtained regardless of visual angles. It is considered that better contrast characteristics are obtained in a smaller inversion region on the circumferences corresponding to visual angles of 40° and 50°. According to FIGS. 12A to 12E, as the value $n_Z$ approaches the value $n_Y$, a wider high-contrast region is obtained, and the peak of the viewing angle characteristics appears.

FIGS. 13A to 13E, 14A to 14E, and 15A to 15E respectively show the dependence of the curves based on color differences $\Delta E^*$, brightness index differences $\Delta L^*$, and chroma differences $\Delta C^*$ on the $n_Z$ ratio. The definitions of the color difference $\Delta E^*$, the brightness index difference $\Delta L^*$, and the chroma difference $\Delta C^*$ will be described below. These physical amounts are defined in a CIE 1976 (L*, u*, v*) colorimetric space. The following are conversion formulae for converting values from a normal (X, Y, Z) colorimetric space to the CIE 1976 (L*, u*, v*) colorimetric space:

$\Delta E_{uv}^* = \sqrt{(\Delta L^*)^2 + (\Delta C^*)^2}$ : color difference $\Delta L^* = \text{abs}(L2^* - L1^*)$: brightness index difference $\Delta C^* = \sqrt{(\Delta u^*)^2 + (\Delta v^*)^2}$ : chrome difference $\Delta u^* = \text{abs}(u_2^* - u_1^*)$: chromaticness index difference
$\Delta v^* = \text{abs}(v_2^* - v_1^*)$: chromaticness index difference
$L_i^* = 116 \cdot (Y_i/Y_o)^{\frac{1}{3}} - 16$
(If, however, $i = 0, 1, 2$, and $(Y_i/Y_o)$ is 0.008856 or less, $L_i^* = 903.29 \cdot (Y_i/Y_o)$)
$u_i^* = 13 \cdot L_i^*(u_i' - u_o')$
$v_i^* = 13 \cdot L_i^*(v_i' - v_o')$
$u_i' = 4 \cdot X_i/(X_i + 15 \cdot Y_i + 3 \cdot Z_i)$
$v_i' = 9 \cdot Y_i/(X_i + 15 \cdot Y_i + 3 \cdot Z_i)$
(where $X_i$, $Y_i$, and $Z_i$ are values in the XYZ colorimetric system)

Figure 13A:
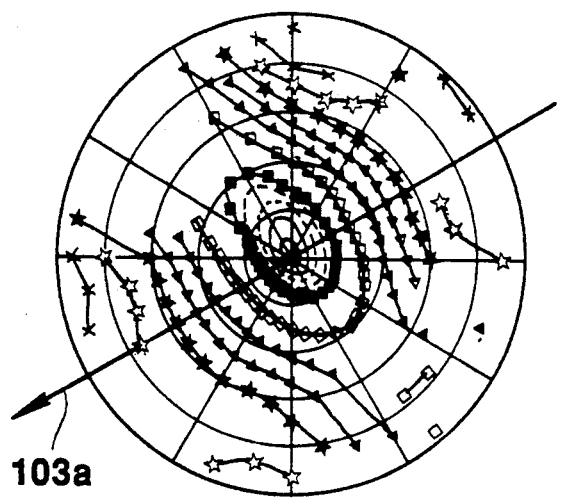
FIGS. 13A, 13B, 13C, 13D, and 13E are equi-$\Delta E^*$ curve charts, respectively, for the five different values of the $n_Z$ ratio in the liquid crystal display device of the first embodiment.
Figure 13B:
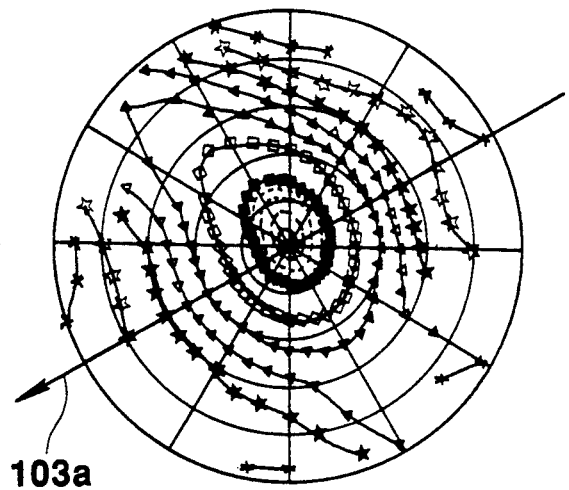
Figure 13C:
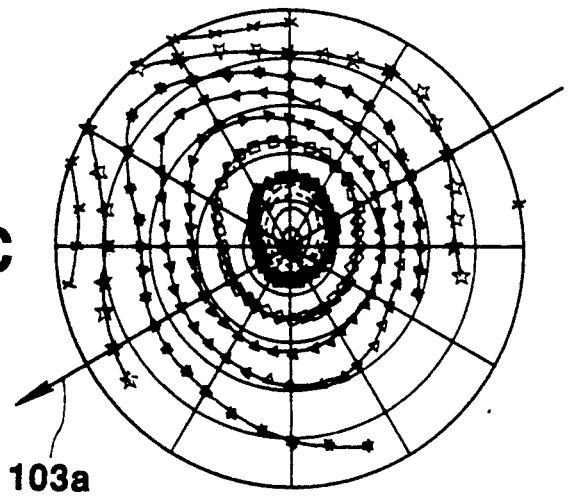
Figure 13D:
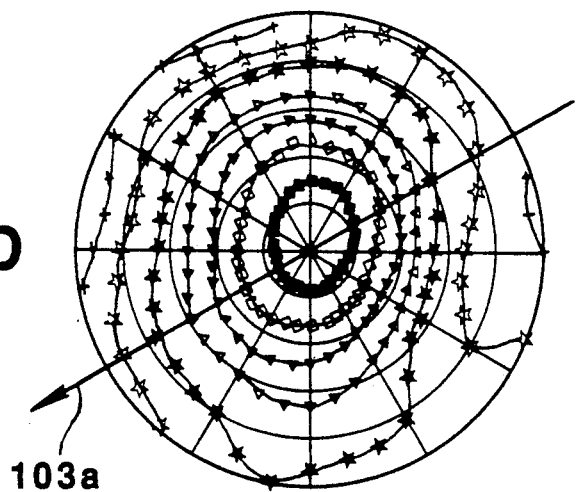
Figure 13E:
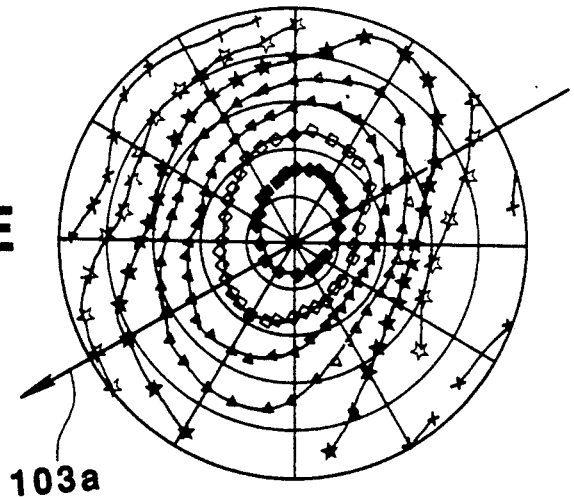
Figure 14A:
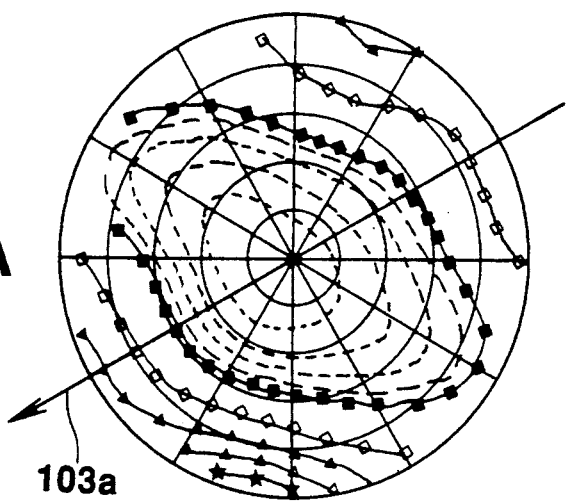
FIGS. 14A, 14B, 14C, 14D, and 14E are equi-$\Delta L^*$ curve charts, respectively, for the five different values of the $n_Z$ ratio in the liquid crystal display device of the first embodiment.
Figure 14B:
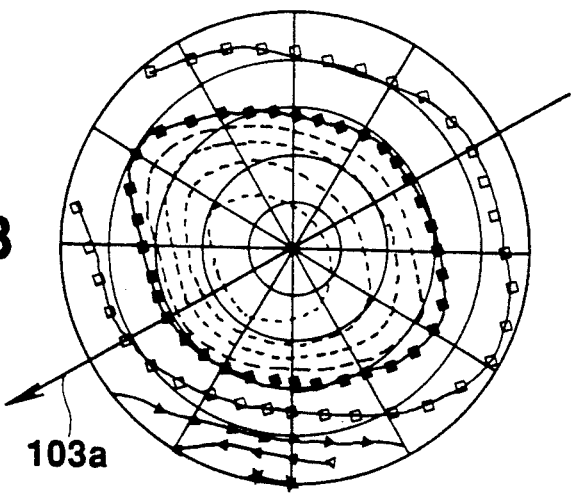
Figure 14C:
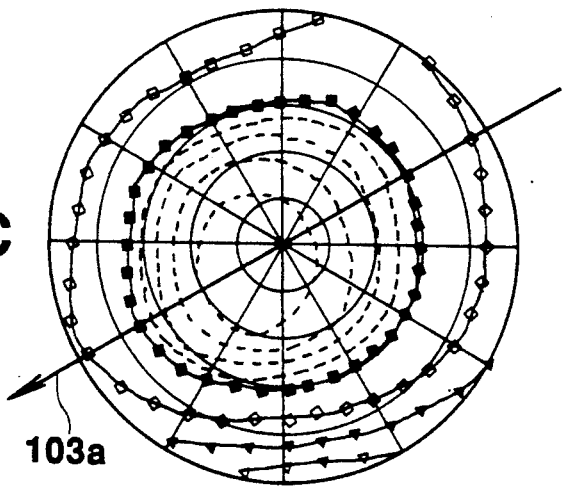
Figure 14D:
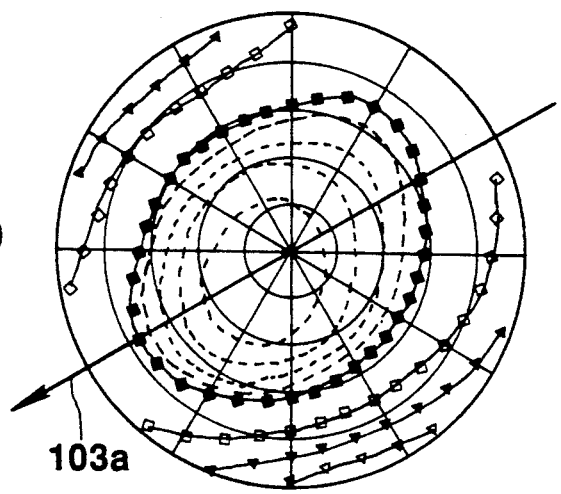
Figure 14E:
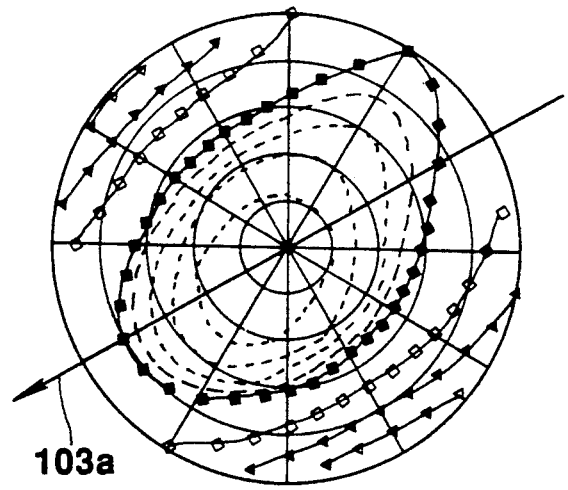
Figure 15A:
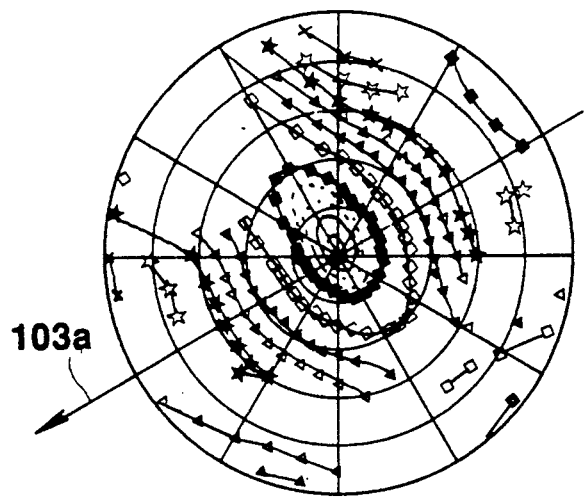
FIGS. 15A, 15B, 15C, 15D, and 15E are equi-$\Delta C^*$ curve charts, respectively, for the five different value of the $n_Z$ ratio in the liquid crystal display device of the first embodiment.
Figure 15B:
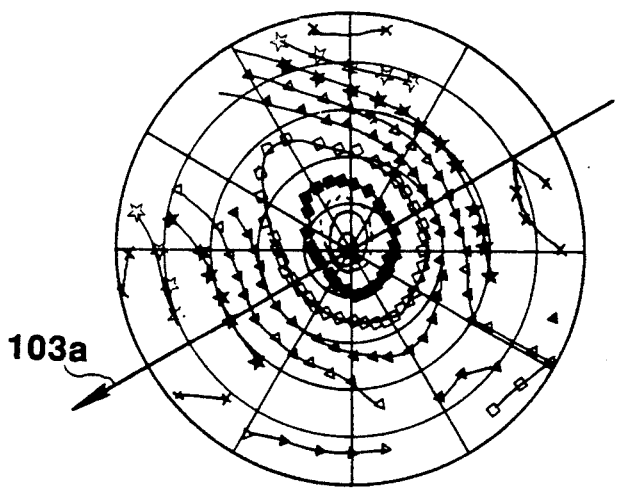
Figure 15C:
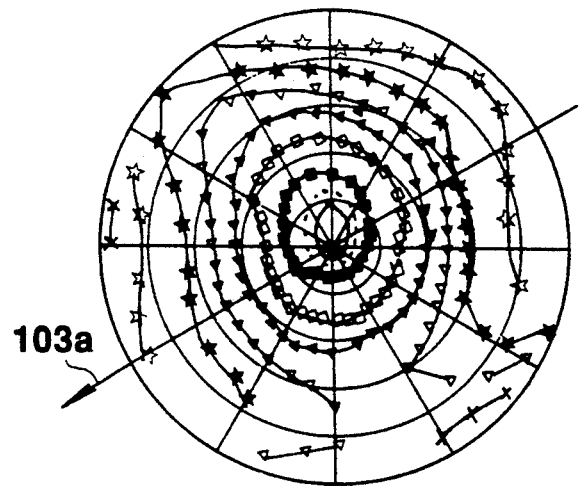
Figure 15D:
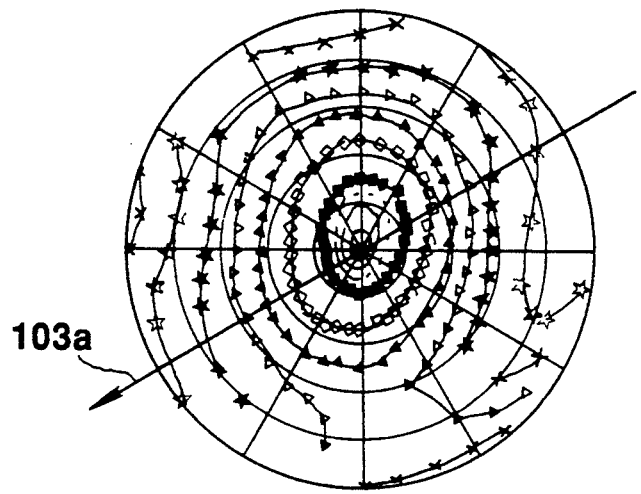
Figure 15E:
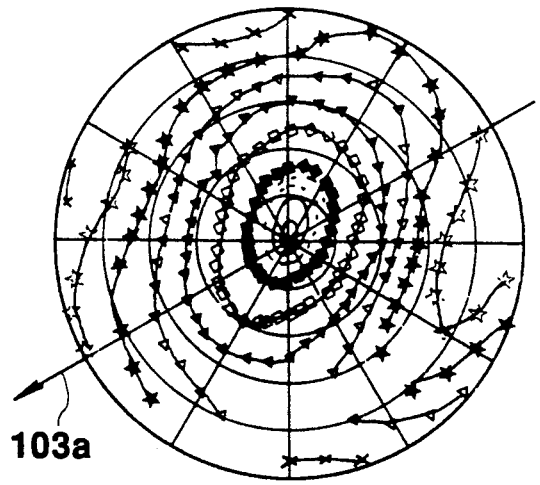

FIGS. 13A to 13E show the dependence of equi-$\Delta E^*$ curves on the $n_Z$ ratio. FIG. 13A is an equi-$\Delta E^*$ curve chart for the $n_Z$ ratio $= -0.3$; FIG. 13B, an equi-$\Delta E^*$ curve chart for the $n_Z$ ratio$=0.0$; FIG. 13C, an equi-$\Delta E^*$ curve chart for the $n_Z$ ratio$=0.3$; FIG. 13D, an equi-$\Delta E^*$ curve chart for the $n_Z$ ratio$=0.5$; and FIG. 13E, an equi-$\Delta E^*$ curve chart for the $n_Z$ ratio$=0.7$. FIGS. 14A to 14E show the dependence of equi-$\Delta L^*$ curves on the $n_Z$ ratio. FIG. 14A is an equi-$\Delta L^*$ curve chart for the $n_Z$ ratio $= -0.3$; FIG. 14B, an equi-$\Delta L^*$ curve chart for the $n_Z$ ratio$=0.0$; FIG. 14C, an equi-$\Delta L^*$ curve chart for the $n_Z$ ratio$=0.3$; FIG. 14D, an equi-$\Delta L^*$ curve chart for the $n_Z$ ratio$=0.5$; and FIG. 14E, an equi-$\Delta L^*$ curve chart for the $n_Z$ ratio$=0.7$. FIGS. 15A to 15E show the dependence of equi-$\Delta C^*$ curves on the $n_Z$ ratio. FIG. 15A is an equi-$\Delta C^*$ curve chart for the $n_Z$ ratio$= -0.3$; FIG. 15B, an equi-$\Delta C^*$ curve chart for the $n_Z$ ratio$=0.0$; FIG. 15C, an equi-$\Delta C^*$ curve chart for the $n_Z$ ratio$=0.3$; FIG. 15D, an equi-$\Delta C^*$ curve chart for the $n_Z$ ratio $=0.5$; and FIG. 15E, an equi-$\Delta C^*$ curve chart for the $n_Z$ ratio$=0.7$. In each of the charts shown in FIGS. 13A to 15E, the concentric circles respectively represent, from the innermost circle, visual angles of 10°, 20°, 30°, 40°, and 50° with respect to the normal direction of the display surface of the liquid crystal display device. In addition, each black square (■) represents that a corresponding value is 10; each white square (□), 20; each black traingle (▲), 30; each white triangle (△), 40; each black star (★), 50; and each white star (☆), 60. According to FIGS. 13A to 15E, it is considered that better characteristics are obtained as each value is uniformly reduced regardless of visual angles and azimuth angles. In other words, it is considered that better characteristics are obtained as an equi-curve based on small values is uniformly drawn into a large circle. As is apparent from FIGS. 13A to 15E, when the $n_z$ ratio is 0.3 (the internal ratio of $n_y$ to $n_x$ is 3:7), higher uniformity is obtained, the curves become closer in shape to circles, the peak of the characteristics appears, and the optimal visual angle characteristics are obtained regardless of the azimuth.

Appropriate combinations of the product $\Delta n_c \cdot d_c$ of the liquid crystal cell 101 and the product $\Delta n \cdot d$ and refractive index of each of the biaxial retardation plates 112 and 113 will be described next.

Figure 16A:
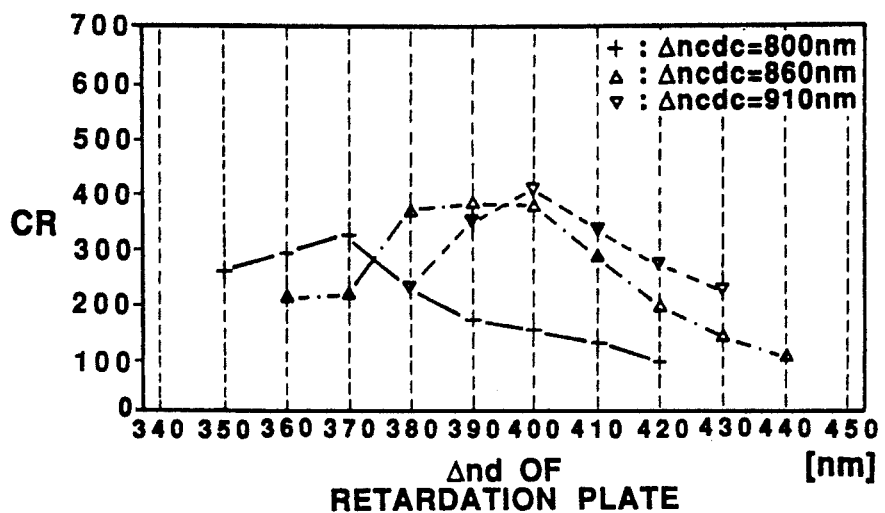
FIGS. 16A and 16B are graphs respectively showing front surface contrast characteristics and front surface whiteness characteristics with respect to $\Delta n \cdot d$ of each biaxial retardation plate, for three types of liquid crystal cells, in the liquid crystal display device of the first embodiment.
Figure 16B:
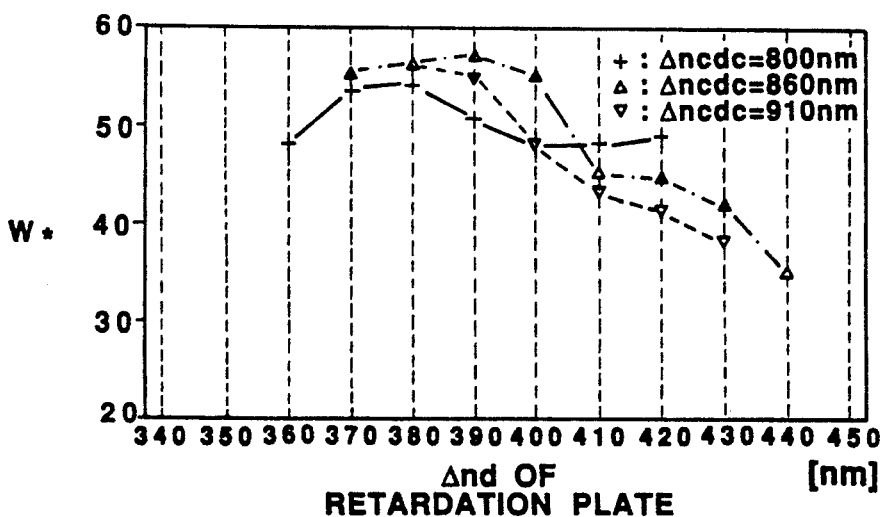

FIGS. 16A and 16B respectively show 0°-angle contrast (CR) characteristics and front surface whiteness (front surface W*: color sensation indexes based on light source colors) characteristics of three types of liquid crystal cells 101 having different values of the product $\Delta n_c \cdot d_c$ with respect to the value $\Delta n \cdot d$ of each of the biaxial retardation plates 112 and 113 which falls within the range of 340 to 450 nm. The 0°-angle construct means the construct when viewing along the normal direction. Referring to FIGS. 16A and 16B, each plus (+) indicates that the product $\Delta n_c \cdot d_c$ of the liquid crystal cell 101 is 800 nm; each white triangle ($\Delta$), 860 nm; and each white inverted triangle ($\nabla$), 910 nm. As shown in FIGS. 16A and 16B, appropriate combinations of the product $\Delta n_c \cdot d_c$ of the liquid crystal cell 101 and the product $\Delta n \cdot d$ of each of the biaxial retardation plates 112 and 113 are as follows. When the product $\Delta n_c \cdot d_c$ of the liquid crystal cell 101 is 800 nm, the $\Delta n \cdot d$ of each of the biaxial retardation plates 112 and 113 is about 370 nm, preferably 370 nm±20 nm. When the product $\Delta n_c \cdot d_c$ is 860 nm, the product $\Delta n \cdot d$ is around 400 nm, preferably 400 nm±20 nm. When the product $\Delta n_c \cdot d_c$ is 910 nm, the product $\Delta n \cdot d$ is about 390 nm, preferably 390±20 nm.

Figure 17A:
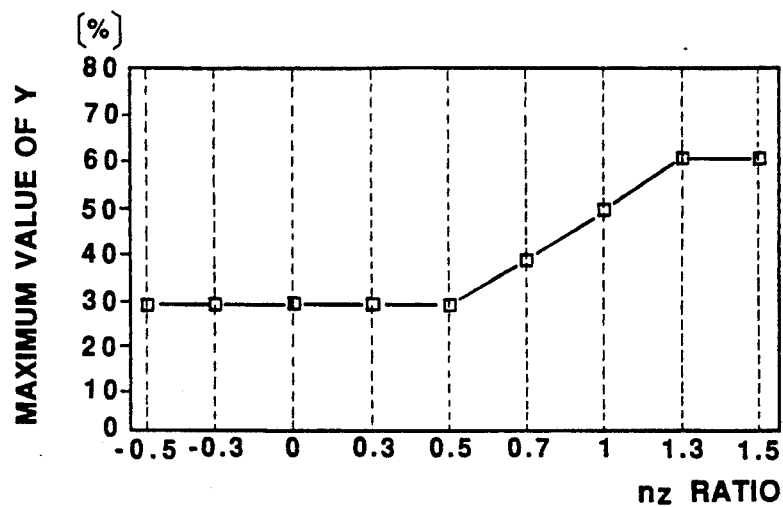
FIGS. 17A, 17B, and 17C are graphs respectively showing maximum Y characteristics, for three appropriate combinations of liquid crystal cells and biaxial retardation plates, obtained in an OFF state at a visual angle of 50°, with respect to the $n_Z$ ratio of each biaxial retardation plate in the liquid crystal display device of the first embodiment.
Figure 17B:
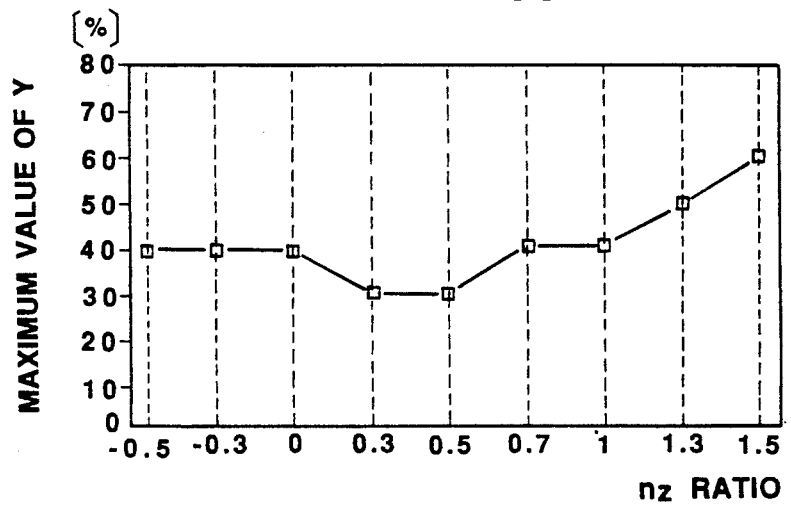
Figure 17C:
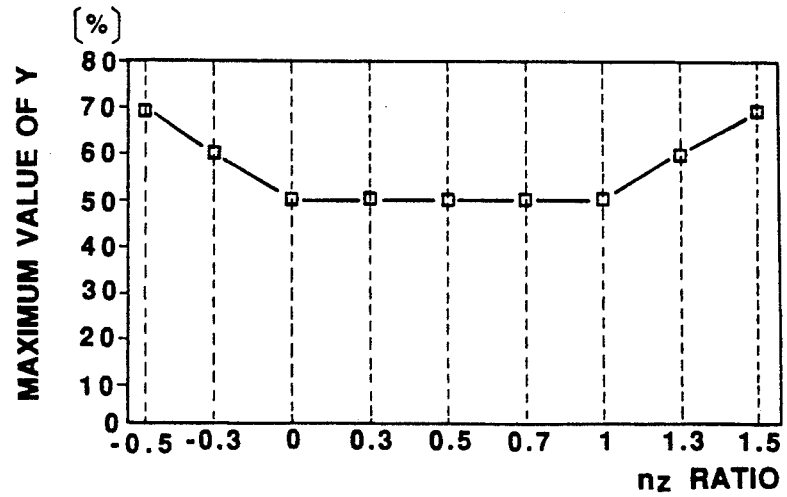
Figure 18A:
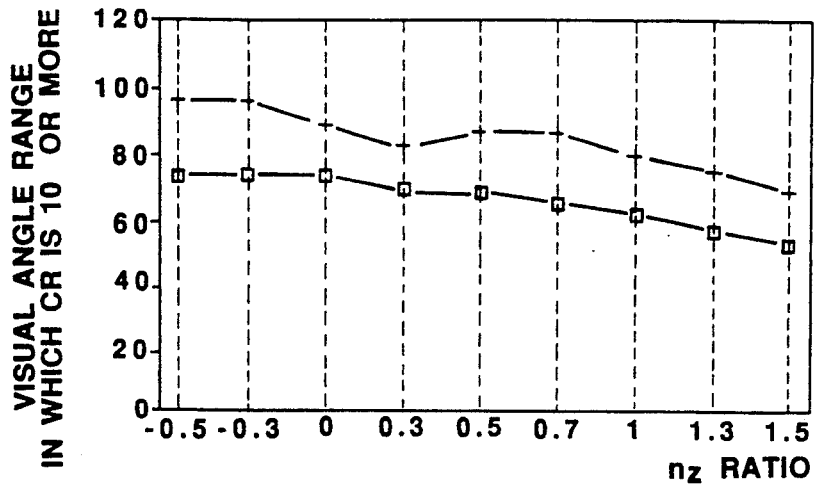
FIGS. 18A, 18B, and 18C are graphs respectively showing characteristics, for the three appropriate combinations of liquid crystal cells and biaxial retardation plates, which represent changes in visual angle range in which the contrast is 10 or more as a function of the $n_Z$ ratio of each biaxial retardation plate in the liquid crystal display device of the first embodiment.
Figure 18B:
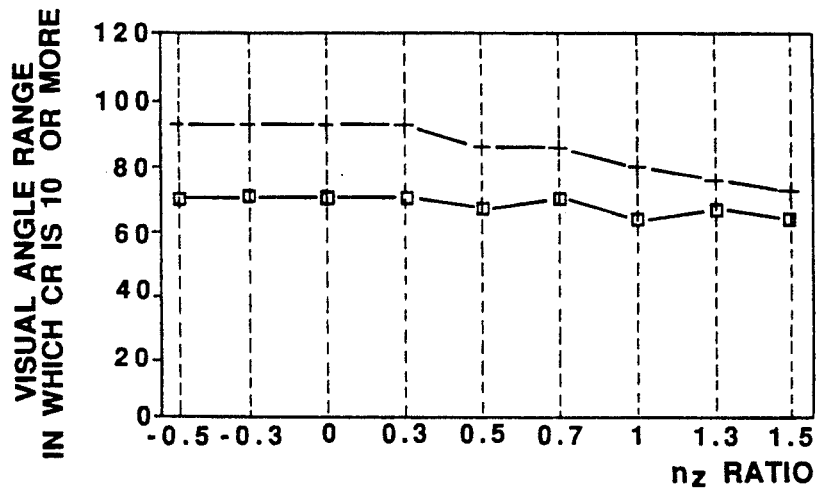
Figure 18C:
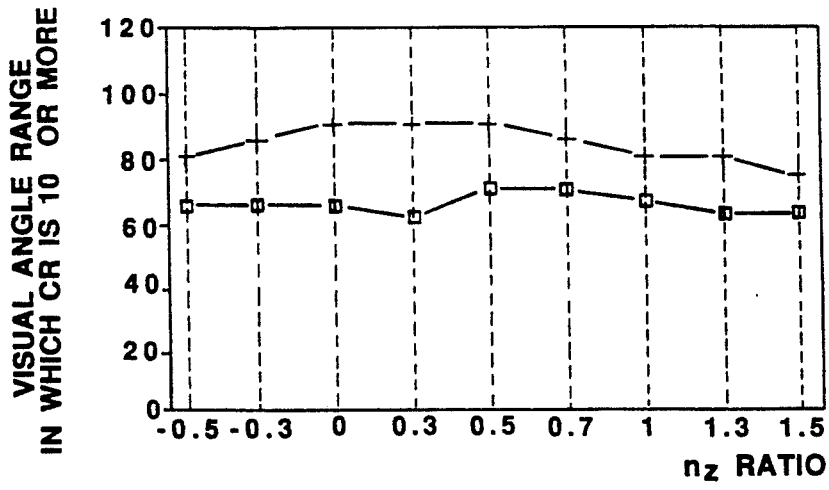
Figure 19A:
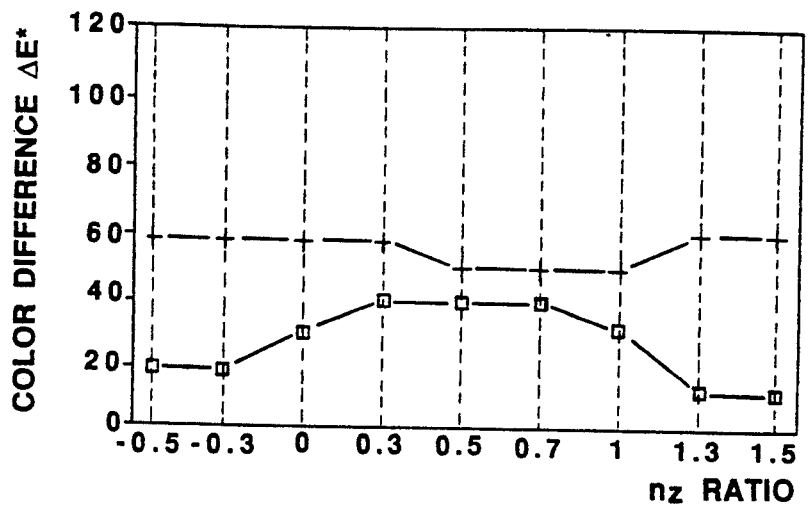
FIGS. 19A, 19B, and 19C are graphs respectively showing characteristics, for the three appropriate combinations of liquid crystal cells and biaxial retardation plates, which represent changes in maximum and minimum values of $\Delta E^*$ at a visual angle of 50° as a function of the $n_Z$ ratio of each biaxial retardation plate in the liquid crystal display device of the first embodiment.
Figure 19B:
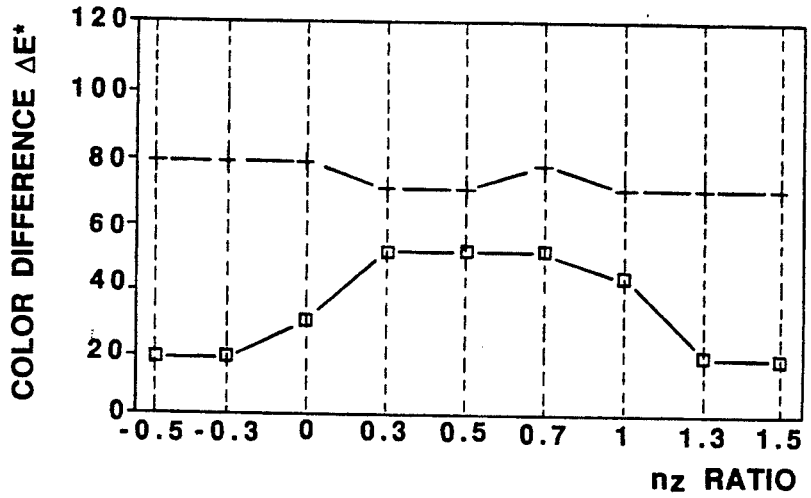
Figure 19C:
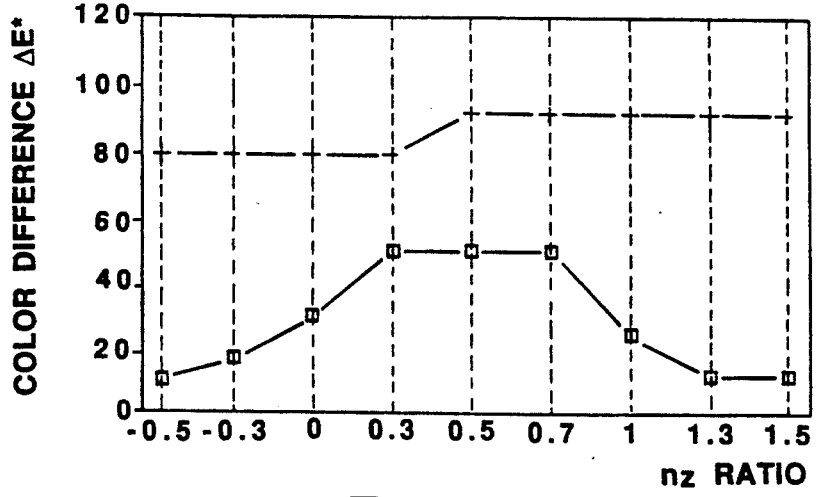

FIGS. 17A to 17C, 18A to 18C, and 19A to 19C are graphs respectively showing the $n_z$ ratio dependence of the respective visual characteristics, i.e., leakage light characteristics, viewing angle characteristics, and color difference characteristics in the respective appropriate combinations of the product $\Delta n_c \cdot d_c$ of the liquid crystal cell 101 and the product $\Delta n \cdot d$ of each of the biaxial retardation plates 112 and 113. FIGS. 17A, 18A, and 19A show the characteristics obtained when the product $\Delta n_c \cdot d_c$ of the liquid crystal cell 101 is 800 nm and the product $\Delta n \cdot d$ of each of the biaxial retardation plates 112 and 113 is 370 nm. FIGS. 17B, 18B, and 19B show the characteristics obtained when the product $\Delta n_c \cdot d_c$ of the liquid crystal cell 101 is 860 nm and the product $\Delta n \cdot d$ of each of the biaxial retardation plates 112 and 113 is 400 nm. FIGS. 17C, 18C, and 19C show the characteristics obtained when the product $\Delta n_c \cdot d_c$ of the liquid crystal cell 101 is 910 nm and the product $\Delta n \cdot d$ of each of the biaxial retardation plates 112 and 113 is 410 nm.

FIGS. 17A to 17C respectively show the relationships between the maximum values of Y representing a light leakage degree at a visual angle of 50° in an OFF state and the $n_z$ ratio of each of the biaxial retardation plates 112 and 113 in the three appropriate combinations of $\Delta n_c \cdot d_c$ and $\Delta n \cdot d$. According to FIGS. 17A to 17C, the range of the $n_z$ ratio in which the amount of leakage light is small throughout all the combinations is from 0.0 to 0.5.

FIGS. 18A to 18C respectively show the relationships between the ranges of visual angles in which the contrast (CR) in the upward/downward and leftward/rightward directions is 10 or more and the $n_z$ ratios of each of the biaxial retardation plates 112 and 113 in the same three appropriate combinations as described above. Referring to FIGS. 18A to 18C, each white square ($\square$) indicates a value in the upward/downward direction, and each plus (+) indicates a value in the leftward/ rightward direction. As is apparent from FIGS. 18A to 18C, the range of the $n_z$ ratio in which relatively good viewing angle characteristics can be obtained in all the combinations is from 0.0 to 0.5.

FIGS. 19A to 19C respectively show the relationships between the maximum and minimum values of the color difference $\Delta E^*$, obtained when viewed from the front side at a visual angle of 50°, and the $n_z$ ratios of each of the biaxial retardation plates 112 and 113. Referring to FIGS. 19A to 19C, each white square ($\square$) indicates a minimum value, and each plus (+) indicates a maximum value. According to these graphs, the amount of change in color difference with reference to the maximum values of the color difference $\Delta E^*$ is increased in absolute value with an increase in the product $\Delta n_c \cdot d_c$ of the liquid crystal 101 regardless of the $n_z$ ratio. The range of the $n_z$ ratio in which the difference between the maximum and minimum values is reduced, and the azimuth dependence of the color difference is improved in all the three combinations is from 0.0 to 0.5.

Figure 20A:
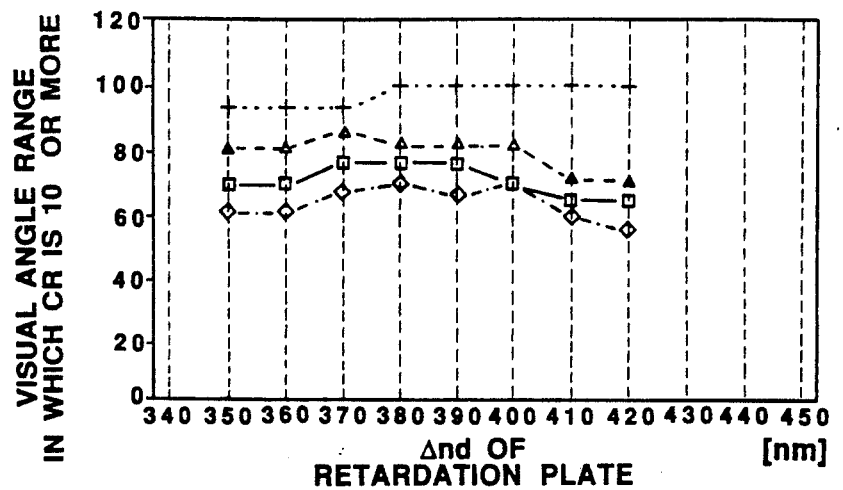
FIGS. 20A, 20B, and 20C are graphs respectively showing characteristics, for the three types of liquid crystal cells, which represent changes in visual angle range in the upward/downward and leftward/rightward directions in which the contrast is 10 or more as a function of $\Delta n \cdot d$ of each biaxial retardation plate and each uniaxial retardation plate in the liquid crystal display device of the first embodiment.
Figure 20B:
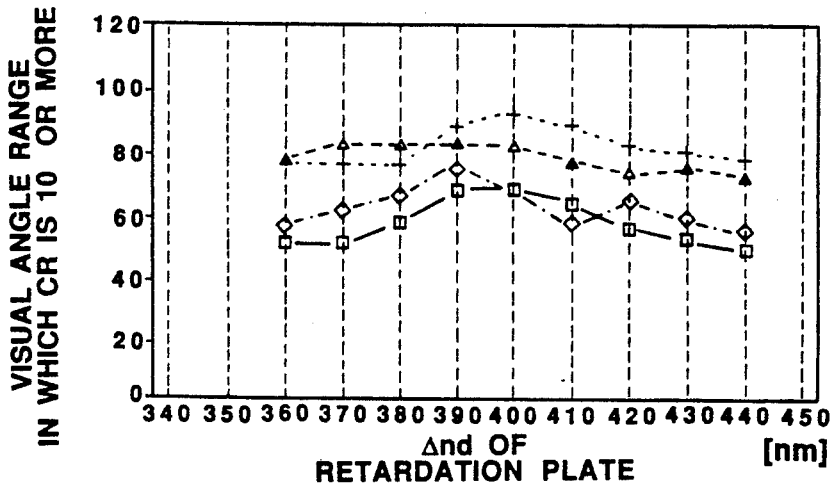
Figure 20C:
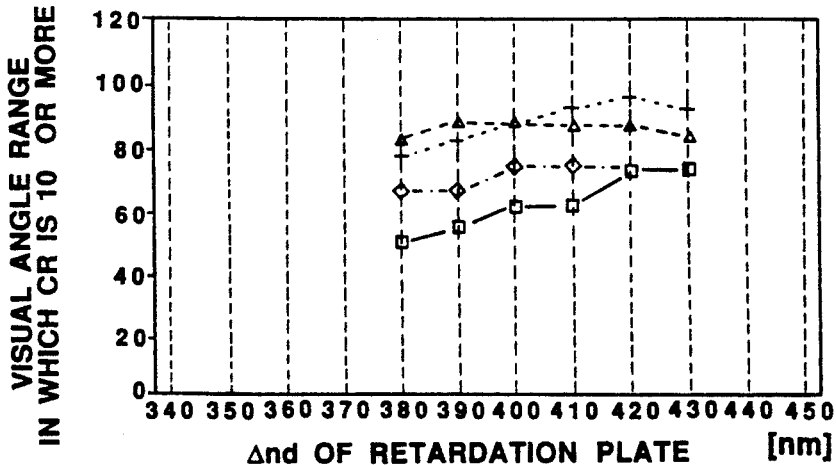
Figure 21A:
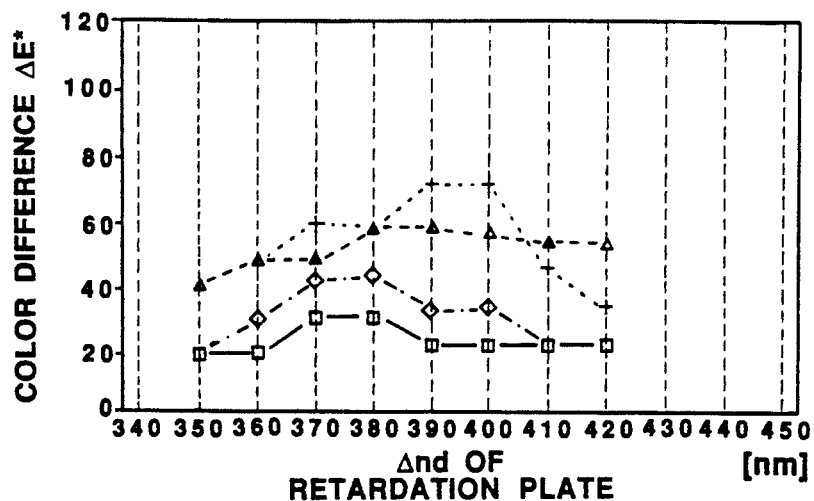
FIGS. 21A, 21B, and 21C are graphs respectively showing characteristics, for the three types of liquid crystal cells, which represent changes in maximum and minimum values of $\Delta E^*$ at a visual angle of 50° as a function of $\Delta n \cdot d$ of each biaxial retardation plate and each uniaxial retardation plate in the liquid crystal display device of the first embodiment.
Figure 21B:
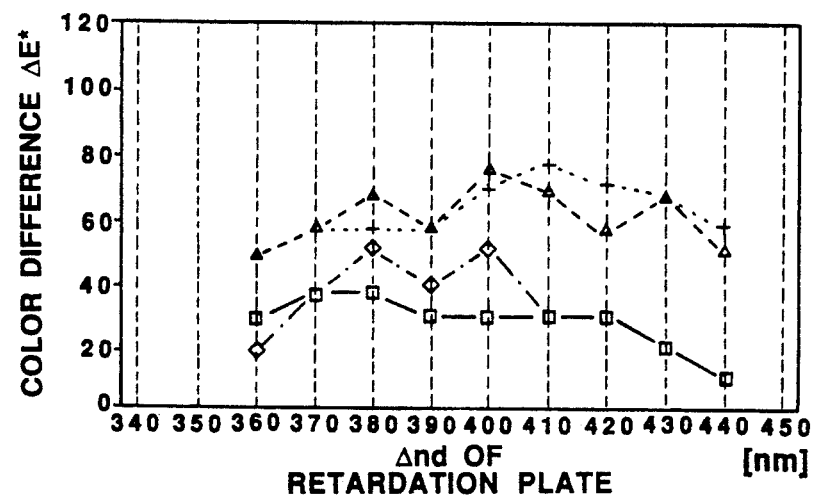
Figure 21C:
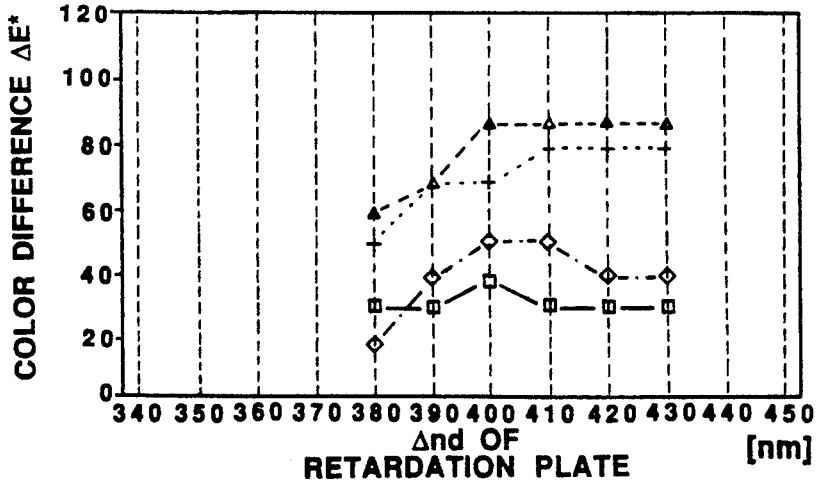

The visual angle characteristics of the three types of liquid crystal cells 101 with respect to the product $\Delta n \cdot d$ falling within the range of 340 to 450 nm for the $n_z$ ratio of each of the biaxial retardation plates 112 and 113 being fixed to 0.5 will be described, in comparison with a case wherein the conventional uniaxial retardation plates are used, with reference to FIGS. 20A to 20C and 21A to 21C. FIGS. 20A and 21A show a case wherein the liquid crystal cell 101 with the product $\Delta n_c \cdot d_c = 800$ nm is used. FIGS. 20B and 21B show a case wherein the liquid crystal cell 101 with the product $\Delta n_c \cdot d_c = 860$ nm is used. FIGS. 20C and 21C show a case wherein the liquid crystal cell 101 with the product $\Delta n_c \cdot d_c = 910$ nm is used.

FIGS. 20A to 20C respectively show the relationships between the ranges of visual angles in which the contrast is 10 or more in the upward/downward and leftward/rightward directions and the products $\Delta n \cdot d$ of each uniaxial retardation plate for the $n_z$ ratio = 0.0 and each biaxial retardation plate for the $n_z$ ratio = 0.5 in the respective three types of liquid crystal cells. Referring to FIGS. 20A to 20C, each white square ($\square$) indicates a visual angle at which contrast of 10 or more is obtained in the upward/downward direction when the uniaxial retardation plates each having the $n_z = 0.0$ are used. Similarly, each plus (+) indicates a visual angle at which contrast of 10 or more is obtained in the leftward/rightward direction when the uniaxial phase plates each having the $n_z$ ratio = 0.0 are used. Each white rhombus ($\diamond$) indicates a visual angle at which contrast of 10 or more is obtained in the upward/downward direction when the biaxial retardation plates each having the $n_z$ ratio = 0.5 are used. Each white triangle ($\Delta$) indicates a visual angle at which contrast of 10 or more is obtained in the leftward/rightward direction when the biaxial retardation plates each having the $n_z$ ratio = 0.5 are used. It is apparent from these graphs that when the uniaxial retardation plates are used, the differences between the visual angles at which contrast of 10 or more is obtained in the upward/downward direction and those in the leftward/rightward direction are large, and hence the azimuth dependence is high. In contrast to this, when the biaxial retardation plates each having the $n_z$ ratio = 0.5 are used, the differences between the visual angles at which contrast of 10 or more is obtained in the upward/downward direction and those in the leftward/rightward direction are very small regardless of the product $\Delta n \cdot d$ of the retardation plate, and hence the azimuth dependence is low, thus allowing a great improvement in viewing angle characteristics, as compared with the case wherein the uniaxial retardation plates are used.

FIGS. 21A to 21C respectively show the maximum and minimum values of the color difference $\Delta E^*$, obtained when viewed from the front side at a visual angle of 50°, as a function of the products $\Delta n \cdot d$ of the uniaxial retardation plates each having the $n_Z$ ratio = 0.0 and of the axial retardation plates each having the $n_Z$ ratio = 0.5, in the three types of liquid crystal cells. Referring to FIGS. 21A to 21C, each white square (□) indicates a minimum value obtained when the uniaxial retardation plates each having the $n_Z$ ratio = 0.0 are used. Similarly, each plus (+) indicates a maximum value obtained when the uniaxial retardation plates each having the $n_Z$ ratio = 0.0 are used. Each white rhombus (◊) indicates a minimum value obtained when the biaxial retardation plates each having the $n_Z$ ratio = 0.5 are used. Each white triangle (△) indicates a maximum value obtained when the biaxial retardation plates each having the $n_Z$ ratio = 0.5 are used. As shown in FIGS. 21A to 21C, the dependence of the color difference $\Delta E^*$ on the product $\Delta n \cdot d$ of each retardation plate, i.e., the azimuth dependence, is improved as the product $\Delta n \cdot d$ is reduced, because the differences between the maximum values and the minimum values are reduced. In addition, the maximum values of the color difference $\Delta E^*$ decrease with a decrease in the product $\Delta n \cdot d$. These tendencies are more conspicuous in the case of the biaxial retardation plates each having the $n_Z$ ratio = 0.5.

As described above, in the liquid crystal display device of the first embodiment, each visual angle characteristic is improved when the biaxial retardation plates each having the $n_Z$ ratio falling within the range of 0 to 0.5, i.e., $0 < n_Z \leq n_Y + 0.5 \cdot \Delta n$. Especially, with such retardation plates, good characteristics associated with Y (transmittance) in an OFF state which represents leakage light can be obtained. Of the above-mentioned $n_Z$ ratio range, if $0 < n_Z \leq n_Y + 0.3 \cdot \Delta n$ is set, the visual angle dependence and azimuth dependence of color difference are reduced, and better viewing angle characteristics can be obtained.

Note that in the liquid crystal display device of the first embodiment, even if the liquid crystal cell 101 and the first and second biaxial retardation plates 112 and 113, sandwiched between the polarizer 110 and the analyzer 111, are fixed, and the polarizer 110 and the analyzer 111 are rotated through 90°, the 0° angle characteristics remain almost the same, and the visual angle characteristics dot not change much. Therefore, the polarizer 110 may be arranged such that the transmission axis 110a is inclined at 50° counterclockwise with respect to the incident-side aligning treatment direction 103a, while the analyzer 111 may be arranged such that the transmission axis 111a is inclined at −35° with respect to the transmission axis 110a of the polarizer 110.

Second Embodiment

In the second embodiment, biaxial retardation plates are respectively arranged on both sides of a liquid crystal cell. The same reference numerals in the second and subsequent embodiments denote the same parts as in the first embodiment, and a description thereof will be omitted.

Figure 22:
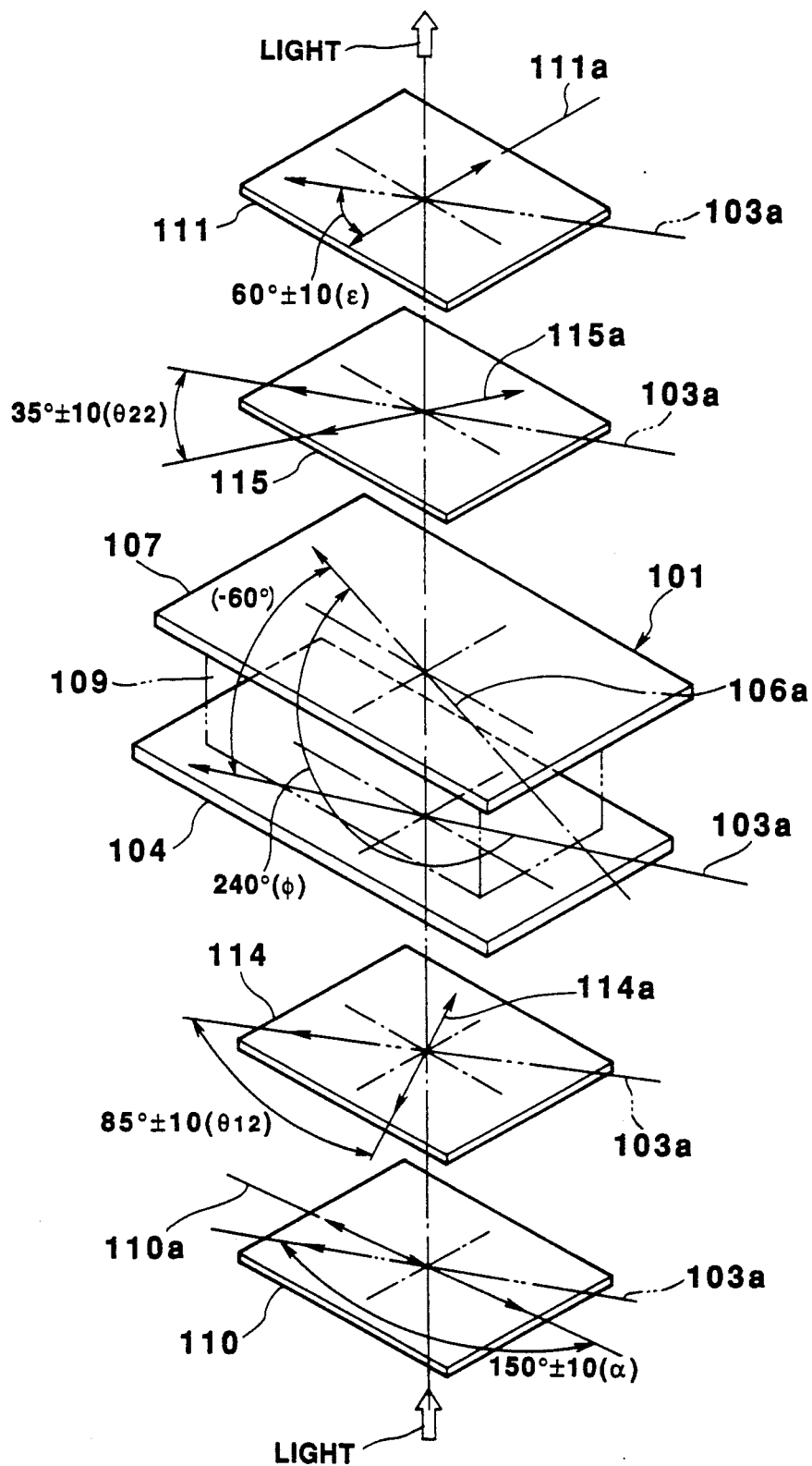
FIG. 22 is an exploded perspective view showing the schematic arrangement of a liquid crystal display device according to a second embodiment of the present invention.
Figure 23:
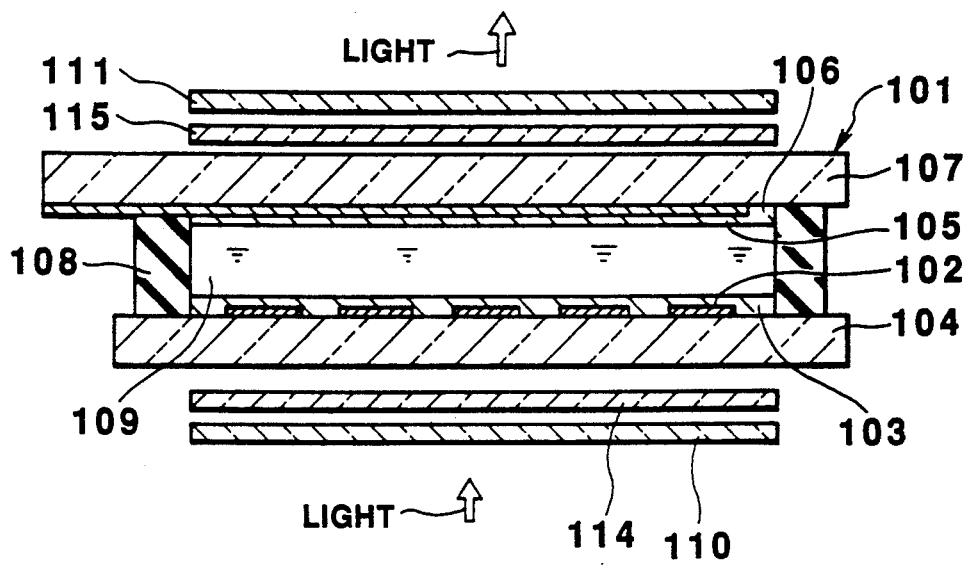
FIG. 23 is a sectional view showing the liquid crystal display device according to the second embodiment of the present invention.

FIGS. 22 and 23 are an exploded perspective view and a sectional view, respectively, of the second embodiment. A liquid crystal material 109 sealed in a liquid crystal cell 101 of this embodiment has a permittivity ratio $\Delta \epsilon / \epsilon \perp = 1.90$, an elastic constant ratio K3/K1 = 1.83, an elastic constant ratio K3/K2 = 2.40, and a ratio d/p of a gap d to a natural pitch p = 0.5. The molecules of the liquid crystal material 109 are aligned at a pretilt angle of about 8× and are twisted at 240° ($\phi$) in the negative rotational direction from an incident-side substrate 104 to an exit-side substrate 107. A product $\Delta n_c \cdot d_c$ of a gap $d_c$ and a refractive index anisotropy $\Delta n_c$ of the liquid crystal cell 101 preferably falls within the range of 750 to 950 nm and is set to be 864 nm (measurement wavelength: 589 nm) in the second embodiment.

A polarizer 110 constituted by a linearly polarizing plate is arranged outside the incident-side substrate 104 of the liquid crystal cell 101, whereas an analyzer 111 constituted by a linearly polarizing plate is arranged above the exit-side substrate 107. A first biaxial retardation plate 114 is arranged between the incident-side substrate 104 and the polarizer 110 of the liquid crystal cell 101. A second biaxial retardation plate 115 is arranged between the exit-side substrate 107 and the analyzer 111 of the liquid crystal cell 101.

The polarizer 110 is arranged such that its transmission axis 110a is inclined at 150°±10 ($\alpha$) in a counterclockwise direction (to be referred to as a positive or + direction hereinafter) with respect an incident-side aligning treatment direction 103a. The analyzer 111 is arranged such that its light-transmitting axis 111a crosses the incident-side aligning treatment direction 103a at 60°±10 ($\epsilon$). That is, the light-transmitting axis 111a of the analyzer 111 is set at −90° with respect to the transmission axis of the polarizer 110.

Each of the first and second biaxial retardation plates 114 and 115 is composed of polycarbonate and has a refractive index $n_X$ in the extending direction, a refractive index $n_Y$ in the direction perpendicular to the extending direction, and a refractive index $n_Z$ in the direction of thickness. When a refractive index $\Delta n$ is given by $n_X - n_Y$, the refractive indexes in the three directions satisfy a relation $n_Y + 0.3 \cdot \Delta n \leq n_Z \leq n_Y + 0.7 \cdot \Delta n$. Each of the first and second biaxial retardation plates 114 and 115 has a phase delay axis or slow axis in the extending direction and a product $\Delta n \cdot d$ of the refractive index anisotropy $\Delta n_c$ and a thickness d which falls within the range of 350 to 370 nm, preferably 356 nm (measurement wavelength: 589 nm). A phase delay axis 114a of the first biaxial retardation plate 114 is set at 85°±10 ($\theta_{12}$) with respect to the incident-side aligning treatment direction 103a. A phase delay axis 115a of the second biaxial retardation plate 115 is set at 35°±10 ($\theta_{22}$) with respect to the incident-side aligning treatment direction 103a.

In the second embodiment, since the two biaxial retardation plates 114 and 115, each having the refractive indexes in the three directions which satisfy the relation $n_Y + 0.3 \cdot \Delta n \leq n_Z \leq n_Y + 0.7 \cdot \Delta n$, are respectively arranged on the two sides of the liquid crystal cell 101, difference in phase difference, caused when light components having different wavelengths are transmitted through the liquid crystal cell 101, can be almost completely corrected by the two biaxial phase plates 114 and 115, thus preventing coloration of display colors. In addition, the visual angle dependence of display color and contrast can be reduced, and the viewing angle can be increased, thereby greatly improving the visual angle characteristics. Especially, since the refractive index $n_Z$ in the direction of thickness is set in the above-mentioned range, variations in viewing angle increase due to the value $n_Z$ can be prevented.

In such an STN liquid crystal display device, the refractive index anisotropy $\Delta n$ of each of the first and second biaxial retardation plates 114 and 115 is set to be 0.007; the refractive index $n_X$, 1.587; the refractive index $n_Y$, 1.580; and the refractive index $n_Z$, 1.5849.

Figure 24:
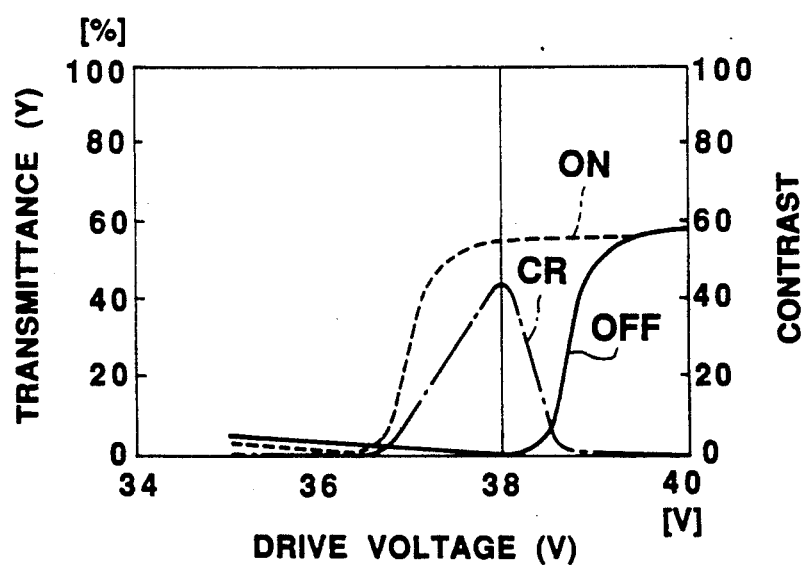
FIG. 24 is a graph showing the relationship between the transmittance and the applied voltage in the liquid crystal display device of the second embodiment.

FIG. 24 shows Y-V characteristics representing the relationship between the drive voltage (V) and the transmittance (Y), obtained when time-division driving of the liquid crystal display device using the first and second biaxial retardation plates 114 and 115 is performed at a 1/480 duty and a 1/15 bias, and the contrast. Referring to FIG. 24, a solid curve OFF represents a transmission curve obtained upon application of an OFF waveform voltage; a broken curve ON, a transmission curve obtained upon application of an ON waveform voltage; and a one-dot chain curve CR, contrast. As is apparent from FIG. 24, the contrast CR becomes as high as 40 to realize bright display, thus improving the viewing angle characteristics.

Figure 25A:
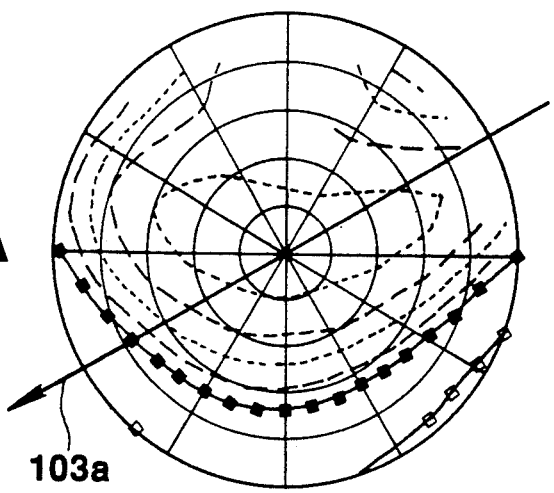
FIGS. 25A, 25B, and 25C are equi-brightness curve charts of dark and bright states and an equi-contrast curve chart in the liquid crystal display device of the second embodiment.
Figure 25B:
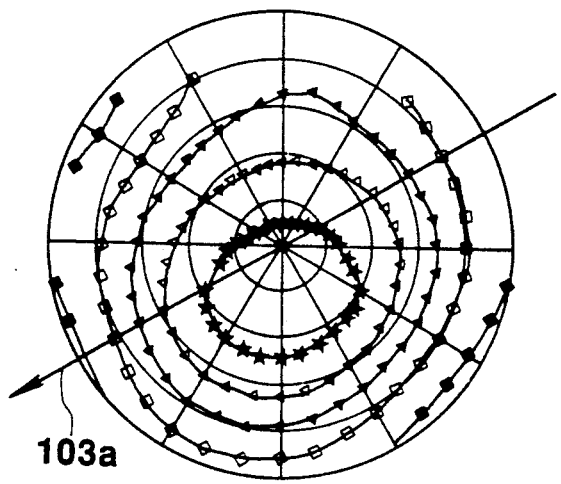
Figure 25C:
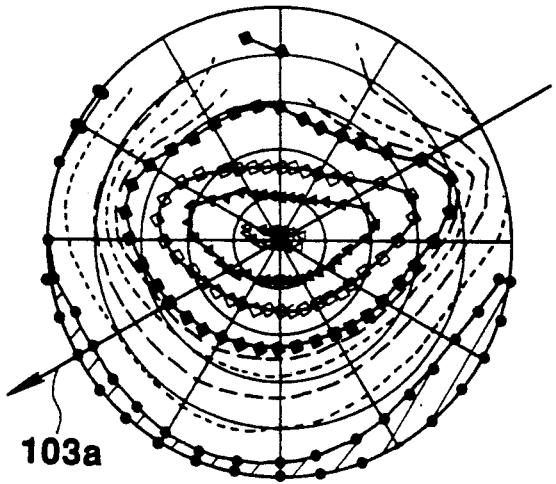
Figure 26A:
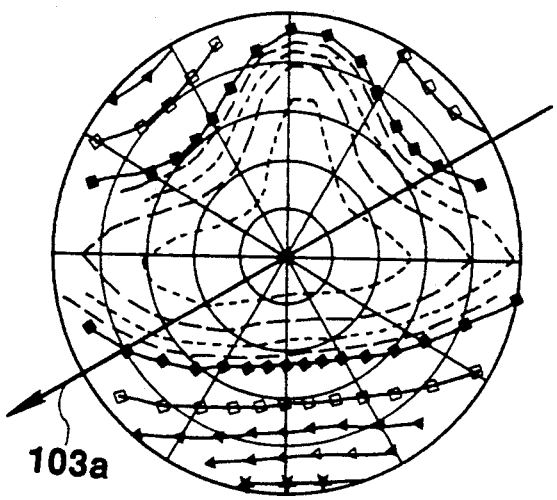
FIGS. 26A, 26B, and 26C are equi-brightness curve charts of dark and bright states and an equi-contrast curve chart in a comparative example of the second embodiment.
Figure 26B:
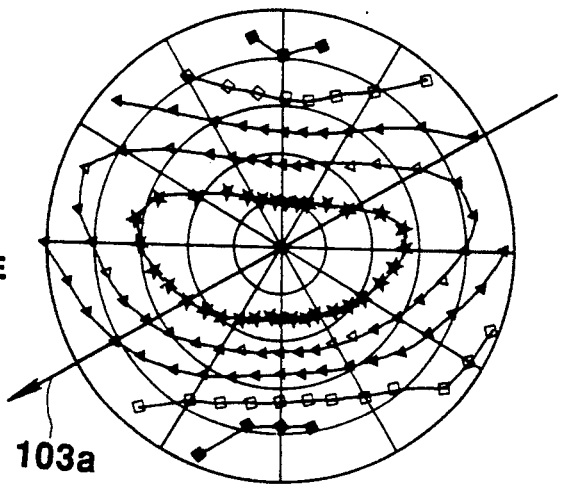
Figure 26C:
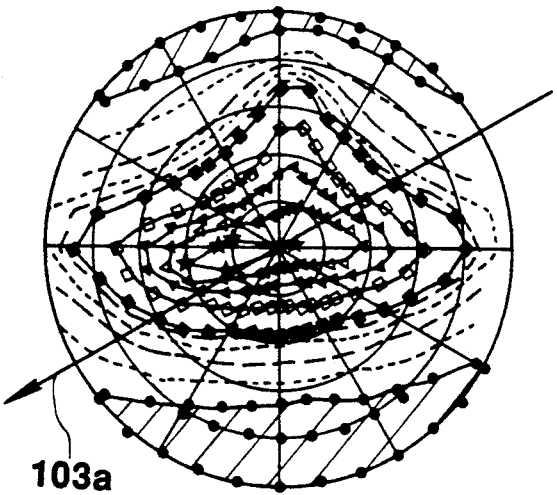

FIGS. 25A to 25C show equi-brightness curves and equi-contrast curves based on measurement on the liquid crystal display device. FIGS. 26A to 26C show equi-brightness curves and equi-contrast curves in a case wherein two uniaxial retardation plates are respectively arranged on the two sides of the liquid crystal cell 101 as a comparative example. FIGS. 25A and 26A show the equi-brightness curves in a dark state. FIGS. 25B and 26B show the equi-brightness curves in a bright state. FIGS. 25C and 26C show the equi-contrast curves. In each chart, the concentric circles respectively represent, from the innermost circle, visual angles of 10°, 20°, 30°, 40°, and 50° with respect to the normal direction of the display surface of the liquid crystal display device, and each radiating line indicates the azimuth angle of the display surface. Referring to FIGS 25A, 25B, 26A, and 26B, each black circle (●), represents a transmittance of 10%; each white square (□), a transmittance of 20%; a black triangle (▲), 30%; each white triangle (△), 40%; and each black star (★), 50%. Referring to FIGS. 25C and 26C, each black circle (●) represents that the contrast is less than 1, i.e., brightness/darkness inversion occurs. Similarly, each white square (□) represents that the contrast is 10; each black triangle (▲), 30; each white triangle (□), 40.

As is apparent from FIGS. 25C and 26C, in the liquid crystal display device using the first and second biaxial retardation plates 114 and 115, the inversion region indicated by the hatched portion is very small as compared with the liquid crystal display device as the comparative example using the uniaxial retardation plates. This is because the amount of leakage light in an OFF state is reduced owing to the effect of the biaxial retardation plates 114 and 115. In addition, in the liquid crystal display device of the second embodiment, the viewing angle is increased, and its lateral symmetry is considerably improved as compared with the liquid crystal display device as the comparative example.

In the above-described liquid crystal display device, the product $\Delta n_c \cdot d_c$ of the gap $d_c$ and the refractive index anisotropy $\Delta n_c$ of the liquid crystal cell 101 is set to be 860 nm (measurement wavelength: 589 nm), and the product $\Delta n \cdot d$ of the refractive index anisotropy $\Delta n$ and the thickness d of each of the biaxial retardation plates 114 and 115 is set to be 350 nm (measurement wavelength 589 nm). In addition, the thickness d and the refractive index $\Delta n$ of each of the biaxial retardation plates 112 and 113 are respectively set to be 50 μm and 0.007, and the refractive indexes $n_X$ and $n_Y$ are respectively set to be 1.588 and 1.581. The $n_Z$ ratio dependence of contrast, color difference, brightness index difference, and chroma difference in such a liquid crystal display device will be described below.

Figure 27A:
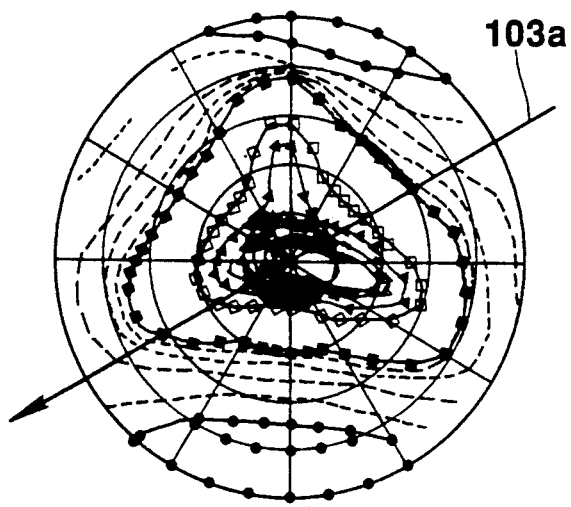
FIGS. 27A, 27B, 27C, 27D, 27E, and 27F are equi-contrast curve charts for six different values of the $n_Z$ ratio in the liquid crystal display device of the second embodiment.
Figure 27B:
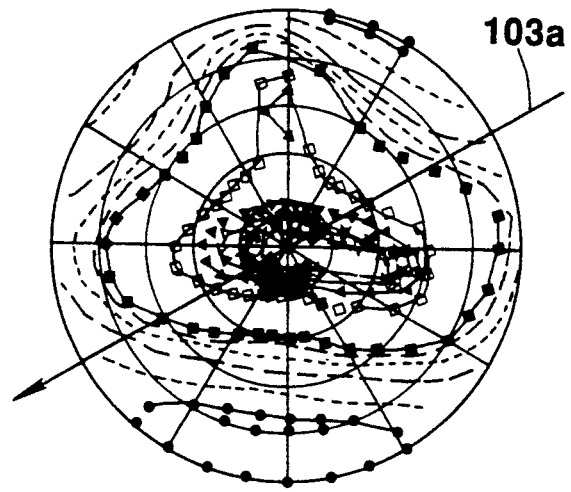
Figure 27C:
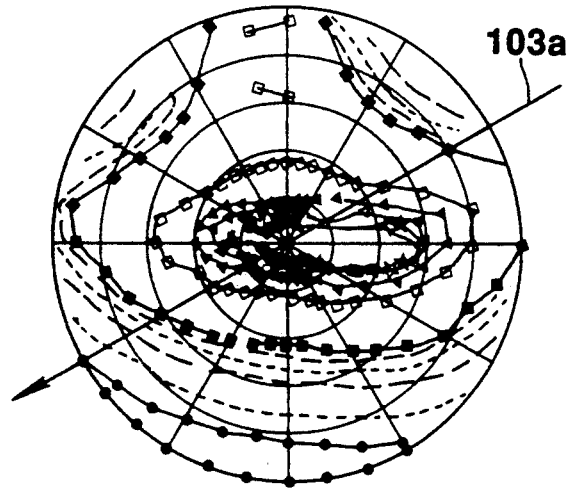
Figure 27D:
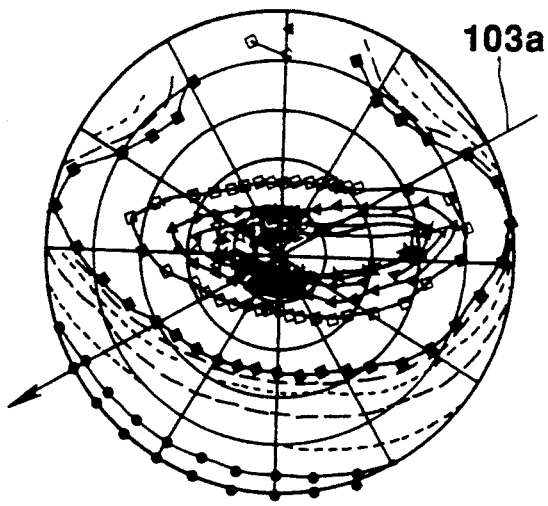
Figure 27E:
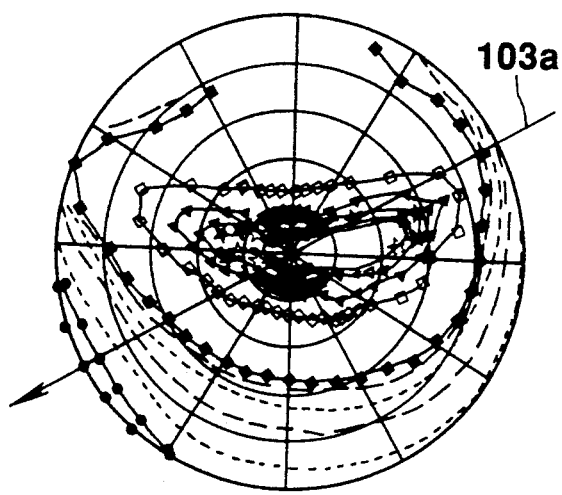
Figure 27F:
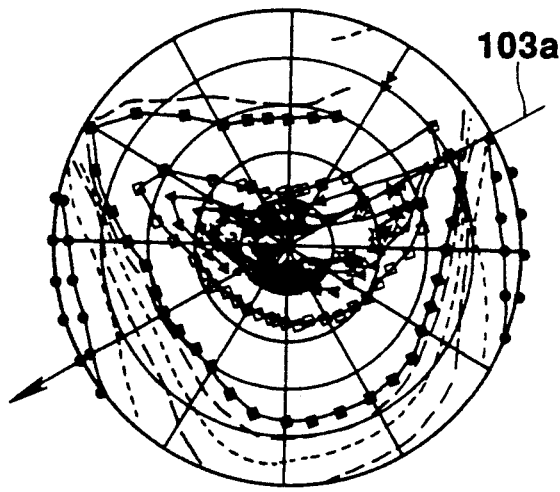

FIGS. 27A to 27F respectively show equi-contrast curves for six different values of the $n_Z$ ratio. FIG. 27A is an equi-contrast curve chart for the $n_Z$ ratio = −0.3; FIG. 27B, an equi-contrast curve chart for the $n_Z$ ratio = 0.0; FIG. 27C, an equi-contrast curve chart for the $n_Z$ ratio = 0.3; FIG. 27D, an equi-contrast curve chart for the $n_Z$ ratio = 0.5; FIG. 27E, an equi-contrast curve chart for the $n_Z$ ratio = 0.7; and FIG. 27F, an equi-contrast curve chart for the $n_Z$ ratio = 1.0. In each chart, the concentric circles respectively represent, from the innermost circle, visual angles of 10°, 20°, 30°, 40°, and 50° with respect to the normal direction of the display surface of the liquid crystal display device, and each radiating line indicates the azimuth angle of the display surface. In addition, each black circle (●) represents that the contrast is less than 1, i.e., brightness/darkness inversion occurs. Similarly, each black square (■) represents that the contrast is 10; each white square (□), 50; each black triangle (▲), 100; and each white triangle (△), 150. It is considered that better contrast characteristics are obtained when the inversion region is small, and high contrast is uniformly maintained regardless of azimuth angles and visual angles. According to FIGS. 27A to 27F, the inversion region is small in the $n_Z$ ratio range of 0.3 to 0.7, and the minimum inversion region is obtained and the contrast characteristics are optimized when the $n_Z$ ratio is 0.7.

Figure 28A:
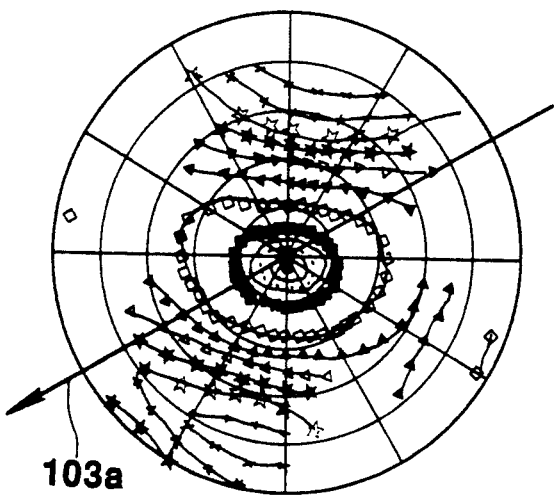
FIGS. 28A, 28B, 28C, 28D, 28E, and 28F are equi-$\Delta E^*$ curve charts for the six different values of the $n_Z$ ratio in the liquid crystal display device of the second embodiment
Figure 28B:
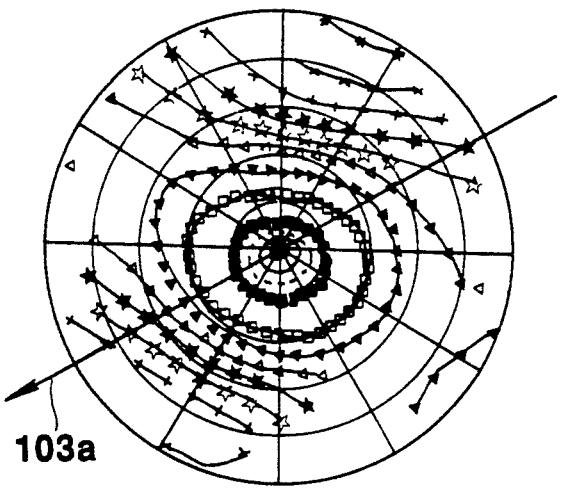
Figure 28C:
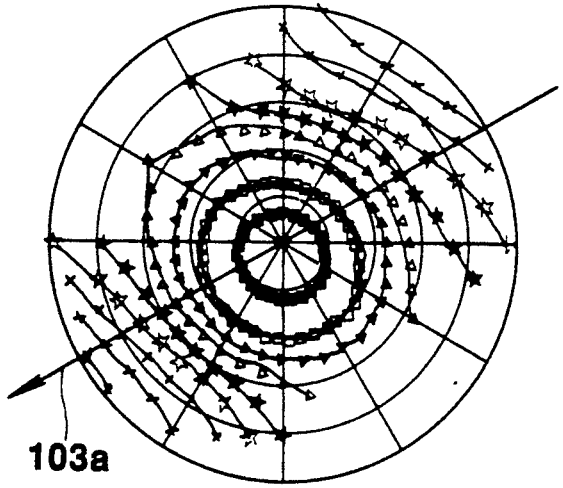
Figure 28D:
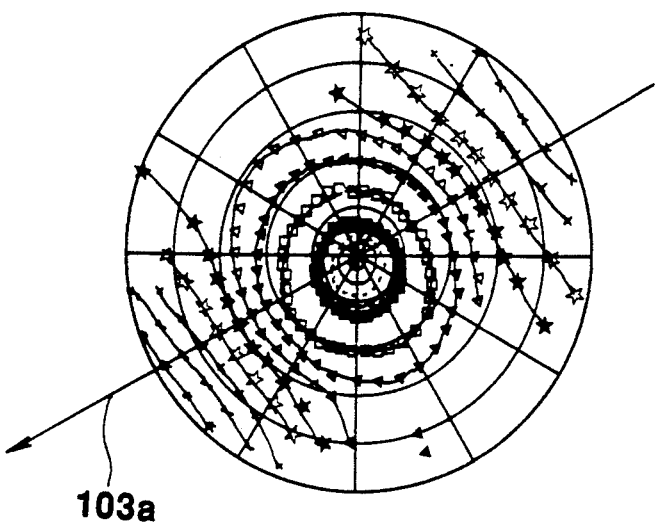
Figure 28E:
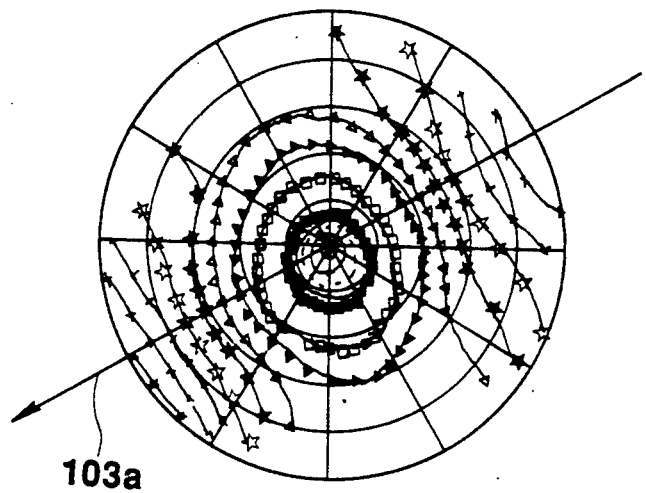
Figure 28F:
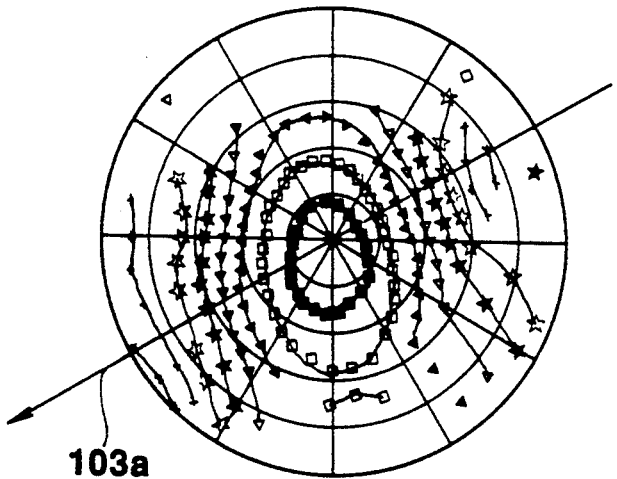
Figure 29A:
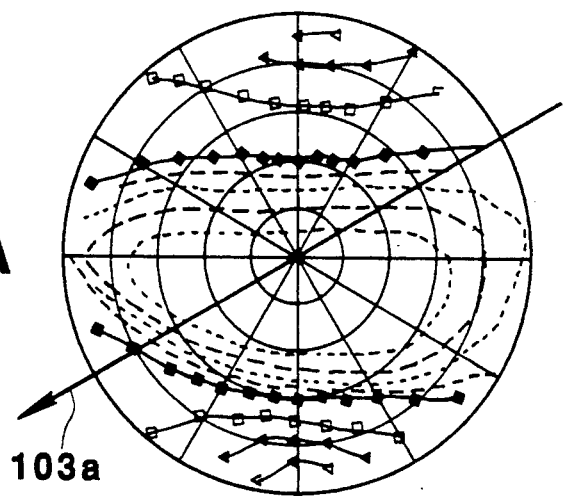
FIGS. 29A, 29B, 29C, 29D, 29E, and 29F are equi-$\Delta L^*$ curve charts for the six different values of the $n_Z$ ratio in the liquid crystal display device of the second embodiment.
Figure 29B:
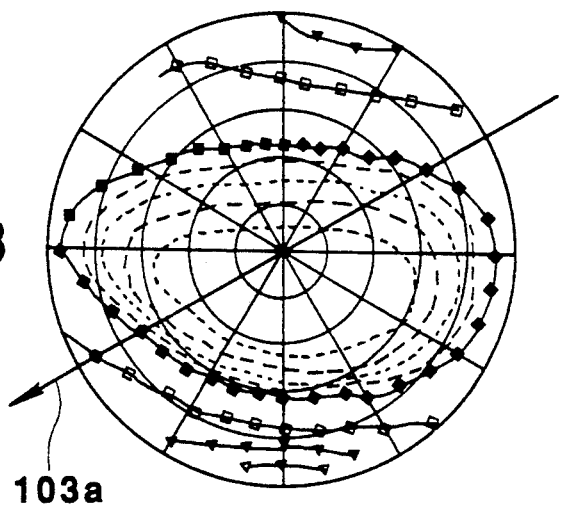
Figure 29C:
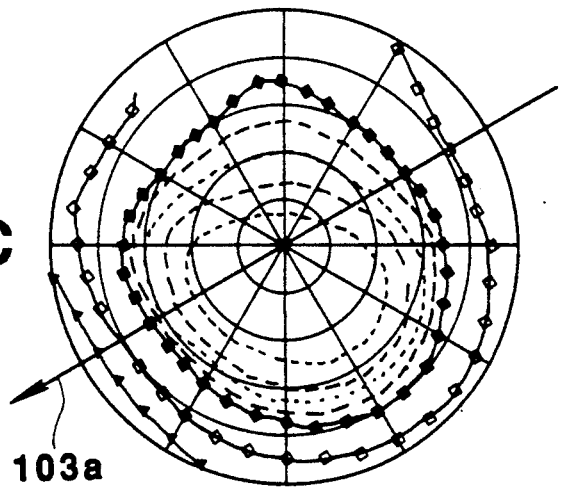
Figure 29D:
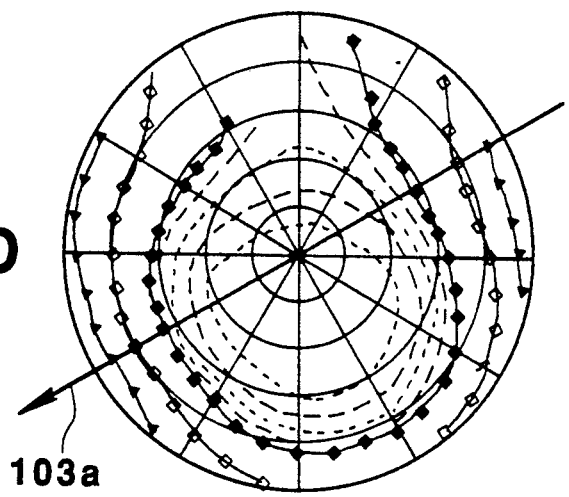
Figure 29E:
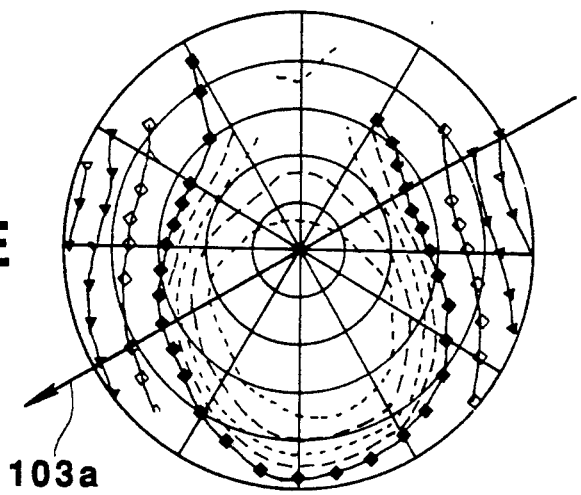
Figure 29F:
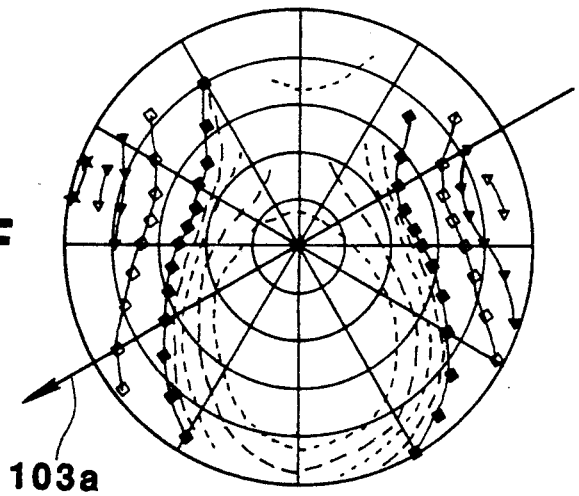
Figure 30A:
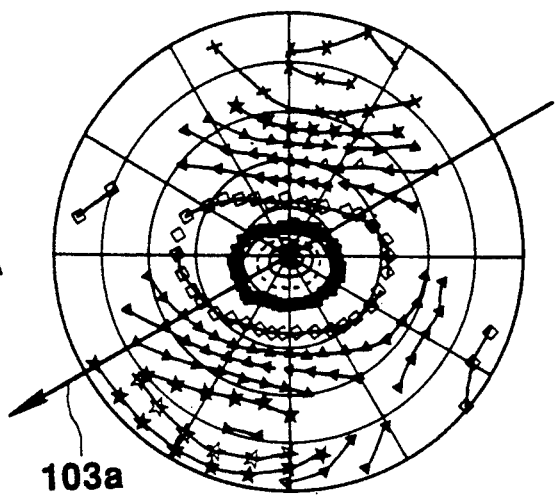
FIGS. 30A, 30B, 30C, 30D, 30E, and 30F are equi-$\Delta C^*$ curve charts for the six different values of the $n_Z$ ratio in the liquid crystal display device of the second embodiment.
Figure 30B:
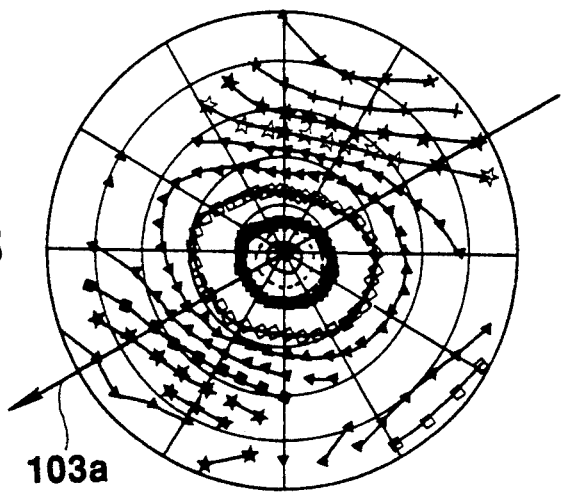
Figure 30C:
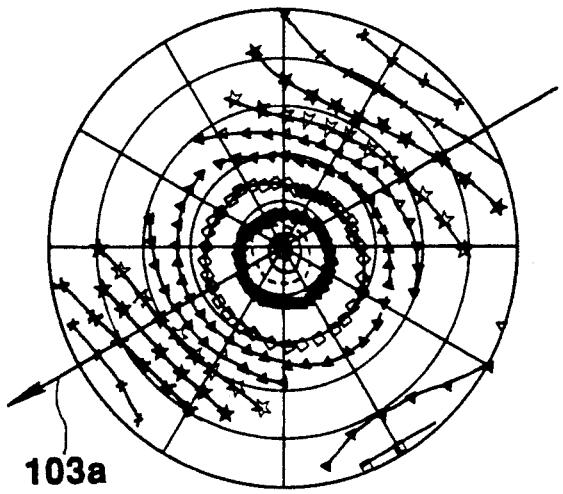
Figure 30D:
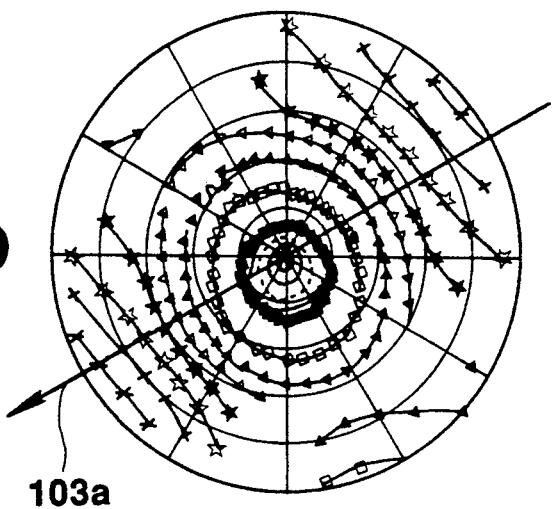
Figure 30E:
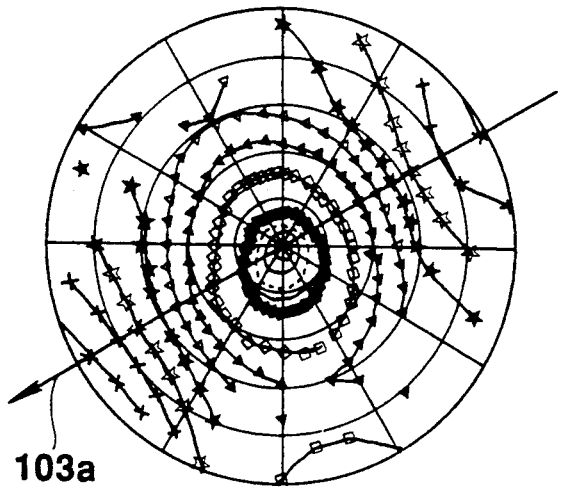
Figure 30F:
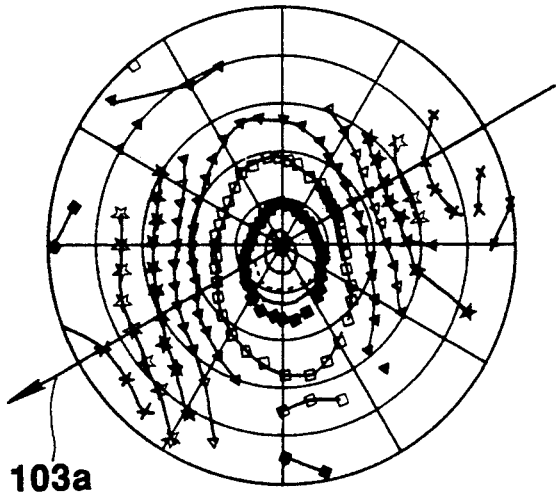

FIGS. 28A to 30F show equi-curve diagrams of a color difference $\Delta E^*$, a brightness index difference $\Delta L^*$, and a chroma difference $\Delta C^*$ for the six different values of the $n_Z$ ratio. FIGS. 28A to 28F show the $n_Z$ ratio dependence of equi-$\Delta E^*$ curves. FIG. 28A is an equi-$\Delta E^*$ curve chart for the $n_Z$ ratio = −0.3; FIG. 28B, an equi-$\Delta E^*$ curve chart for the $n_Z$ ratio = 0.0; FIG. 28C, an equi-$\Delta E^*$ curve chart for the $n_Z$ ratio = 0.3; FIG. 28D, an equi-$\Delta E^*$ curve chart for the $n_Z$ ratio = 0.5; FIG. 28E, an equi-$\Delta E^*$ curve chart for the $n_Z$ ratio = 0.7; and FIG. 28F, an equi-$\Delta E^*$ curve chart for the $n_Z$ ratio = 1.0. FIGS. 29A to 29F show the $n_Z$ ratio dependence of equi-$\Delta L^*$ curves. FIG. 29A is an equi-$\Delta L^*$ curve chart for the $n_Z$ ratio = −0.3; FIG. 29B, an equi-$\Delta L^*$ curve chart for the $n_Z$ ratio = 0.0; FIG. 29C, an equi-$\Delta L^*$ curve chart for the $n_Z$ ratio = 0.3; FIG. 29D, an equi-$\Delta L^*$ curve chart for the $n_Z$ ratio = 0.5; FIG. 29E, an equi-$\Delta L^*$ curve chart for the $n_Z$ ratio = 0.7; and FIG. 29F, an equi-$\Delta L^*$ curve chart for the $n_Z$ ratio = 1.0. FIGS. 30A to 30F show the $n_Z$ ratio dependence of equi-$\Delta C^*$ curves. FIG. 30A is an equi-$\Delta C^*$ curve chart for the $n_Z$ ratio = −0.3; FIG. 30B, an equi-$\Delta C^*$ curve chart for the $n_Z$ ratio = 0.0; FIG. 30C, an equi-$\Delta C^*$ curve chart for the $n_Z$ ratio = 0.3; FIG. 30D, an equi-$\Delta C^*$ curve chart for the $n_Z$ ratio = 0.5; FIG. 30E, an equi-$\Delta C^*$ curve chart for the $n_Z$ ratio = 0.7; and FIG. 30F, an equi-$\Delta C^*$ curve chart for the $n_Z$ ratio = 1.0. In each of the charts shown in FIGS. 28A to 30F, the concentric circles respectively represent, from the innermost circle, visual angles of 10°, 20°, 30°, 40°, and 50° with respect to the normal direction of the display surface of the liquid crystal display device. In addition, each black square (■) represents a characteristic value of 10; each white square (□), 20; each black triangle (▲), 30; each white triangle (△), 40; each black star (★), 50; and each white star (☆), 60. When viewed from the front surface, the respective characteristics vary less as each value is reduced. That is, the azimuth dependence of each characteristic is reduced as the equi-curves are uniformly drawn into round curves on each curve chart.

The the equi-curves of each characteristic become most uniformly round curves in the $n_Z$ ratio range of 0.5 to 0.7. In this $n_Z$ ratio range, changes in color are minimized, and the azimuth dependence is reduced, thereby realizing good visual angle characteristics.

Appropriate combinations of the product $\Delta n_c \cdot d_c$ of the liquid crystal cell 101 and the product $\Delta n \cdot d$ and refractive index of each of the biaxial retardation plates 114 and 115 will be described next.

Figure 31A:
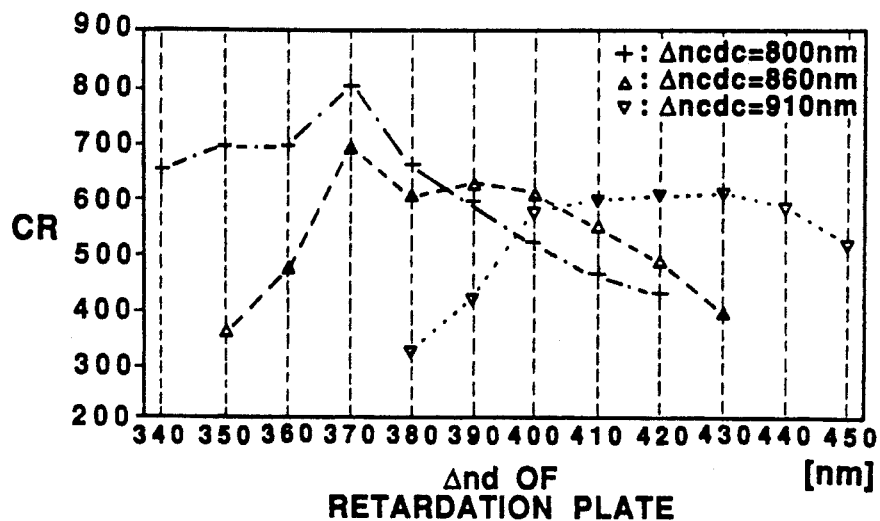
FIGS. 31A and 31B are graphs respectively showing front surface contrast characteristics and front surface whiteness characteristics with respect to $\Delta n \cdot d$ of each biaxial retardation plate, for three types of liquid crystal cells, in the liquid crystal display device of the second embodiment.
Figure 31B:
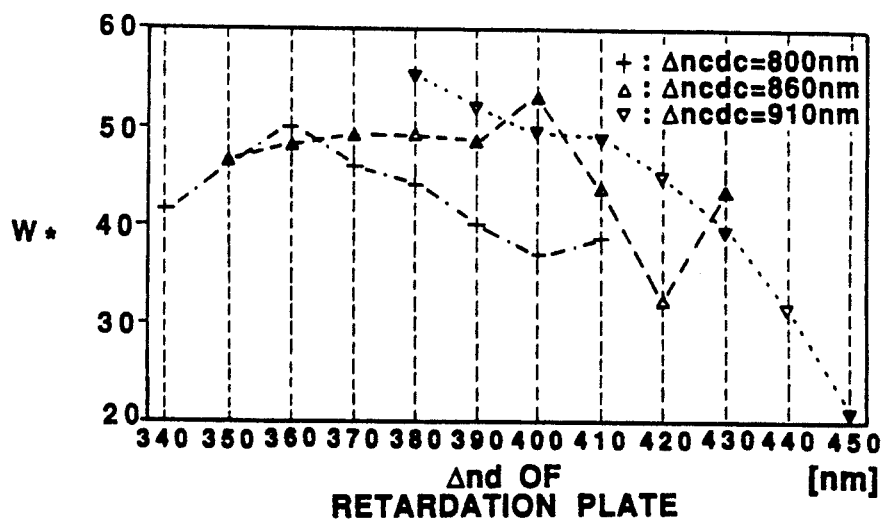

FIGS. 31A and 31B respectively show 0°-angle contrast (CR) characteristics and front surface whiteness (front surface W*: color sensation indexes based on light source colors) characteristics of three types of liquid crystal cells 101 having different values of the product $\Delta n_c \cdot d_c$ with respect to the values $\Delta n \cdot d$ of each of the biaxial retardation plates 112 and 113 which fall within the range of 340 to 450 nm. Referring to FIGS. 31A and 31B, each plus (+) indicates that the product $\Delta n_c \cdot d_c$ of the liquid crystal cell 101 is 800 nm; each white triangle (△), 860 nm; and each white inverted triangle (▽), 910 nm. As shown in FIGS. 31A and 31B, the appropriate combinations of the product $\Delta n_c \cdot d_c$ of the liquid crystal cell 101 and the product $\Delta n \cdot d$ of each of the biaxial retardation plates 112 and 113 are as follows. When the product $\Delta n_c \cdot d_c$ of the liquid crystal cell 101 is 800 nm, the $\Delta n \cdot d$ of each of the biaxial retardation plates 112 and 113 is about 360 nm, preferably 360 nm±20. When the product $\Delta n_c \cdot d_c$ is 860 nm, the project $\Delta n \cdot d$ is about 390 nm, preferably 390 nm±20. When the product $\Delta n_c \cdot d_c$ is 910 nm, the product $\Delta n \cdot d$ is about 430 nm, preferably 430 nm±20.

Figure 32A:
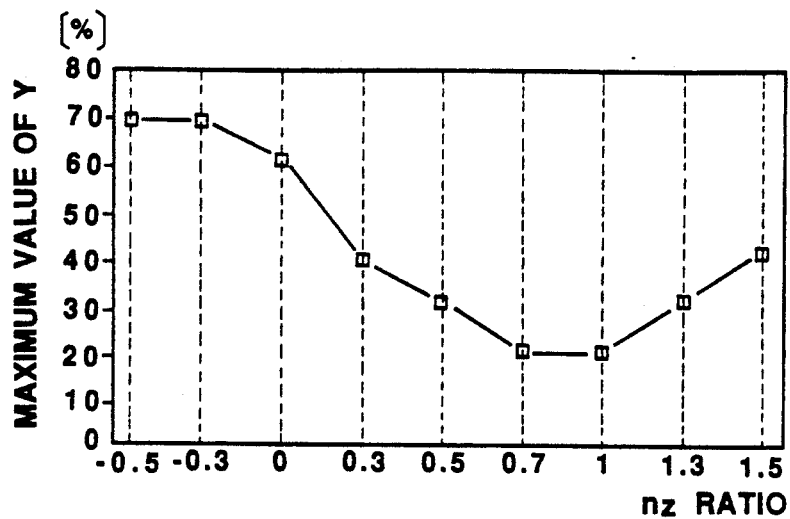
FIGS. 32A, 32B, and 32C are graphs respectively showing maximum Y characteristics, for three appropriate combinations of liquid crystal cells and biaxial retardation plates, obtained in an OFF state at a visual angle of 50°, with respect to the $n_Z$ ratio of each biaxial retardation plate in the liquid crystal display device of the second embodiment.
Figure 34A:
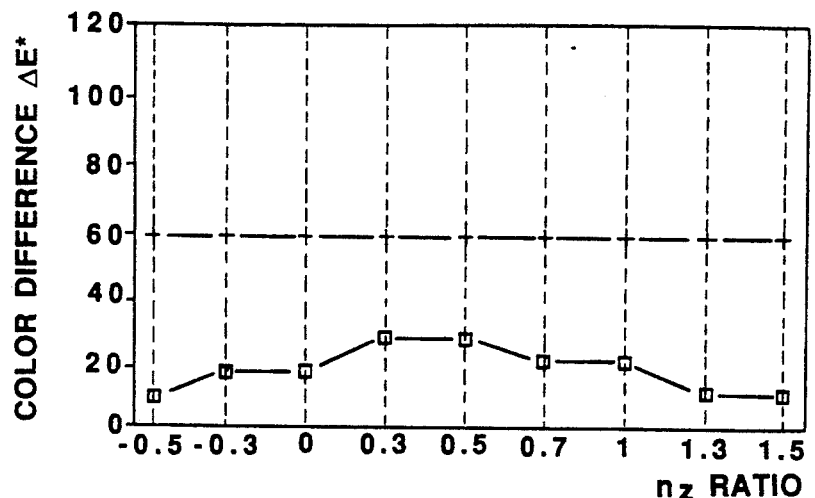
FIGS. 34A, 34B, and 34C are graphs respectively showing characteristics, for the three appropriate combinations of liquid crystal cells and biaxial retardation plates, which represent changes in maximum and minimum values of $\Delta E^*$ at a visual angle of 50° as a function of the $n_Z$ ratio of each biaxial retardation plate in the liquid crystal display device of the second embodiment.
Figure 34B:
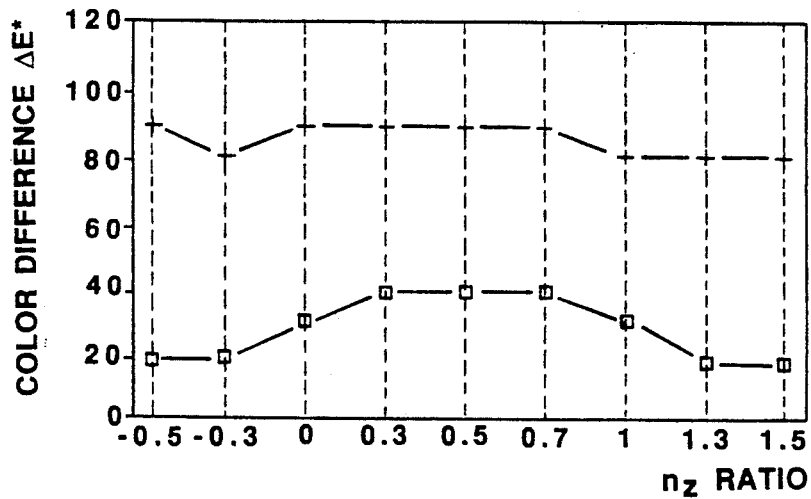
Figure 34C:
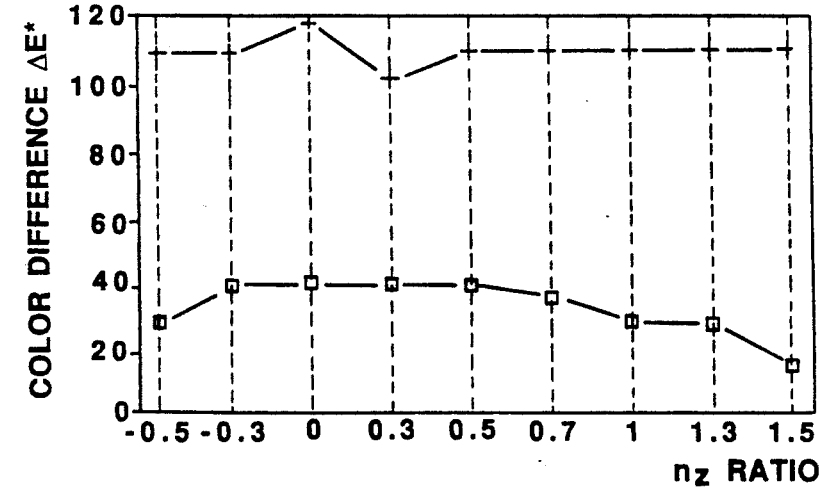

FIGS. 32A to 34C are graphs respectively showing the $n_Z$ ratio dependence of the respective visual characteristics, i.e., leakage light characteristics, viewing angle characteristics, and color difference characteristics in the respective appropriate combinations of the products $\Delta n_c \cdot d_c$ of the liquid crystal cell 101 and the products $\Delta n \cdot d$ of each of the biaxial retardation plates 112 and 113. FIGS. 32A, 33A, and 34A show the characteristics obtained when the product $\Delta n_c \cdot d_c$ of the liquid crystal cell 101 is 800 nm and the product $\Delta n \cdot d$ of each of the biaxial retardation plates 114 and 115 is 360 nm. FIGS. 32B, 33B, and 34B show the characteristics obtained when the product $\Delta n_c \cdot d_c$ of the liquid crystal cell 101 is 860 nm and the product $\Delta n \cdot d$ of each of the biaxial retardation plates 114 and 115 is 390 nm. FIGS. 32C, 33C, and 34C show the characteristics obtained when the product $\Delta n_c \cdot d_c$ of the liquid crystal cell 101 is 910 nm and the product $\Delta n \cdot d$ of each of the biaxial retardation plates 114 and 115 is 430 nm.

Figure 32B:
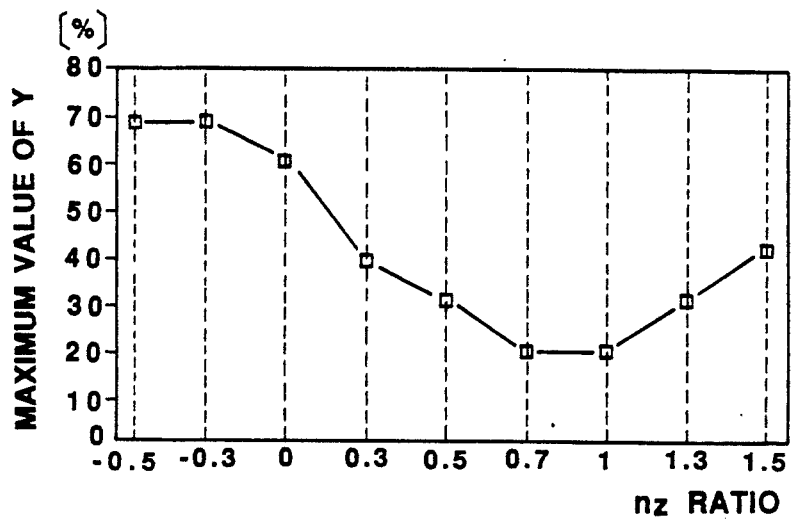
Figure 32C:
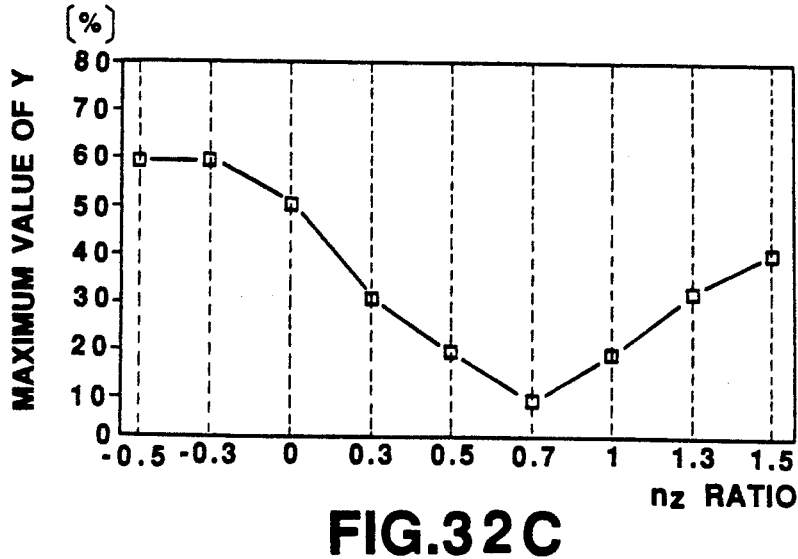
Figure 33:
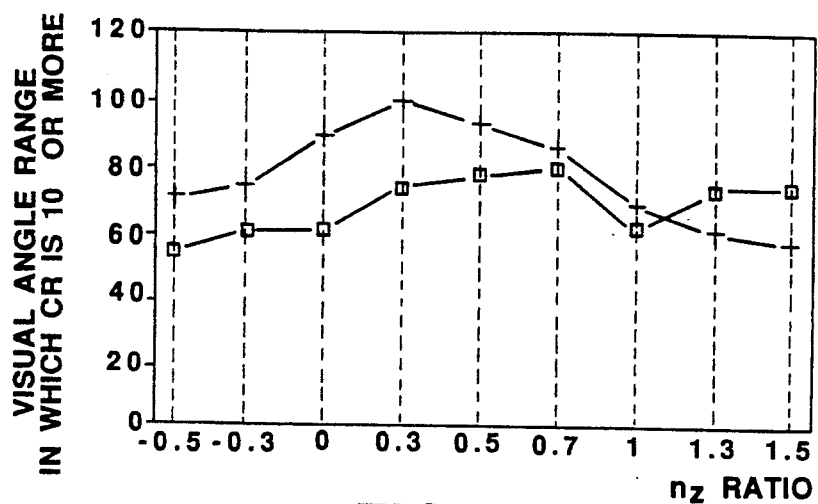
FIGS. 33A, 33B, and 33C are graphs respectively showing characteristics, for the three appropriate combinations of liquid crystal cells and biaxial retardation plates, which represent changes in visual angle range in which the contrast is 10 or more as a function of the $n_Z$ ratio of each biaxial retardation plate in the liquid crystal display device of the second embodiment.
Figure 33:
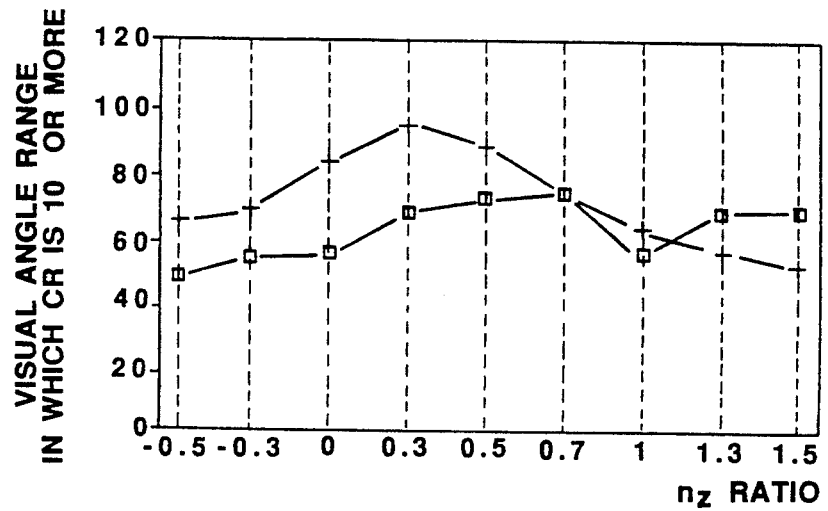
Figure 33:
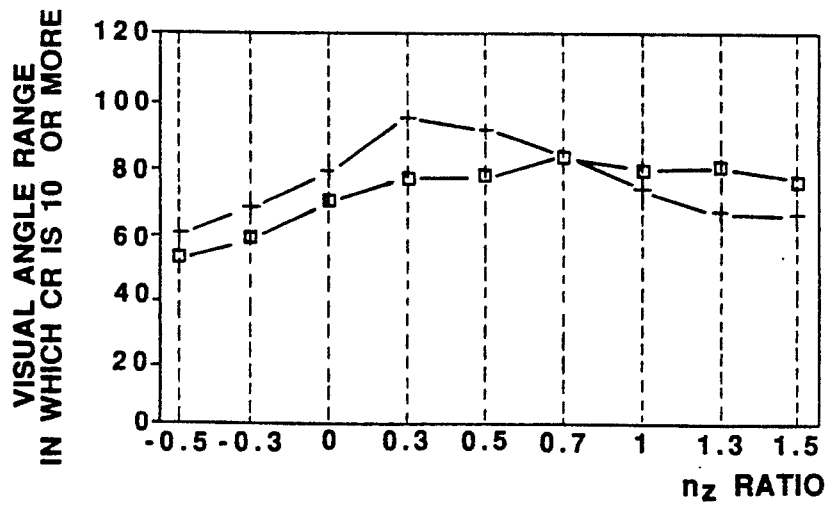

FIGS. 32A to 32C respectively show the relationships between the maximum values of Y (transmittance) representing leakage light at a visual angle of 50° in an OFF state and the $n_Z$ ratios of each of the biaxial retardation plates 112 and 113 in the three appropriate combinations of $\Delta n_c \cdot d_c$ and $\Delta n \cdot d$. According to FIGS. 32A to 32C, in each combination, the value Y, i.e., the amount of leakage light is minimized, and the inversion region of contrast is minimized when the $n_Z$ ratio is about 0.7. That is, a significant improvement in characteristics can be obtained with the biaxial retardation plates each having the $n_Z$ ratio=0.7 as having the $n_Z$ ratio=0.0.

FIGS. 33A to 33C respectively show the relationships between the ranges of visual angles in which the contrast in the upward/downward and leftward/rightward directions is 10 or more and the $n_Z$ ratios in the same three appropriate combinations as described above. Referring to FIGS. 33A to 33C, each white square (□) indicates a value in the upward/downward direction, and each plus (+) indicates a value in the leftward/rightward direction. As is apparent from FIGS. 33A to 33C, in the $n_Z$ ratio range of 0.3 to 0.7, the two curves come close to each other at high levels, and almost the same characteristics are obtained in all the liquid crystal cells 101.

FIGS. 34A to 34C respectively show the maximum and minimum values of the color difference $\Delta E^*$, obtained when viewed from the front surface at a visual angle of 50°, as a function of the $n_Z$ ratios, in the three appropriate combinations similar to those described above. Referring to FIGS. 34A to 34C, each white square (□) indicates a minimum value, and each plus (+) indicates a maximum value. According to these graphs, the amount of change in color difference $\Delta E^*$ with reference to the maximum values of the color difference $\Delta E^*$ is increased in absolute value with an increase in the product $\Delta n_c \cdot d_c$ of the liquid crystal 101 regardless of the $n_Z$ ratio. In addition, the difference between the maximum and minimum values is reduced, and the azimuth dependence of the color difference $\Delta E^*$ is improved in the $n_Z$ ratio range of 0.3 to 0.7.

As described above, when the refractive index $n_Z$ ratio of each of the two biaxial retardation plates 114 and 115 respectively arranged on both the sides of the liquid crystal cell 101 falls within the range of 0.3 to 0.7, desirable visual angle characteristics can be obtained in all the three appropriate combinations of the product $\Delta n_c \cdot d_c$ of the liquid crystal cell 101 and the product $\Delta n \cdot d$ of each of the biaxial retardation plates 114 and 115.

Figure 35A:
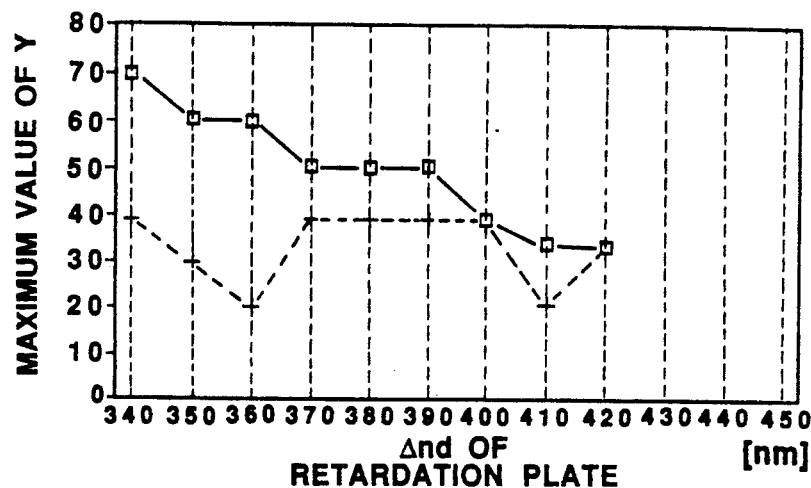
FIGS. 35A, 35B, and 35C are graphs respectively showing characteristics, for the three types of liquid crystal cells, which represent changes in maximum value of Y in an OFF state at a visual angle of 50° as a function of $\Delta n \cdot d$ of each biaxial retardation plate and each uniaxial retardation plate in the liquid crystal display device of the second embodiment.
Figure 35B:
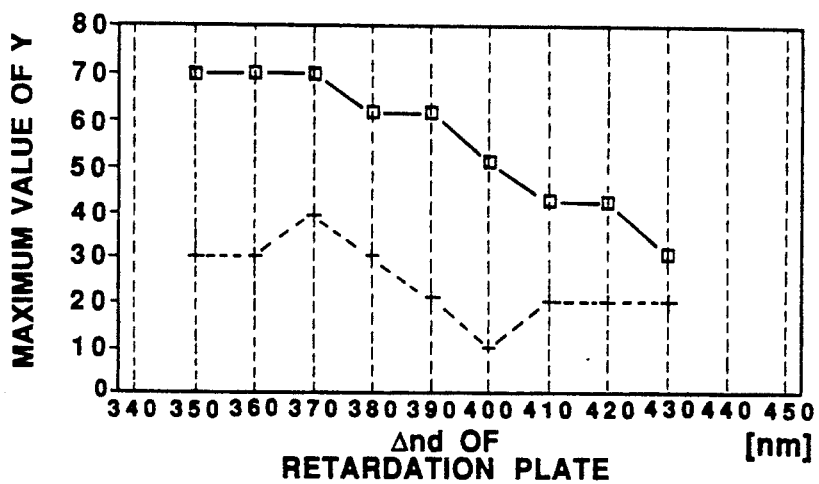
Figure 35C:
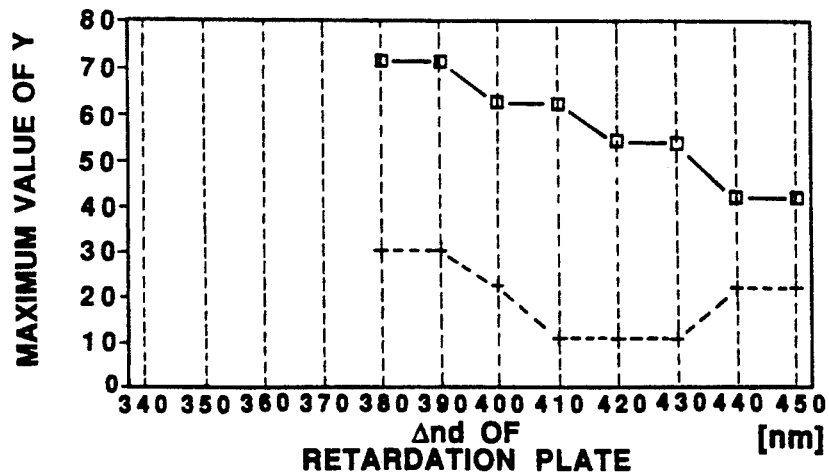
Figure 36A:
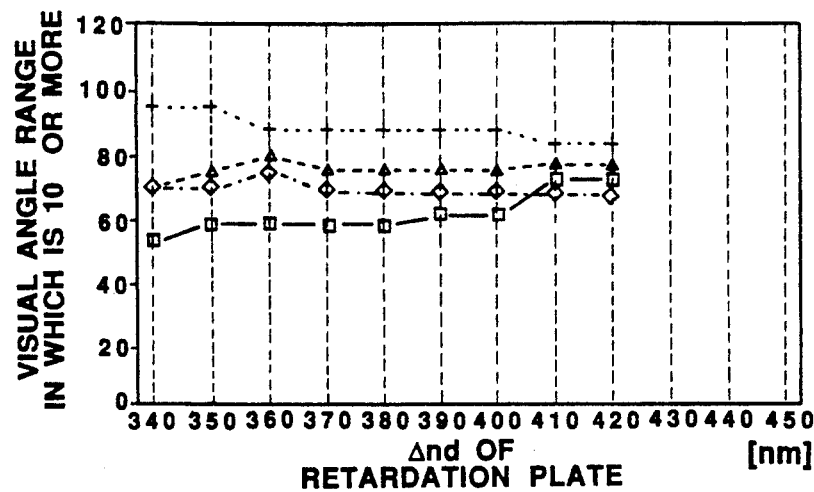
FIGS. 36A, 36B, and 36C are graphs respectively showing characteristics, for the three types of liquid crystal cells, which represent changes in visual angle range in the upward/downward and leftward/rightward directions in which the contrast is 10 or more as a function of $\Delta n \cdot d$ of each biaxial retardation plate and each uniaxial retardation plate in the liquid crystal display device of the second embodiment.
Figure 36B:
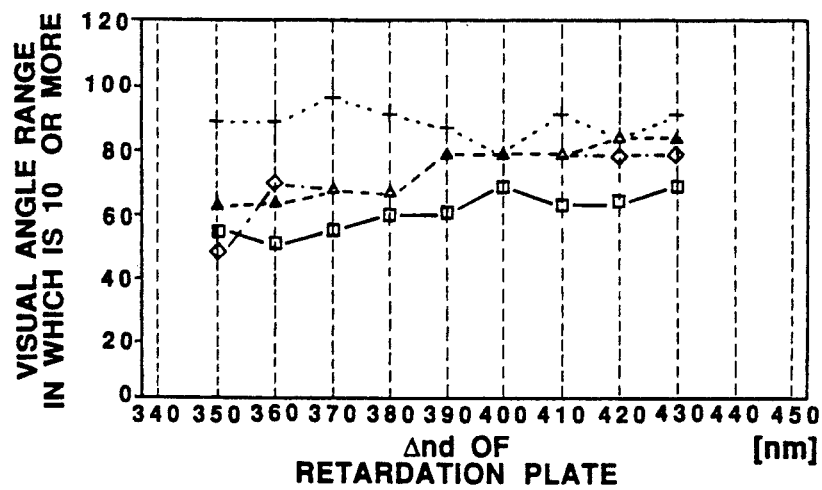
Figure 36C:
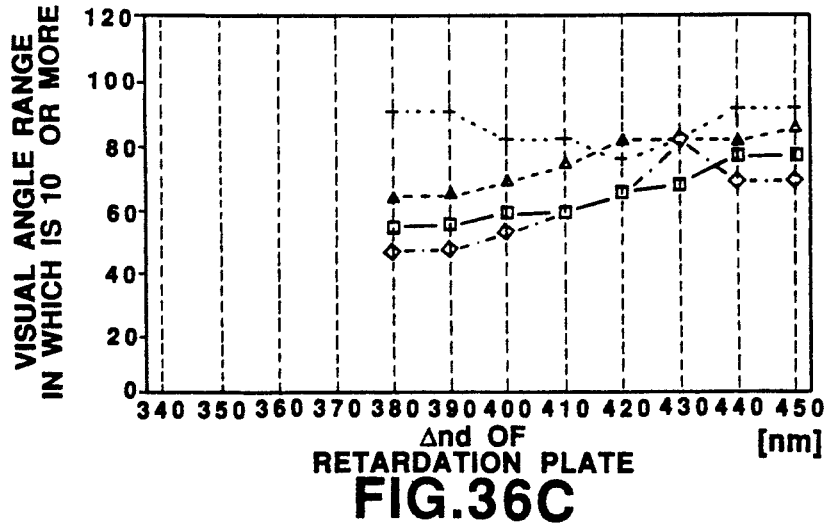
Figure 37A:
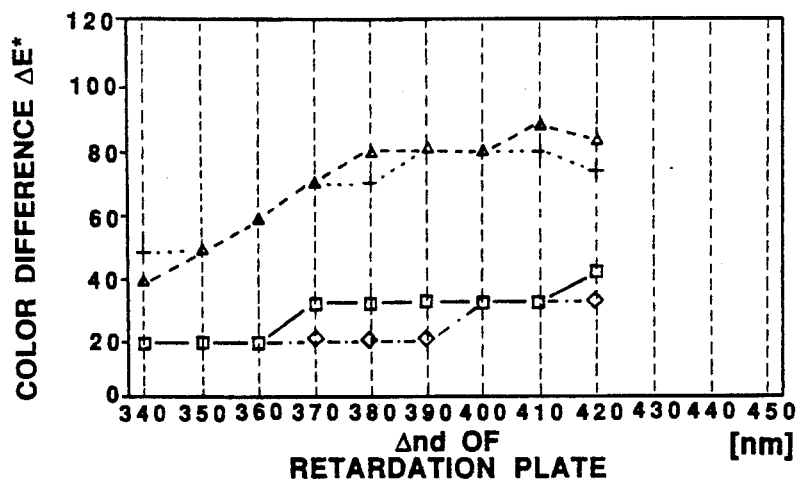
FIGS. 37A, 37B, and 37C are graphs respectively showing characteristics, for the three types of liquid crystal cells, which represent changes in maximum and minimum values of $\Delta E^*$ at a visual angle of 50° as a function of $\Delta n \cdot d$ of each biaxial retardation plate and each uniaxial retardation plate in the liquid crystal display device of the second embodiment.
Figure 37B:
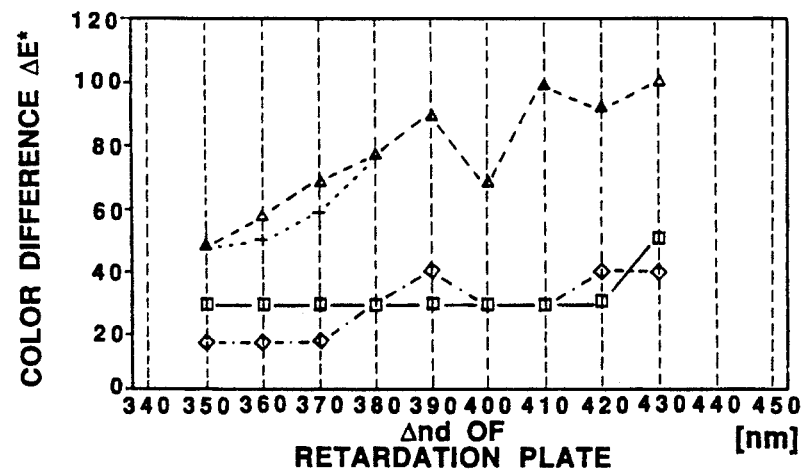
Figure 37C:
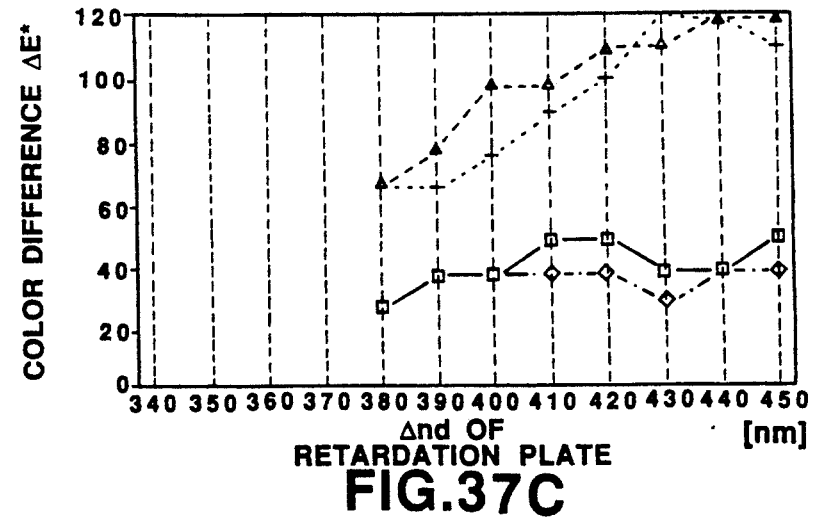

The respective visual angle characteristics in the range of 340 to 450 nm with the $n_Z$ ratio of each of the biaxial retardation plates 114 and 115 being fixed to 0.7 will be described below, in comparison with a case wherein uniaxial retardation plates are used, with reference to FIGS. 35A to 37C. FIGS. 35A, 36A, 37A show a case wherein the product $\Delta n_c \cdot d_c$ of the liquid crystal cell 101 is 800 nm. FIGS. 35B, 36B, and 37B show a case wherein the product $\Delta n_c \cdot d_c$ of the liquid crystal cell 101 is 860 nm. FIGS. 35C, 36C, and 37C show a case wherein the product $\Delta n_c \cdot d_c$ of the liquid crystal cell 101 is 910 nm.

FIGS. 35A to 35C respectively show the relationships between the ratios $\Delta n \cdot d$ of each phase plate and Y (transmittance) in an OFF state which represents leakage light at a visual angle of 50° in the three types of liquid cells. In these graphs, each white square (□) indicates a value obtained when the uniaxial retardation plates each having the $n_Z$ ratio=0.0 are used; and each plus (+), a value obtained when the biaxial retardation plates each having the $n_Z$ ratio=0.7 are used. It is apparent from these graphs that leakage of light is always suppressed more by using the biaxial retardation plates each having the $n_Z$ ratio=0.7 than by using the uniaxial retardation plates each having the $n_Z$ ratio=0.0. In addition, leakage of light more easily occurs as the product Δn·d is reduced. This tendency is very conspicuous when the uniaxial retardation plates are used. In the case of the biaxial retardation plates, if the product $\Delta n_c \cdot d_c$ of the liquid crystal cell 101 is 800 nm, leakage of light is suppressed most when the Δn·d of each of the biaxial retardation plates is close to 360 nm, as shown in FIG. 35A. If the product $\Delta n_c \cdot d_c$ of the liquid crystal cell 101 is 860 nm, leakage of light is suppressed most when the Δn·d of each of the biaxial retardation plates is close to 400 nm, as shown in FIG. 35B. If the product $\Delta n_c \cdot d_c$ of the liquid crystal cell 101 is 910 nm, leakage of light is suppressed most when the Δn·d of each of the biaxial retardation plates is close to 420 nm, as shown in FIG. 35C.

FIGS. 36A to 36C respectively show the relationships between the ranges of visual angles in which the contrast is 10 or more in the upward/downward and leftward/rightward directions and the products Δn·d of each uniaxial retardation plate for the $n_Z$ ratio=0.0 and each biaxial retardation plate for the $n_Z$ ratio=0.7 in the respective three types of liquid crystal cells. Referring to FIGS. 36A to 36C, each white square (□) indicates a visual angle at which contrast of 10 or more is obtained in the upward/downward direction when the uniaxial retardation plates each having the $n_Z$=0.0 are used. Similarly, each plus (+) indicates a visual angle at which contrast of 10 or more is obtained in the leftward/rightward direction when the uniaxial retardation plates each having the $n_Z$ ratio=0.0 are used. Each white rhombus (◊) indicates a visual angle at which contrast of 10 or more is obtained in the upward/downward direction when the biaxial retardation plates each having the $n_Z$ ratio=0.7 are used. Each white triangle (Δ) indicates a visual angle at which contrast of 10 or more is obtained in the leftward/rightward direction when the biaxial retardation plates each having the $n_Z$ ratio=0.7 are used. It is apparent from these graphs that when the uniaxial retardation plates are used, the differences between the visual angles at which contrast of 10 or more is obtained in the upward/downward direction and those in the leftward/rightward direction are large, and hence the azimuth dependence is high. In contrast to this, when the biaxial retardation plates each having the $n_Z$ ratio=0.7 are used, the differences between the visual angles at which contrast of 10 or more is obtained in the upward/downward direction and those in the leftward/rightward direction are very small regardless of the product Δn·d of the retardation plate, and hence the azimuth dependence is low, thus allowing a great improvement in viewing angle characteristics, as compared with the case wherein the uniaxial retardation plates are used. Similarly, in this case, if the product $\Delta n_c \cdot d_c$ of the liquid crystal cell 101 is 800 nm, optimal characteristics are obtained when the Δn·d of each retardation plate is close to 360 nm, as shown in FIG. 36A. If the product $\Delta n_c \cdot d_c$ of the liquid crystal cell 101 is 860 nm, optimal characteristics are obtained when the Δn·d of each retardation plate is close to 390 nm, as shown in FIG. 36B. If the product $\Delta n_c \cdot d_c$ of the liquid crystal cell 101 is 910 nm, optimal characteristics are obtained when the Δn·d of each retardation plate is close to 430 nm, as shown in FIG. 36C.

FIGS. 37A to 37C respectively show the maximum and minimum values of the color difference ΔE*, obtained when viewed at a visual angle of 50°, as a function of the Δn·d of each uniaxial retardation plate having the $n_Z$ ratio=0.0 and of each biaxial retardation plate having the $n_Z$ ration=0.7, in the three types of liquid crystal cells. Referring to FIGS. 37A to 37C, each white square (□) indicates a minimum value when the uniaxial retardation plates each having the $n_Z$ ratio=0.0 are used; each plus (+), a maximum value when the uniaxial retardation plates each having the $n_Z$ ratio=0.0 are used; each white rhombus (◊), a minimum value when the biaxial retardation plates each having the $n_Z$ ratio=0.7 are used; and each white triangle (Δ), a maximum value when the biaxial retardation plates each having the $n_Z$ ratio=0.7 are used. According to these graphs, the difference between the maximum and minimum values is reduced, and the azimuth dependence is improved as the product Δn·d is reduced. Furthermore, the characteristics associated with the maximum values of the color difference ΔE* are improved as the product Δn·d is reduced.

Third Embodiment

In the third embodiment, a uniaxial retardation plate and a biaxial retardation plate are arranged on one side of a liquid crystal cell in the order named from the cell side.

Figure 38:
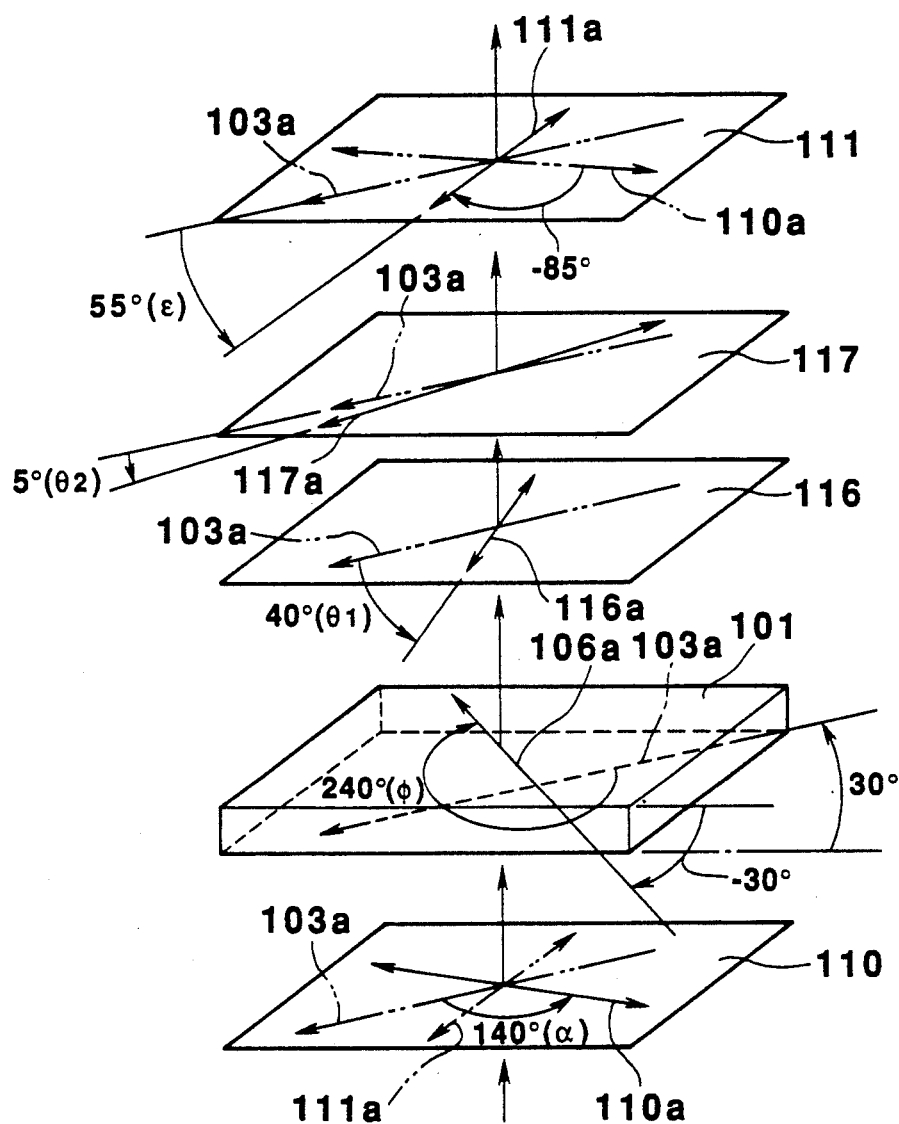
FIG. 38 is an exploded perspective view showing the schematic arrangement of a liquid crystal display device according to a third embodiment of the present invention.
Figure 39:
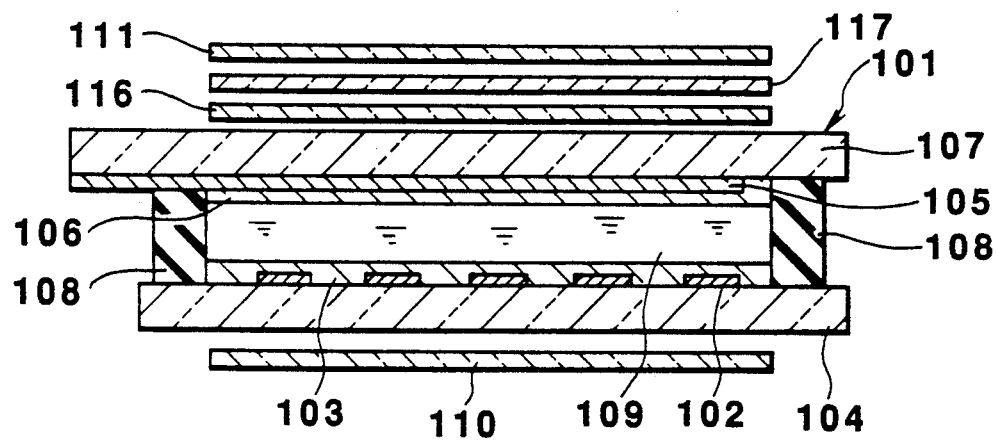
FIG. 39 is a sectional view showing the liquid crystal display device according to the third embodiment of the present invention.

FIGS. 38 and 39 are an exploded perspective view and a sectional view, respectively, of the third embodiment. A liquid crystal material 109 sealed in a liquid crystal cell 101 of this embodiment has a dielectric constant ratio $\Delta \epsilon / \epsilon \perp = 1.90$, an elastic constant ratio K3/K1=1.83, an elastic constant ratio K3/K2=2.40, and a ratio d/p of a gap d to a natural pitch p=0.5. The molecules of the liquid crystal material 109 are aligned at a pretilt angle of about 8× and are twisted at 240° (φ) in the negative rotational direction from an incident-side substrate 104 to an exit-side substrate 107. A product $\Delta n_c \cdot d_c$ of a gap $d_c$ and a refractive index anisotropy $\Delta n_c$ of the liquid crystal cell 101 preferably falls within the range of 800 to 900 nm and is set to be 864 nm (measurement wavelength: 589 nm) in the third embodiment.

A polarizer 110 constituted by a linearly polarizing plate is arranged on the incident side of the liquid crystal cell 101, whereas an analyzer 111 constituted by a linearly polarizing plate is arranged on the exit side of the liquid crystal cell 101. A uniaxial retardation plate 116 and a biaxial retardation plate 117 are arranged between the liquid crystal cell 101 and the analyzer 111. In the third embodiment, the uniaxial retardation plate 116 is arranged on the liquid crystal cell 101 side, and the biaxial retardation plate 117 is arranged on the analyzer 111 side. In addition, the two phase plates 116 and 117 consist of polycarbonate.

The polarizer 110 is arranged such that its transmission axis 110a is inclined at an angle of about 140° (α) with respect to an incident-side aligning treatment direction 103a. The analyzer 111 is arranged such that its transmission axis 111a is inclined at an angle of about 55° (ε) with respect to the incident-side aligning treatment direction 103a. Therefore, the transmission axis 111a of the analyzer 111 is set at an angle of −85° with respect to the transmission axis 110a of the polarizer 110.

The uniaxial retardation plate 116 is formed to satisfy $$n_Y = n_Z < n_X \tag{2}$$

where $n_X$ is the refractive index in the extending direction of the retardation plate, $n_Y$ is the refractive index in the direction perpendicular to the extending direction, and $n_Z$ is the refractive index in the direction of thickness. The respective refractive indexes of the uniaxial retardation plate 1116 in the third embodiment are:
$n_X = 1.587$ (measurement wavelength: 589 nm)
$n_Y = n_Z = 1.580$ (measurement wavelength: 589 nm)
The biaxial retardation plate 117 is formed to satisfy $$n_Y < n_Z < n_X \qquad (3)$$

The respective refractive indexes of the biaxial phase plate 117 in the third embodiment are:
$n_X = 1.586$ (measurement wavelength: 589 nm)
$n_Y = 1.580$ (measurement wavelength: 589 nm)
$n_Z = 1.584$ (measurement wavelength: 589 nm)
Note that the extending directions of the two phase plates 116 and 117 respectively coincide with phase delay axes 116a and 117a.

A product $\Delta n \cdot d$ of a refractive index anisotropy $\Delta n$ ($= n_X - n_Y$) and a thickness d of each of the phase plates 116 and 117 falls within the range of 300 to 400 nm (measurement wavelength: 589 nm) and is preferably set to be about 365 nm (measurement wavelength: 589 nm). In the third embodiment, the product $\Delta n \cdot d$ of the uniaxial retardation plate 116 is 365 nm, and the product $\Delta n \cdot d$ of the biaxial retardation plate 117 is 367 nm.

The uniaxial retardation plate 116 is arranged such that the phase delay axis 116a is inclined at about 40° ($\theta_1$) with respect to the incident-side aligning treatment direction 103a. The biaxial retardation plate 117 is arranged such that the phase delay axis 117a is inclined at about 5° ($\theta_2$) with respect to the incident-side aligning treatment direction 103a.

In the liquid crystal display device having the above-described arrangement, the difference in phase difference between light obliquely transmitted through the liquid crystal cell 101 and light vertically transmitted therethrough is almost completely corrected by the uniaxial retardation plate 116 and the biaxial retardation plate 117 arranged between the liquid crystal cell 101 and the analyzer 111. As a result, the viewing angle is increased, and the visual angle dependence of display colors is reduced, thus greatly improving the visual angle characteristics, as will be described below.

Figure 40A:
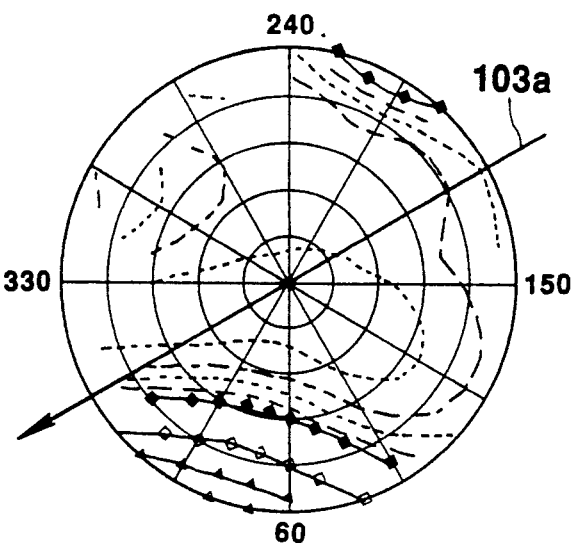
FIGS. 40A, 40B, and 40C are equi-brightness curve charts of dark and bright states and an equi-contrast curve chart in the liquid crystal display device of the third embodiment.
Figure 40B:
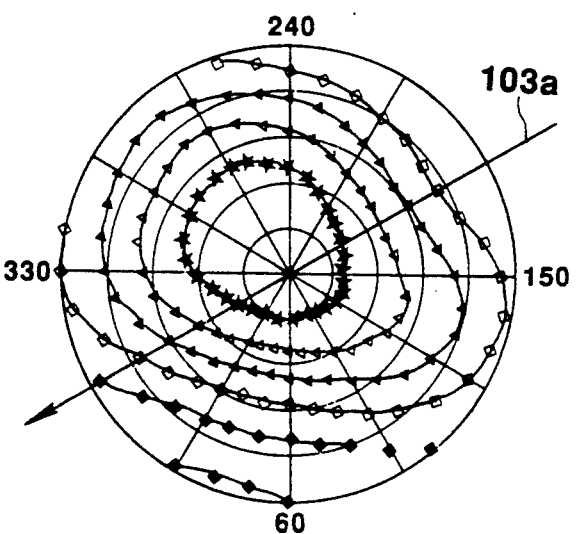
Figure 40C:
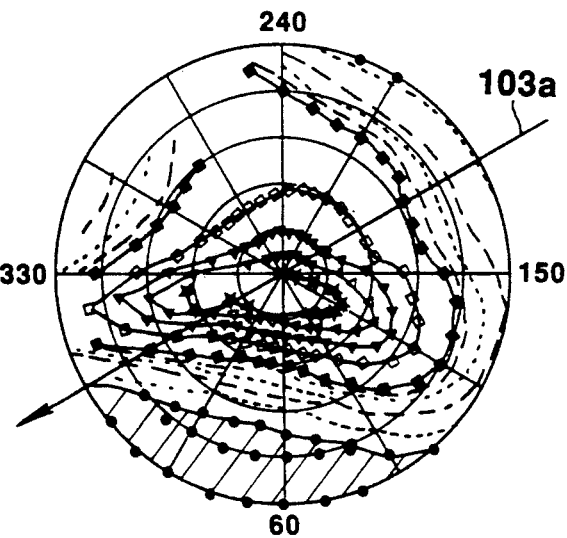
Figure 41A:
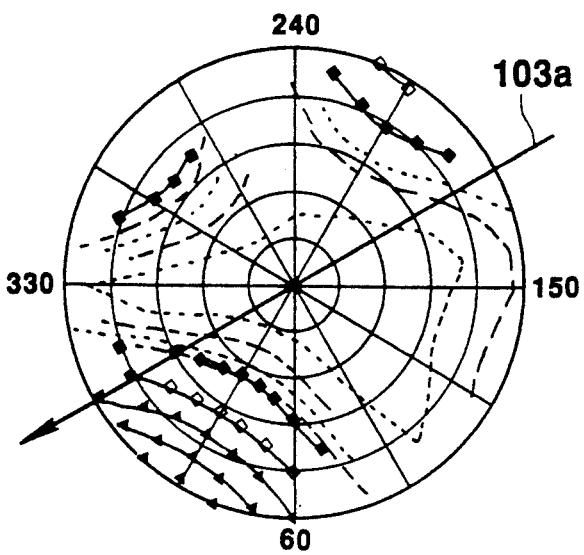
FIGS. 41A, 41B, and 41C are equi-brightness curve charts of dark and bright states and an equi-contrast curve chart in a comparative example of the third embodiment.
Figure 41B:
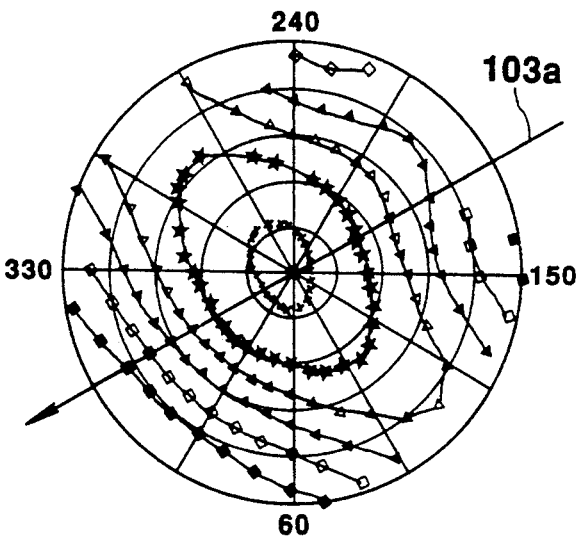
Figure 41C:
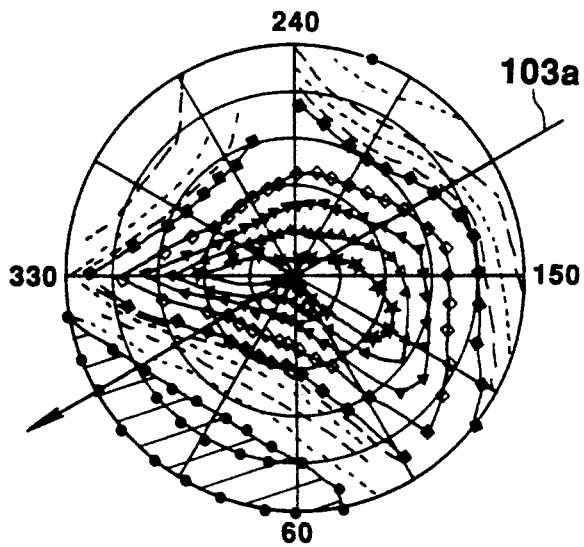

FIGS. 40A to 40C are equi-brightness curve charts in dark and bright states, respectively, and an equi-contrast curve chart associated with the liquid crystal display device of the third embodiment. FIGS. 41A to 41C are equi-brightness curve charts in dark and bright states, respectively, and an equi-contrast curve chart associated with a comparative example in which two uniaxial retardation plates are arranged on the exit side of the liquid crystal cell 101. In each chart, the concentric circles respectively represent, from the innermost circle, visual angles of 10°, 20°, 30°, 40°, and 50° with respect to the normal direction of the display surface of the liquid crystal display device, and each radiating line indicates the azimuth angle of the display surface. Referring to FIGS. 40A and 40B, and 41A and 41B, each black square (■) represents a transmittance of 10%; each white square (□), a transmittance of 20%; each black triangle (▲), a transmittance of 30%; each white triangle (△), a transmittance of 40%; and each black star (★), a transmittance of 50%. Referring to FIGS. 40C and 41C, each black circle (●), represents that the contrast is less than 1, i.e., brightness/darkness inversion occurs. Similarly, each black square (■) represents that the contrast is 10; each white square (□), 20; each black triangle (▲), 30; and each white triangle (△), 40.

As is apparent from comparison between FIGS. 40A and 41A, the amount of leakage light is smaller and the dark region is wider in the third embodiment than in the comparative example. Therefore, as shown in FIG. 40C, the region where the contrast is 10 or more is wider than that in the comparative example shown in FIG. 41C, although inversion regions are present in the azimuth angle range of 0° to 100° and about an angle 210° in the third embodiment.

Figure 42A:
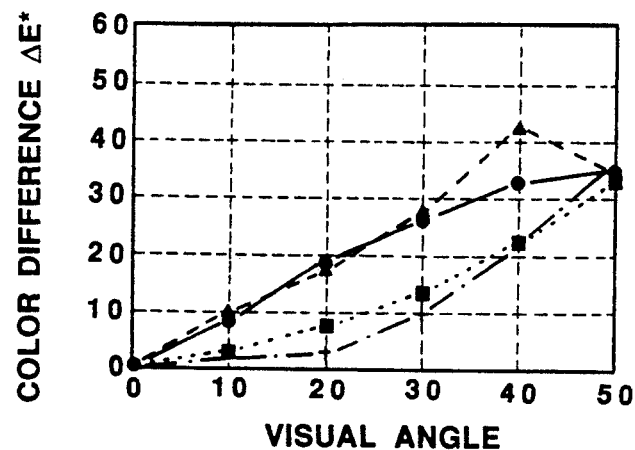
FIGS. 42A, 42B, and 42C are graphs respectively showing color difference $\Delta E^*$, brightness index difference $\Delta L^*$, and chroma difference $\Delta C^*$ characteristics with respect to visual angles for the upward/downward and leftward/rightward directions in the liquid crystal display device of the third embodiment.
Figure 42B:
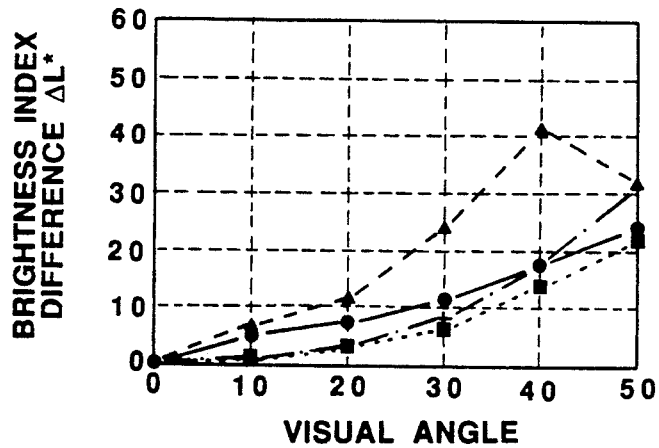
Figure 42C:
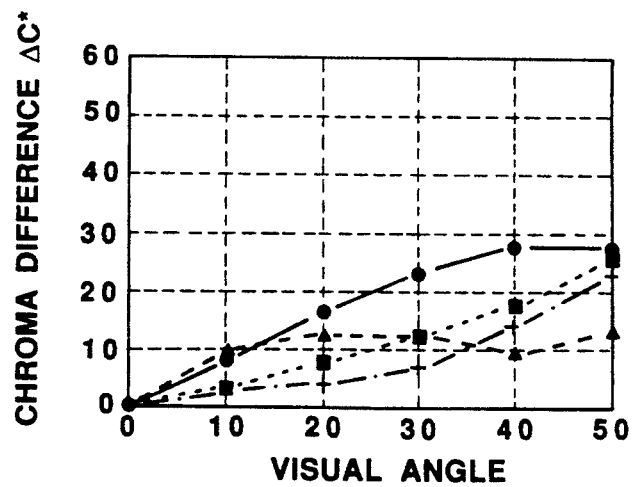
Figure 43A:
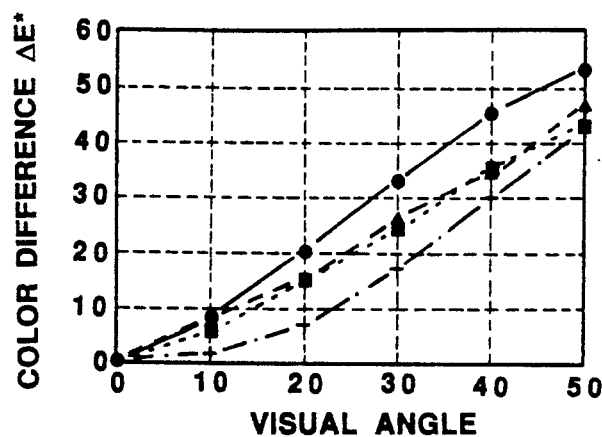
FIGS. 43A, 43B, and 43C are graphs respectively showing color difference $\Delta E^*$, brightness index difference ΔL*. and chroma difference ΔC* characteristics with respect to visual angles for the upward/downward and leftward/rightward directions in the comparative example of the third embodiment.
Figure 43B:
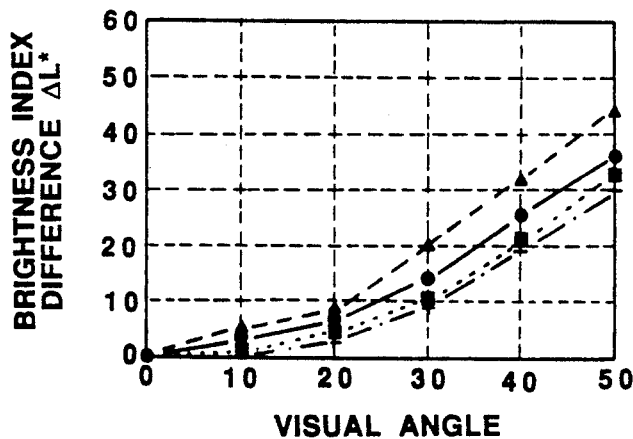
Figure 43C:
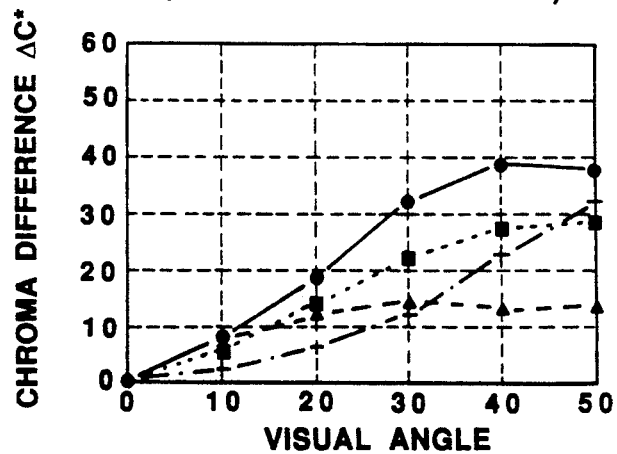

FIGS. 42A to 42C are graphs respectively showing the visual angle dependence of a color difference $\Delta E^*$, a brightness index difference $\Delta L^*$, and a chroma difference $\Delta C^*$ in the four directions, i.e., the upward/downward and leftward/downward directions (azimuth angles: 240°, 60°, 330°, 150°) in the third embodiment. FIGS. 43A to 43C are graphs respectively showing the visual angle dependence of a color difference $\Delta E^*$, a brightness index difference $\Delta L^*$, and a chroma difference $\Delta C^*$ in the four directions, i.e., the upward/downward and leftward/rightward directions (azimuth angles: 240°, 60°, 330°, 150°) in the liquid crystal display device as the comparative example in which the two uniaxial phase plates are arranged between the liquid crystal cell 101 and the analyzer 111. According to these graphs, the visual angle dependence of the color difference $\Delta E^*$ in three directions excluding the downward direction (azimuth angle: 60°) is lower than that in the comparative example.

As described above, if a uniaxial retardation plate and a biaxial retardation plate are arranged between an STN liquid crystal cell and an analyzer in the order named from the cell side, a large viewing angle is set, and the visual angle dependence of display colors is reduced, thus greatly improving the visual angle characteristics, as compared with the case wherein two uniaxial retardation plates are arranged.

The dependence of the respective visual angle characteristics of the liquid crystal display device of the third embodiment on the $n_Z$ ratio of the biaxial retardation plate 117 will be described next. Note that when the $n_Z$ ratio is 0, $n_Z = n_Y$, which indicates a uniaxial retardation plate. This state, therefore, corresponds to the arrangement of the above-described comparative example in which the two uniaxial retardation plates are arranged between the liquid crystal cell and the analyzer. Each concentric circle and each radiating line in the following equi-brightness, equi-contrast, equi-$\Delta E^*$, equi-$\Delta L^*$, and equi-$\Delta C^*$ curve charts respectively indicate a visual angle and an azimuth angle, similar to the above-described equi-curve charts.

FIGS. 44A to 44D are respectively equi-contrast curve charts in the comparative example in which the $n_Z$ ratio is set to be 0.0, and in cases wherein the biaxial retardation plate 117 is sequentially replaced with biaxial retardation plates having three different $n_Z$ ratios, i.e., 0.3, 0.5, and 0.7. In each chart, each black circle (●) represents that the contrast is less than 1, i.e., brightness/darkness inversion occurs. Similarly, each black square (■) represents that the contrast is 10; each white square (□), 50; each black triangle (▲), 100; each white triangle (△), 150; each black star (★), 200; each white star (☆), 250; and each plus (+), 300.

As is apparent from these charts, the regions in which the contrast is 10 or 50 or more in the cases of the $n_Z$ ratio = 0.3 and 0.5 are larger than those in the case of the $n_Z$ ratio = 0.0. In the case of the $n_Z$ ratio = 0.7, the region in which the contrast is 10 or more is further broadened, and the inversion region is also broadened.

FIGS. 45A to 45D are equi-brightness curve charts respectively indicating leakage of light in an OFF state for four different values of the $n_Z$ ratio. In each chart, each black square (■) represents a transmittance of 10%; each white square (□), a transmittance of 20%; each black triangle (▲), a transmittance of 30%; each white triangle (△), a transmittance of 40%; and each black star (★), a transmittance of 50%. As is apparent from these charts, the amount of leakage light is relatively small when the $n_Z$ ratios are 0.3 and 0.5.

FIGS. 46A to 48D show the respective visual angle characteristics associated with the color difference $\Delta E^*$, the brightness index difference $\Delta L^*$, and the chroma difference $\Delta C^*$ in the liquid crystal display device of the third embodiment.

FIGS. 46A to 46D, 47A to 47D, and 48A to 48D are respectively equi-$\Delta E^*$ curve charts, equi-$\Delta L^*$ curve charts, and equi-$\Delta C^*$ curve charts for the four different values of the $n_Z$ ratio. In each chart, each black square (■) represents a characteristic value of 10; each white square (□), a characteristic value of 20; each black triangle (▲), a characteristic value of 30; each white triangle (△), a characteristic value of 40; each black star (★), a characteristic value of 50; each white star (☆), a characteristic value of 60; each plus (+), a characteristic value of 70; and each cross (×), a characteristic value of 80. According to these charts, in either one of the three types of characteristics, when the $n_Z$ ratios are 0.3 and 0.5, the equi-curves become closer in shape to concentric circles than those in the comparative example in which the $n_Z$ ratio is 0.0, and hence an improvement is made in terms of azimuth dependence. That is, when the $n_Z$ ratios are 0.3 and 0.5, the azimuth dependence of the color difference $\Delta E^*$ characteristics, the brightness index difference $\Delta L^*$ characteristics, and the chroma difference $\Delta C^*$ characteristics is lower than that in the comparative example.

As described above, the uniaxial retardation plate 116 and the biaxial retardation plate 117 are arranged between the liquid crystal cell 101 and the analyzer 111 in the order named from the liquid crystal cell 101 side, and the biaxial retardation plate 117 is formed to satisfy $$n_Y < n_Z \leq n_Y + 0.5 \cdot \Delta n \quad (3)$$

for $\Delta n = n_X - n_Y$
where $n_X$ is the refractive index in the extending direction, $n_Y$ is the refractive index in the direction perpendicular to the extending direction, and $n_Z$ is the refractive index in the direction of thickness. With this arrangement, similar to the first embodiment, a wide viewing angle can be set. In addition, not only the visual angle dependence of display colors but also the azimuth dependence of display colors can be reduced.

Fourth Embodiment

In the fourth embodiment, the positions of the uniaxial retardation plate and the biaxial retardation plate in the third embodiment are switched. More specifically, as indicated by the exploded perspective view of FIG. 49, a biaxial retardation plate 118 and a uniaxial retardation plate 119 are arranged between a liquid crystal cell 101 and an analyzer 111 in the order named from the liquid crystal cell 101 side. In this case, the biaxial retardation plate 118 is arranged such that a phase delay axis 118a is inclined at 40° ($\theta_2$) with respect to an incident-side aligning treatment direction 103a, while the uniaxial retardation plate 119 is arranged such that a phase delay axis 119a is inclined at 5° ($\theta_1$) with respect to the incident-side aligning treatment direction 103a. The biaxial retardation plate 118 in this embodiment is formed such that the refractive indexes $n_X$, $n_Y$, and $n_Z$ in the three directions satisfy inequality (3). Other arrangements are the same as those in the third embodiment.

Figure 49:
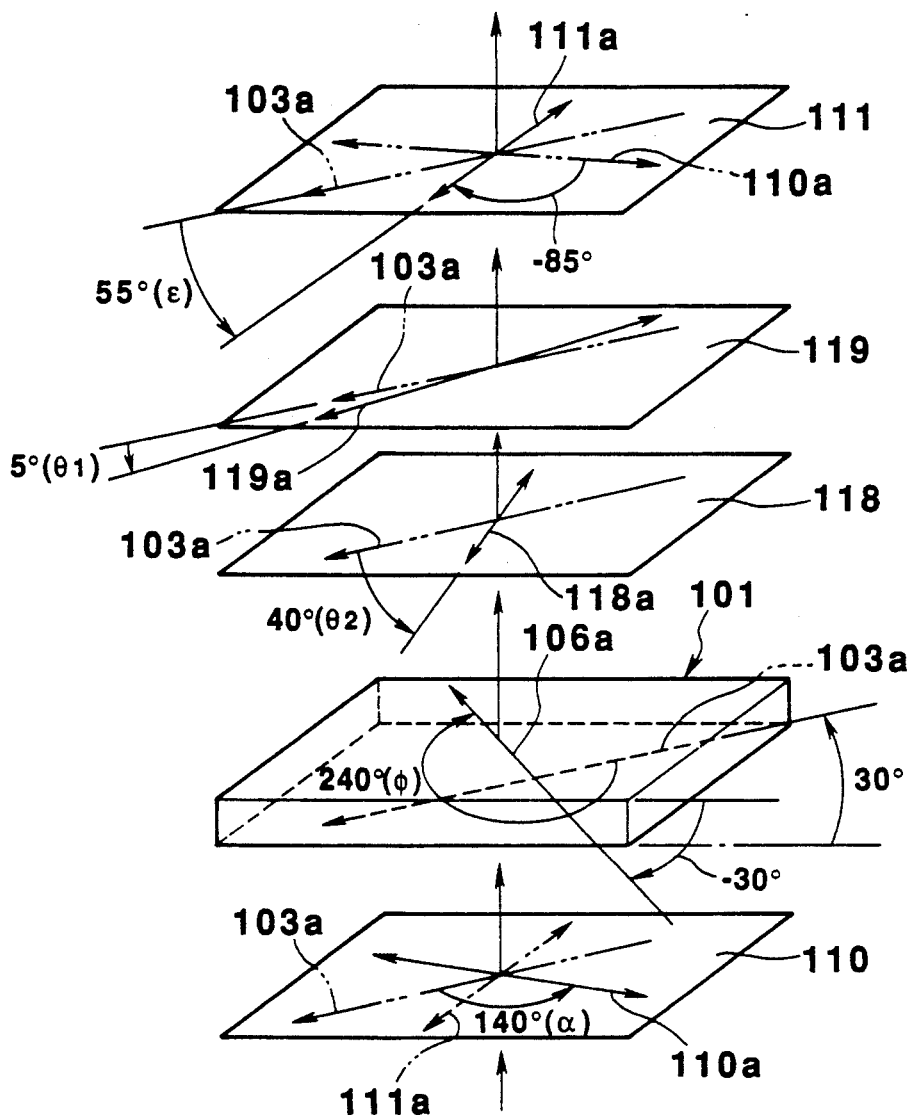
FIG. 49 is an exploded perspective view showing the schematic arrangement of a liquid crystal display device according to the a embodiment of the present invention.
Figure 50A:
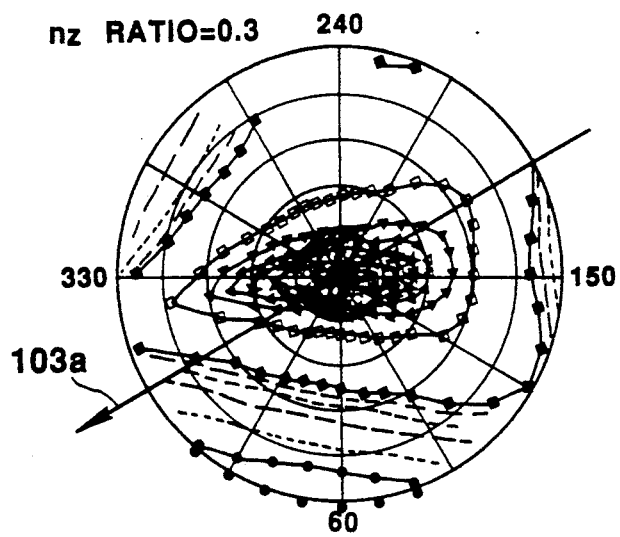
FIGS. 50A, 50B, and 50C are equi-contrast curve charts for three different values of the $n_Z$ ratio in the liquid crystal display device of the fourth embodiment.
Figure 50B:
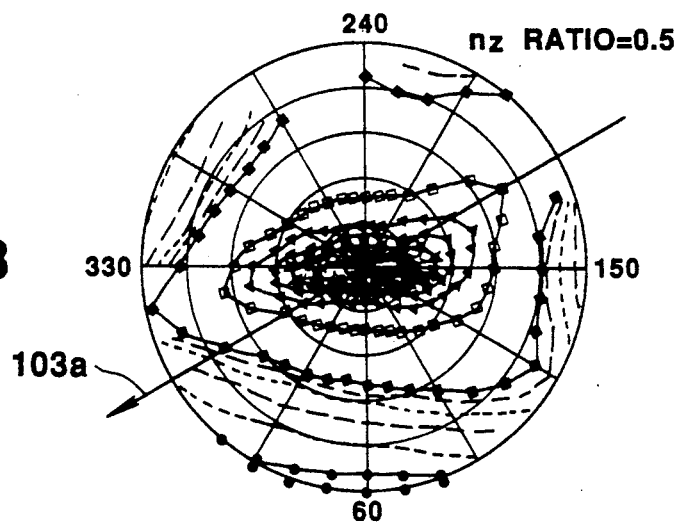
Figure 50C:
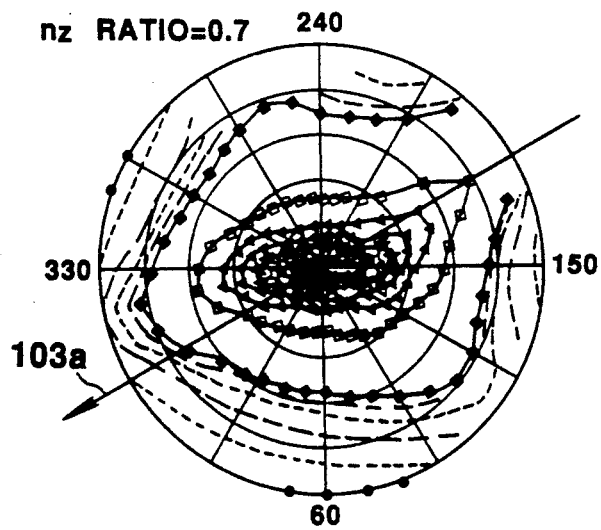

FIGS. 50A to 50C are equi-contrast curve charts respectively obtained when the biaxial retardation plate 118 arranged in the liquid crystal display device shown in FIG. 49 is replaced with biaxial retardation plates having three different $n_Z$ ratios, i.e., 0.3, 0.5, and 0.7. In each chart, each black circle (●), represents that the contrast is less than 1, i.e., brightness/darkness inversion occurs. Similarly, each black square (■) represents that the contrast is 10; each white square (□), 50; each black triangle (▲), 100; each white triangle (△), 150; each black star (★), 200; each white star (☆), 250; and each plus (+), 300.

Figure 44A:
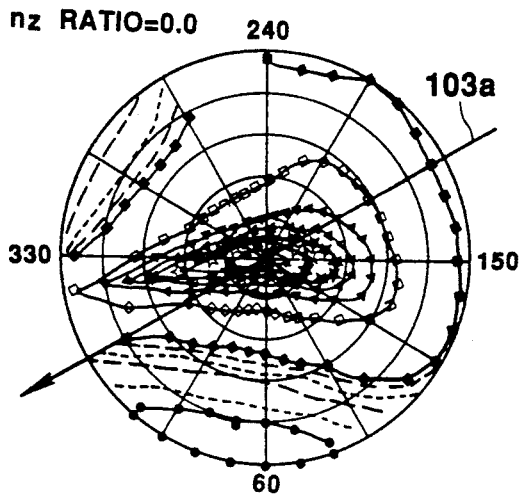
FIGS. 44A, 44B, 44C, and 44D are an equi-contrast curve chart in the comparative example and equi-contrast curve charts for three different values of the $n_Z$ ratio in the liquid crystal display device of the third embodiment.
Figure 44B:
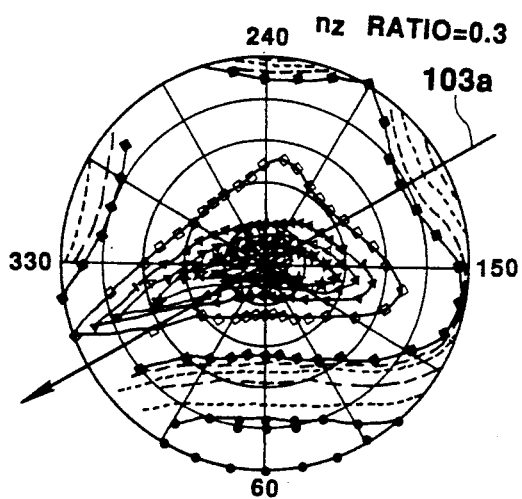
Figure 44C:
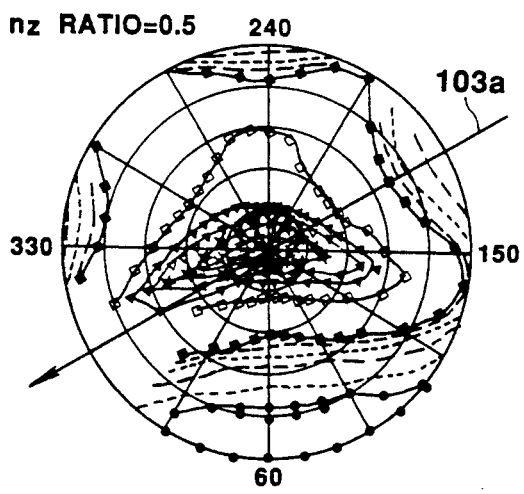
Figure 44D:
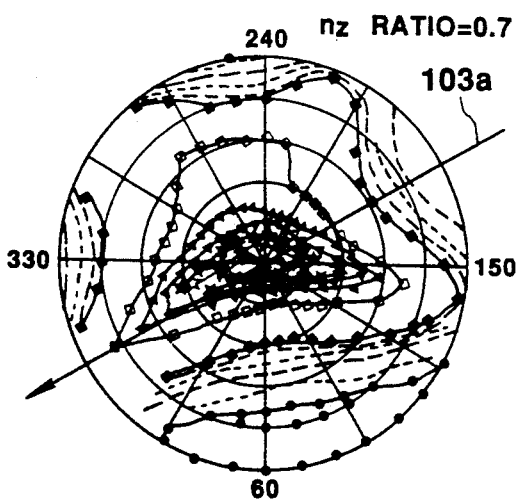
Figure 45A:
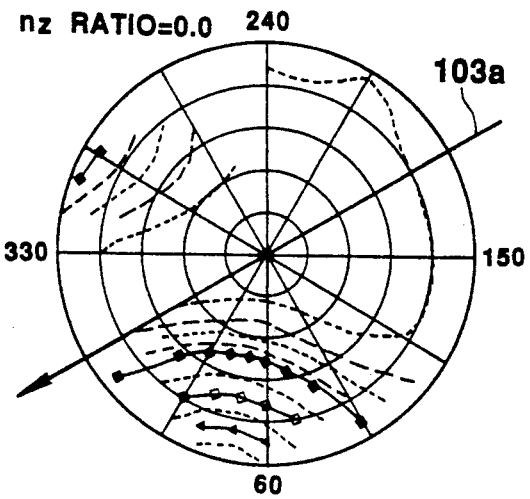
FIGS. 45A, 45B, 45C, and 45D are an equi-Y curve chart in the comparative example and equi-Y curve charts for the three different values of the $n_Z$ ratio in the liquid crystal display device of the third embodiment.
Figure 45B:
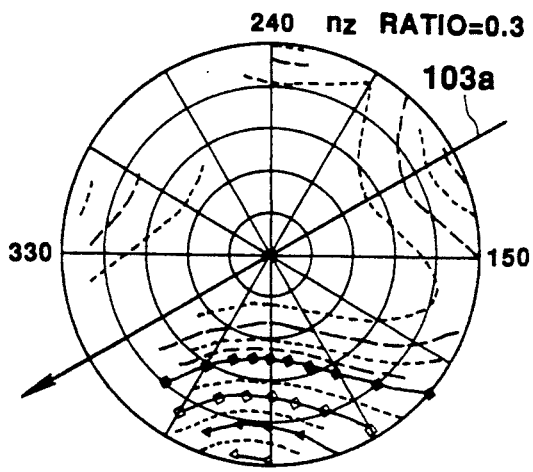
Figure 45C:
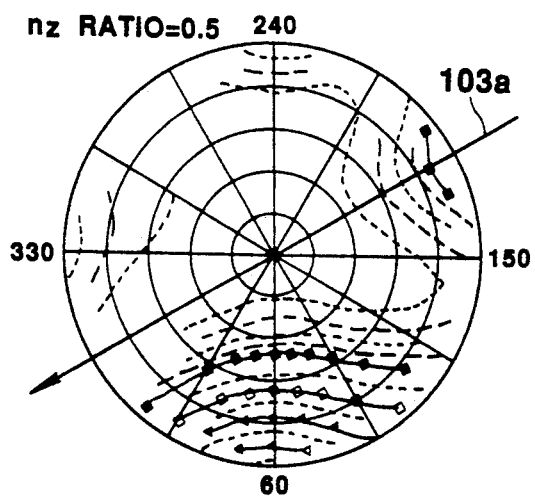
Figure 45D:
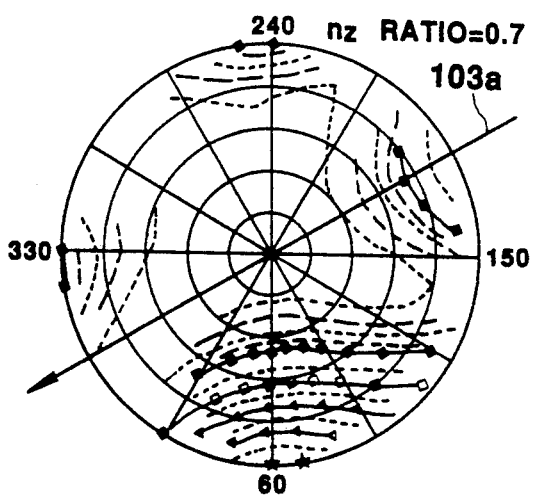
Figure 46A:
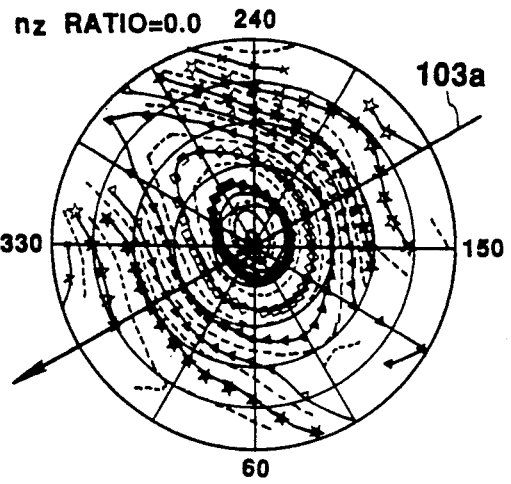
FIGS. 46A, 46B, 46C, and 46D are an equi-ΔE* curve chart in the comparative example and equi-ΔE* curve charts for the three different values of the $n_Z$ ratio in the liquid crystal display device of the third embodiment.
Figure 46B:
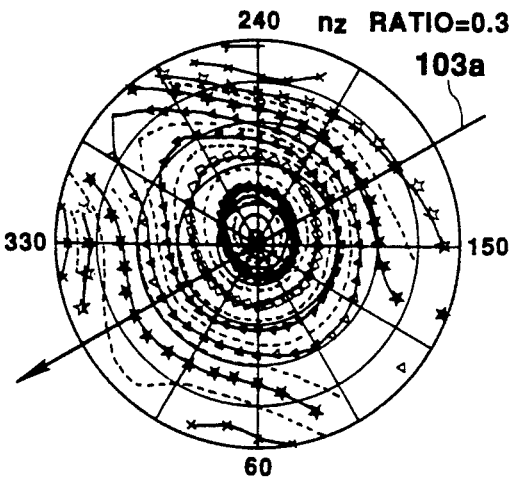
Figure 46C:
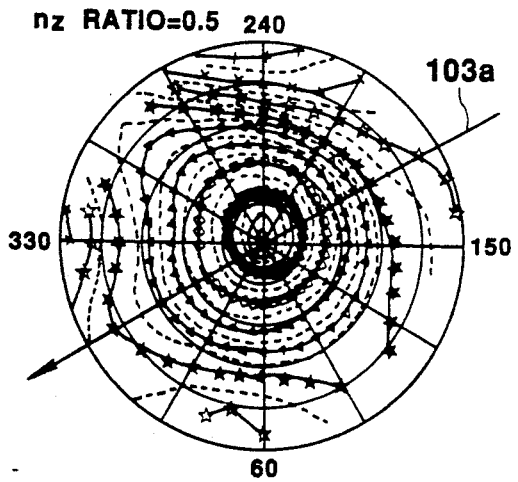
Figure 46D:
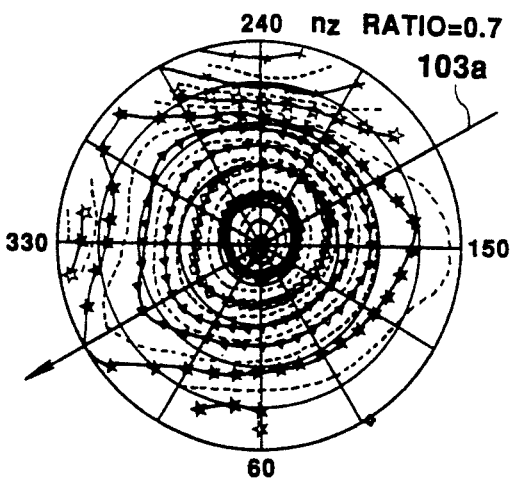
Figure 47A:
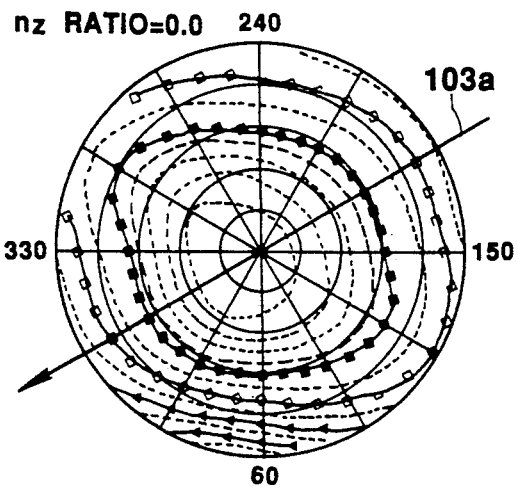
FIGS. 47A, 47B, 47C, and 47D are an equi-ΔL* curve chart in the comparative example and equi-ΔL* curve charts for the three different values of the $n_Z$ ratio in the liquid crystal display device of the third embodiment.
Figure 47B:
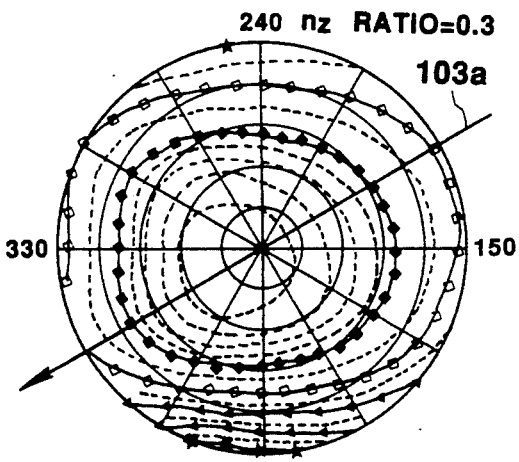
Figure 47C:
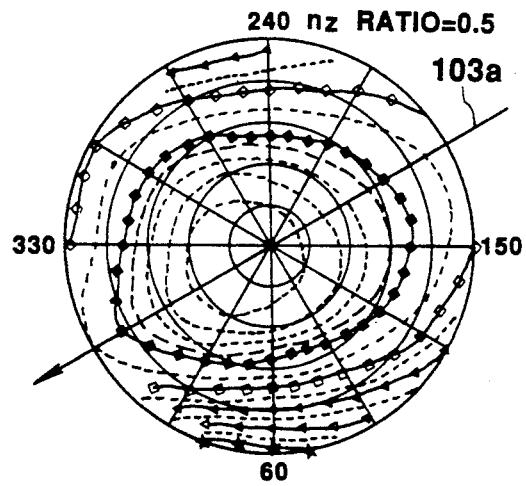
Figure 47D:
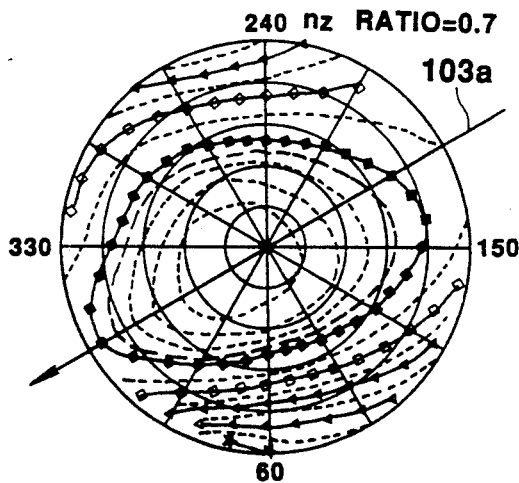
Figure 48A:
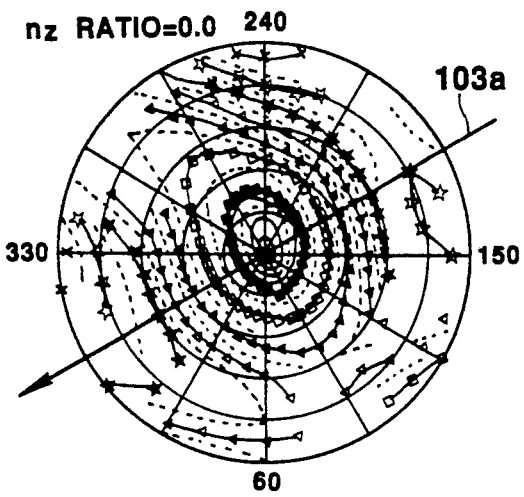
FIGS. 48A, 48B, 48C, and 48D are an equi-ΔC* curve chart in the comparative example and equi-ΔC* curve charts for the three different values of the $n_Z$ ratio in the liquid crystal display device of the third embodiment.
Figure 48B:
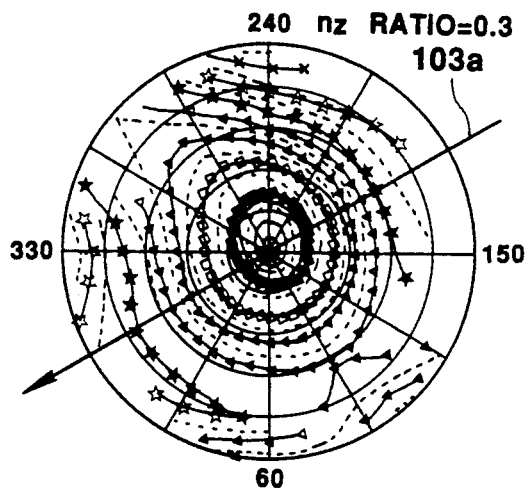
Figure 48C:
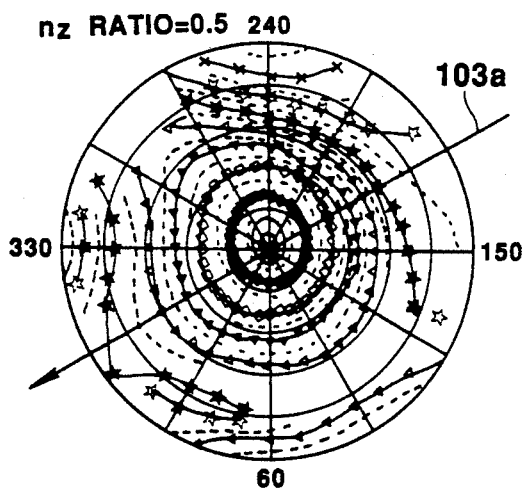
Figure 48D:
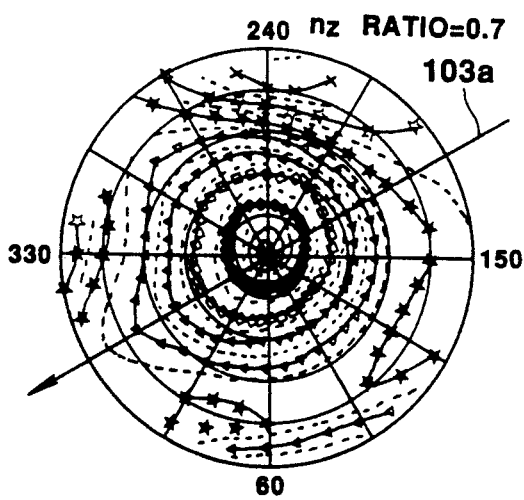

In the cases wherein the $n_Z$ ratio is set to be 0.3 and 0.5 to satisfy inequality (3) are compared with the comparative example shown in FIG. 44A in which the $n_Z$ ratio is 0.0, it is apparent that the inversion region is considerably reduced. When the $n_Z$ ratio is 0.7, the inversion region is further reduced, and the region where the contrast is 10 or more is also slightly reduced.

Figure 51A:
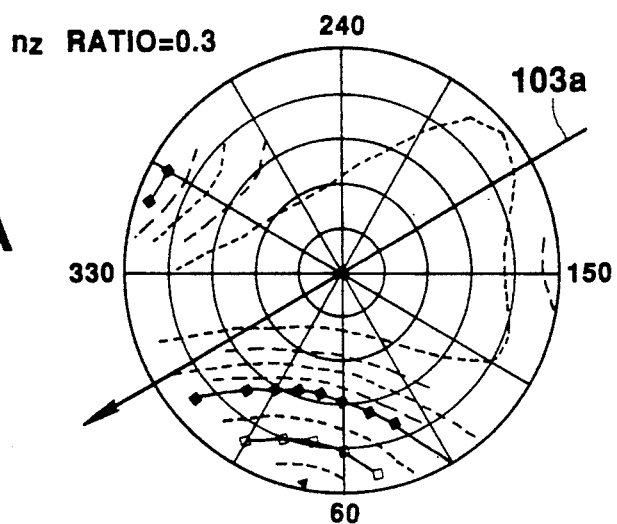
FIGS. 51A, 51B, and 51C are equi-Y curve charts for the three different values of the $n_Z$ ratio in the liquid crystal display device of the fourth embodiment.
Figure 51B:
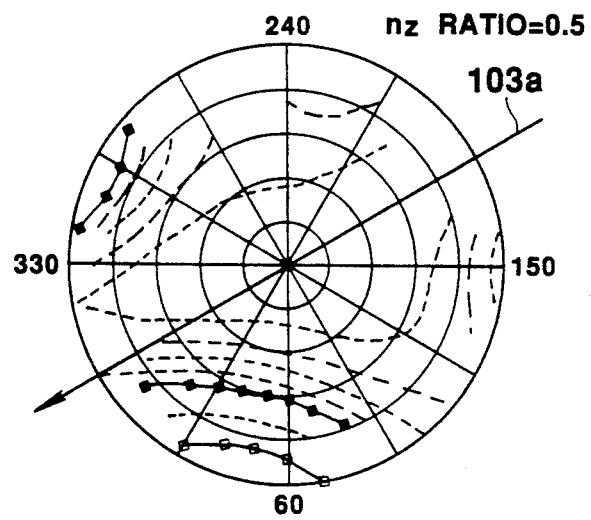
Figure 51C:
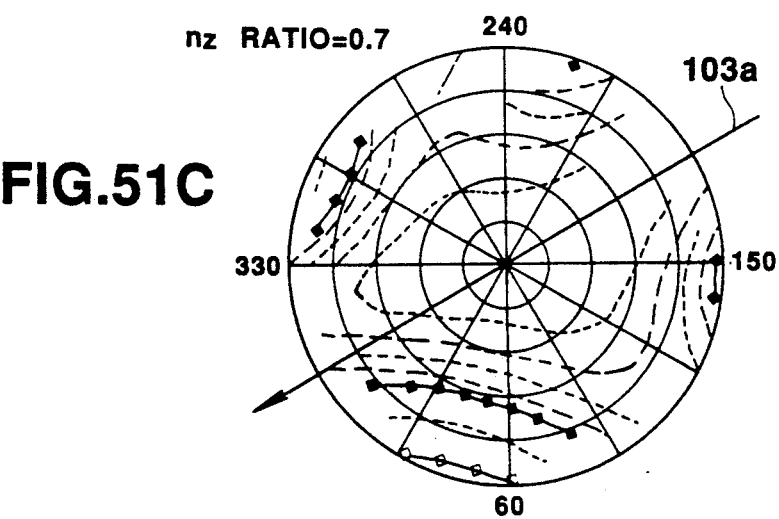
Figure 52A:
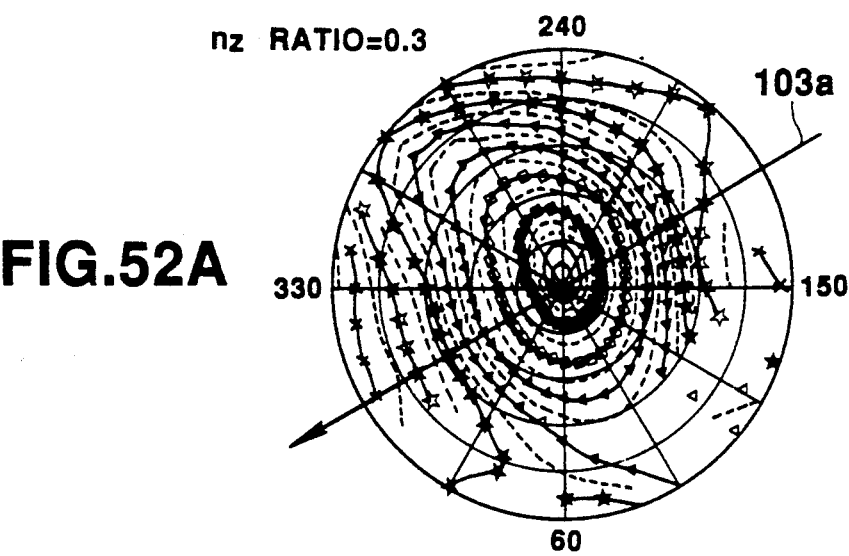
FIGS. 52A, 52B, and 52C are equi-ΔE* curve charts for the three different values of the $n_Z$ ratio in the liquid crystal display device of the fourth embodiment.
Figure 52B:
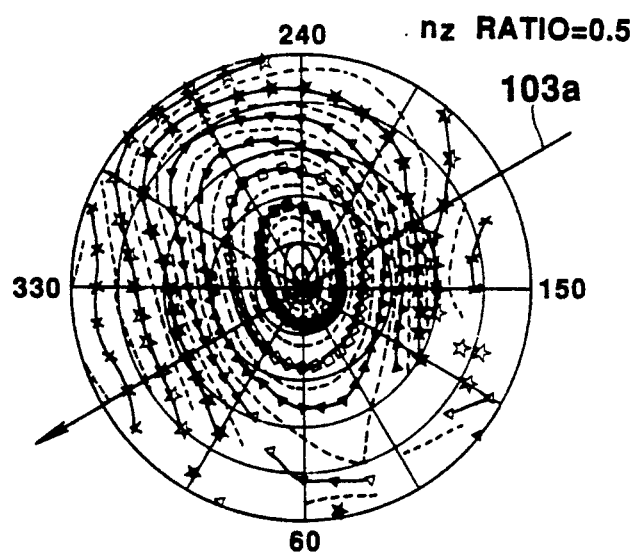
Figure 52C:
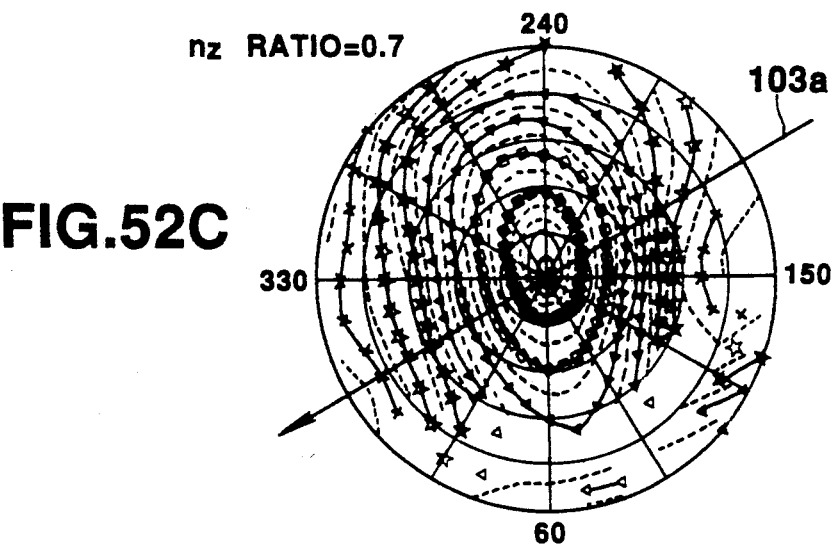
Figure 53A:
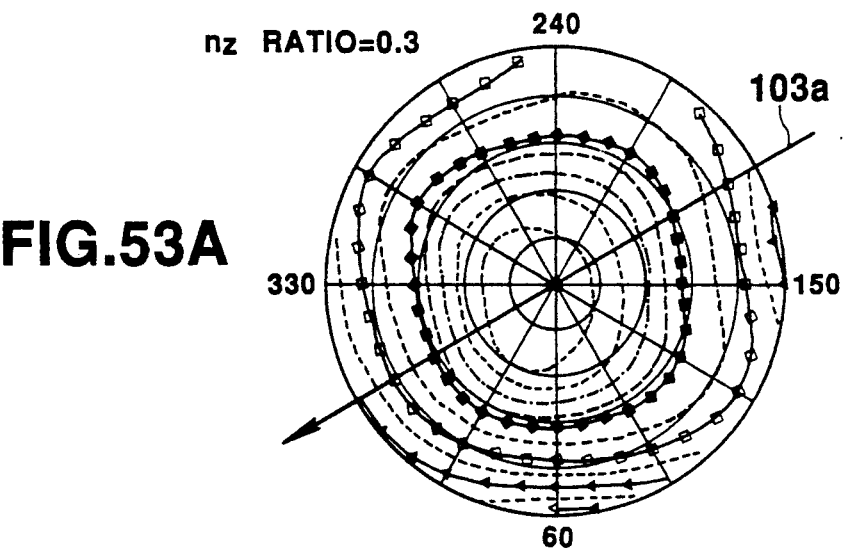
FIGS. 53A, 53B, and 53C are equi-ΔL* curve charts for the three different values of the $n_Z$ ratio in the liquid crystal display device of the fourth embodiment.
Figure 53B:
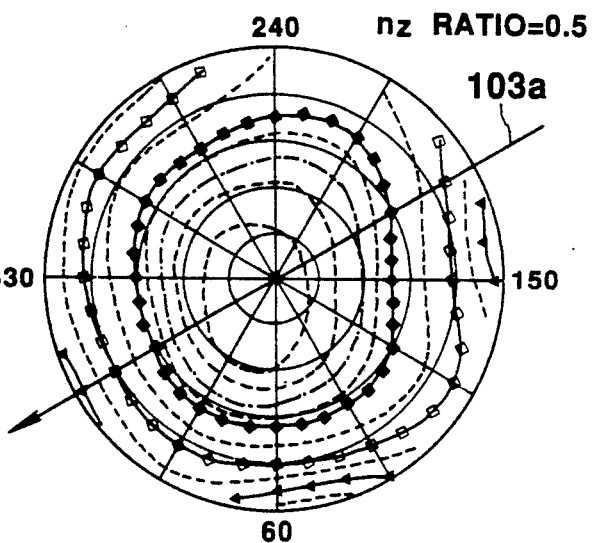
Figure 53C:
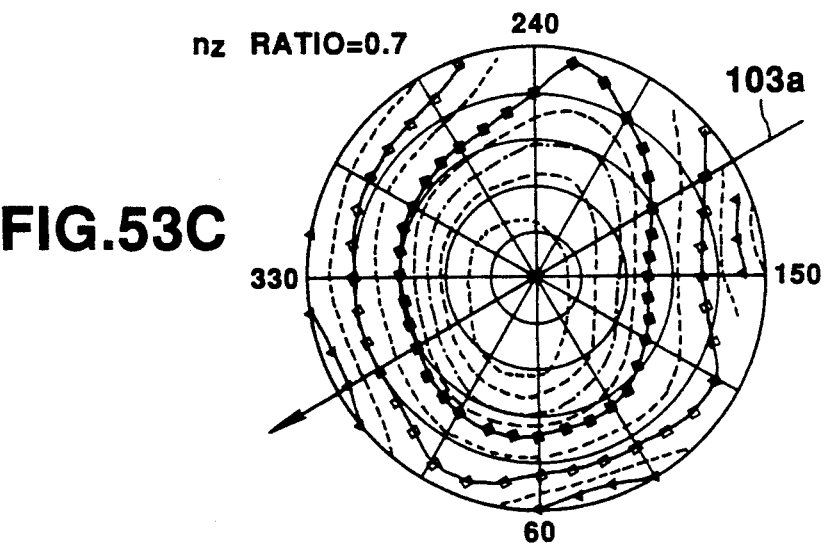
Figure 54A:
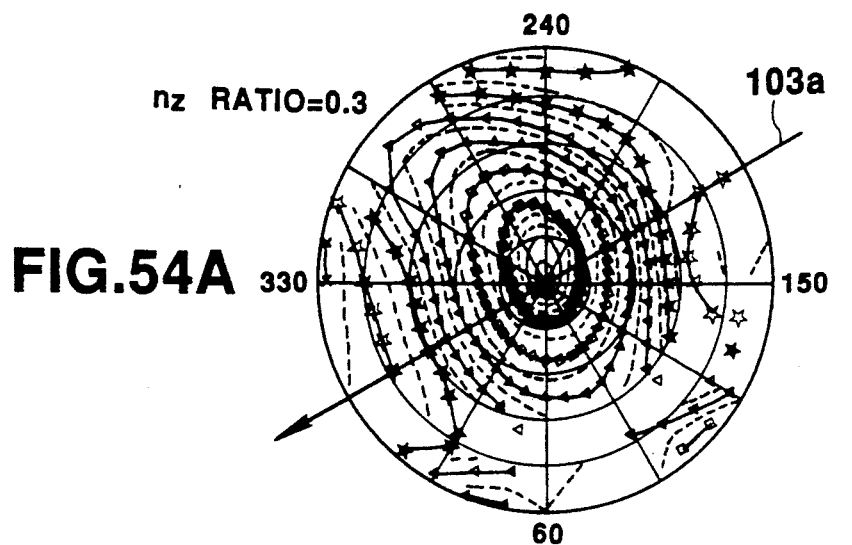
FIGS. 54A, 54B, and 54C are equi-ΔC* curve charts for the three different values of the $n_Z$ ratio in the liquid crystal display device of the fourth embodiment.
Figure 54B:
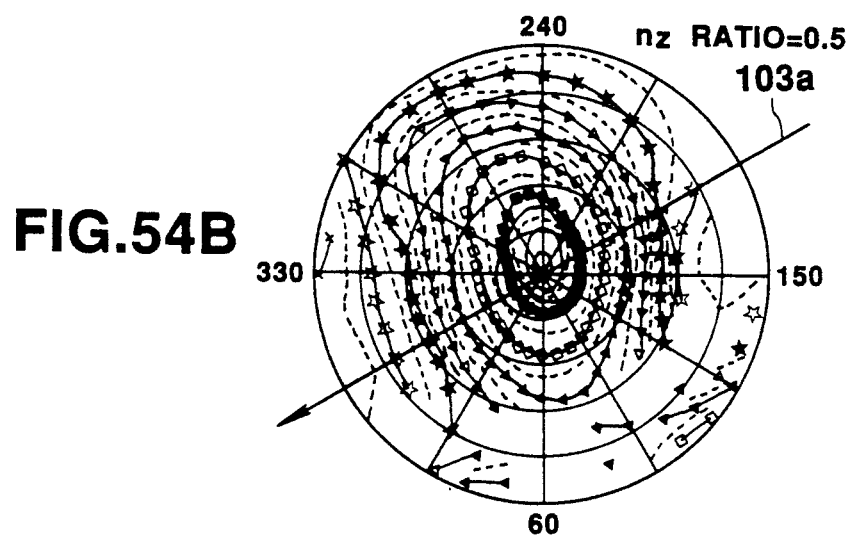
Figure 54C:
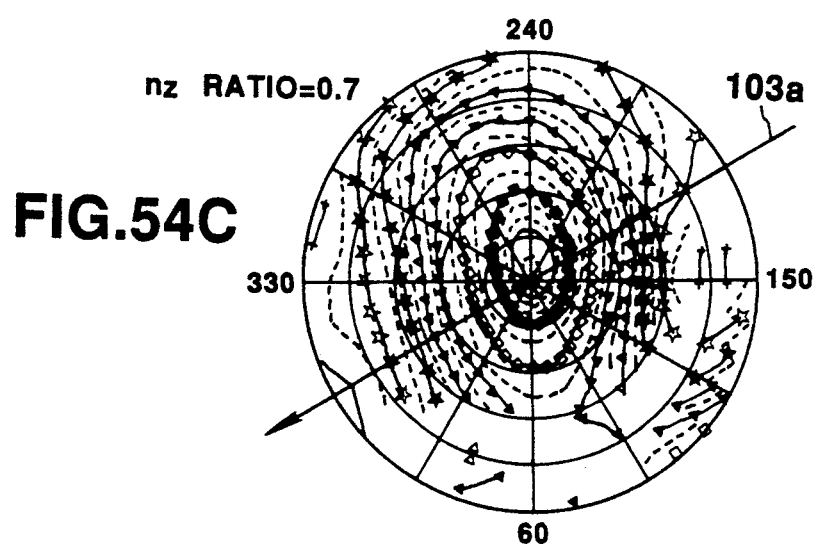

As indicated by the equi-Y curve charts of FIGS. 51A to 51C, good light leakage characteristics in an OFF state can be obtained in both the cases wherein the $n_Z$ ratios are 0.3 and 0.5. Especially in the case of the $n_Z$ ratio=0.5, the amount of leakage light is reduced. In this case, each black square (■) represents a transmittance of 10%; each white square (□), a transmittance of 20%; and each black triangle (▲), 30%.

FIGS. 52A to 54C respectively show the color difference $\Delta E^*$, brightness index difference $\Delta L^*$, and chroma difference $\Delta C^*$ characteristics of an STN-LCD in the fourth embodiment. In each chart, each black square (■) represents a characteristic value of 10; each white square (□), a characteristic value of 20; each black triangle (▲), a characteristic value of 30; each white triangle (△), a characteristic value of 40; each black star (★), a characterisitc value of 50; each white star (☆), a characteristic value of 60; and each plus (+), a characteristic value of 70.

FIGS. 52A to 52C, 53A to 53C, and 54A to 54C are equi-$\Delta E^*$ curve charts, equi-$\Delta L^*$ curve charts, and equi-$\Delta C^*$ curve charts, respectively, for three different $n_Z$ ratios, i.e., 0.3, 0.5, and 0.7. As indicated by these charts, in either one of the three types of characteristics, when the $n_Z$ ratios are 0.3 and 0.5, the equi-curves become closer in shape to concentric circles than those in the comparative examples shown in FIGS. 46A, 47A, and 48A, in which the $n_Z$ ratio is 0.0, and hence the symmetry is improved. That is, the azimuth dependence of the color difference $\Delta E^*$, brightness index difference $\Delta L^*$, and chroma difference $\Delta C^*$ characteristics is lower in the cases of the $n_Z$ ratios=0.3 and 0.5 than that in the comparative example in which the $n_Z$ ratio is 0.0.

As described above, the biaxial retardation plate 118 and the uniaxial retardation plate 119 are arranged between the liquid crystal cell 101 and the analyzer 111 in the order named from the liquid crystal cell 101 side, and the biaxial retardation plate 118 is formed such that the refractive indexes in the three directions satisfy inequality (3). With this arrangement, similar to the third embodiment, a wide viewing angle can be set. In addition, not only the visual angle dependence of display colors but also the azimuth dependence of display colors can be reduced.

Fifth Embodiment

In the fifth embodiment, a uniaxial retardation plate and a biaxial retardation plate are respectively arranged on the incident and exit sides of a liquid crystal cell.

Figure 55:
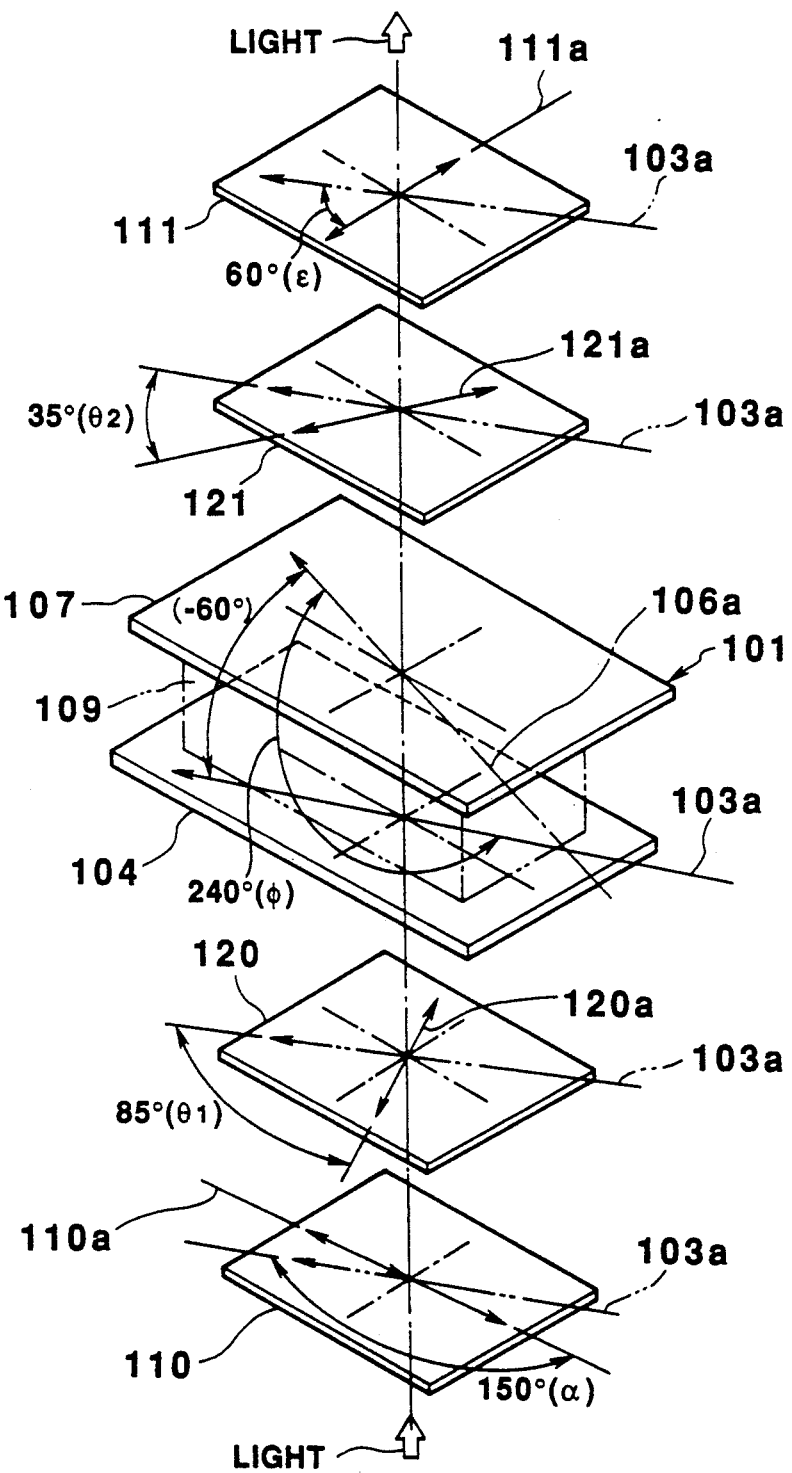
FIG. 55 is an exploded perspective view showing the schematic arrangement of a liquid crystal display device according to a fifth embodiment of the present invention.
Figure 56:
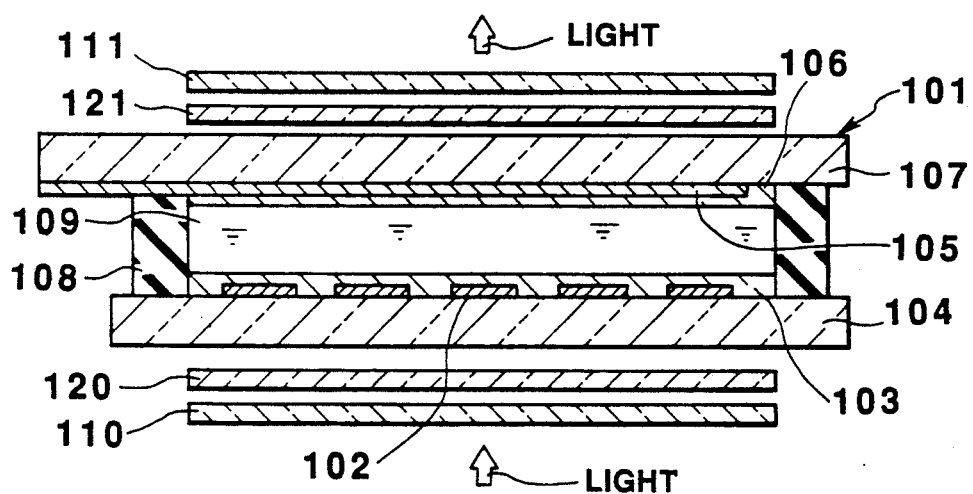
FIG. 56 is a sectional view showing the liquid crystal display device according to the fifth embodiment.
Figure 57A:
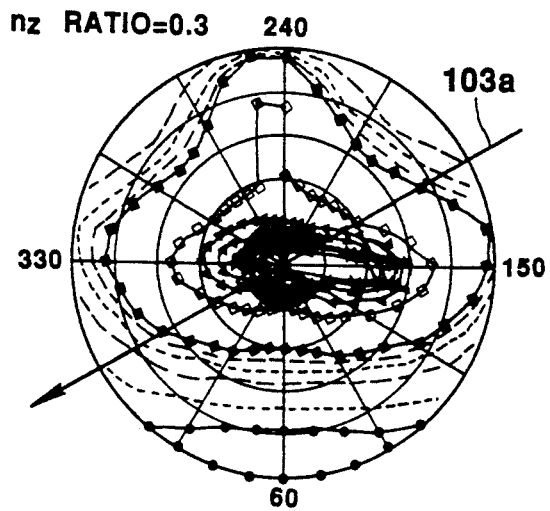
FIGS. 57A, 57B, 57C, and 57D are equi-contrast curve charts for four different values of the $n_Z$ ratio in the liquid crystal display device of the fifth embodiment.
Figure 57B:
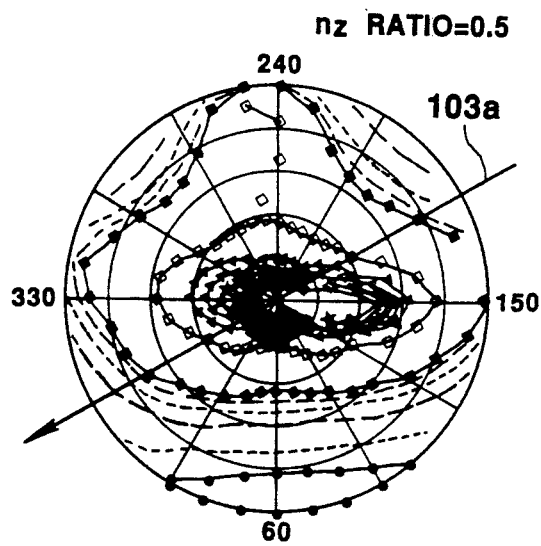
Figure 57C:
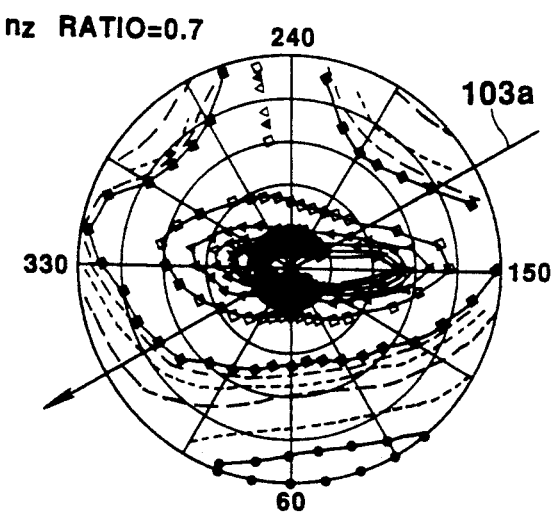
Figure 57D:
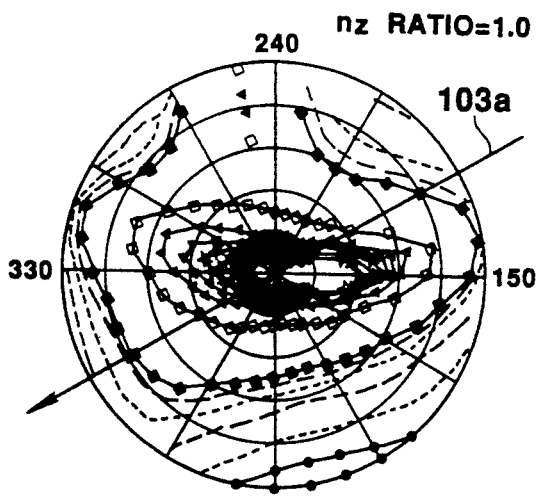

FIGS. 55 and 56 are an exploded perspective view and a sectional view, respectively, of a liquid crystal display device of the fifth embodiment.

A polarizer 110 constituted by a linearly polarizing plate is arranged on the incident side of the liquid crystal cell 101 having the same arrangement as that of the first embodiment, and an analyzer 111 constituted by a linearly polarizing plate is arranged on the exit side of the liquid crystal cell 101. A uniaxial retardation plate 120 is arranged between the liquid crystal cell 101 and the polarizer 110, whereas a biaxial retardation plate 121 is arranged between the liquid crystal cell 101 and the analyzer 111. Both the retardation plates 120 and 121 are composed of polycarbonate.

The polarizer 110 is arranged such that its light-transmitting axis 110a is inclined at about 150° ($\alpha$) with respect to an incident-side aligning treatment direction 103a. The analyzer 111 is arranged such that its light-transmitting axis 111a is inclined at about 60° with respect to the incident-side aligning treatment direction 103a. Therefore, the transmission axis 111a of the analyzer 111 is set at an angle of −90° with respect to the transmission axis 110a of the polarizer 110.

The uniaxial retardation plate 120 is formed such that a refractive index $n_X$ in the extending direction, a refractive index $n_Y$ in the direction perpendicular to the extending direction, and a refractive index $n_Z$ in the direction of thickness satisfy inequality (2). The uniaxial retardation plate 120 is arranged such that its phase delay axis 120a is inclined at about 85° ($\theta_1$) with respect to the incident-side aligning treatment direction 103a.

The biaxial retardation plate 121 is formed to satisfy $$n_Y + 0.3 \cdot \Delta n \leq n_Z \leq n_Y + 0.7 \cdot \Delta n \quad (4)$$

Inequality (4) can be expressed by using the $n_Z$ ratio as follows:

$$0.3 \leq n_Z \text{ ratio} \leq 0.7 \quad (5)$$

The biaxial retardation plate 121 is arranged such that its phase delay axis 121a is inclined at about 35° ($\theta_2$) with respect to the incident-side aligning treatment direction 103a.

Note that the extending directions of the phase plates 120 and 121 respectively coincide with the phase delay axes 120a and 121a. A product $\Delta n \cdot d$ of a refractive index anisotropy $\Delta n$ ($= n_X - n_Y$) and a thickness d of each of the retardation plates 120 and 121 preferably falls within the range of 350 to 370 nm (measurement wavelength: 589 nm).

In the liquid crystal display device having the above-described arrangement, the difference in phase difference between light obliquely transmitted through the liquid crystal cell 101 and light vertically transmitted therethrough is almost completely corrected by the uniaxial retardation plate 120 and the biaxial phase plate 121 respectively arranged on the incident and exit sides of the liquid crystal cell 101. As a result, the viewing angle is increased, and the visual angle dependence of display colors is reduced, thus greatly improving the visual angle characteristics, as will be described below.

FIGS. 57A to 57D are equi-contrast curve charts respectively obtained when the biaxial retardation plate 121 in the liquid crystal display device shown in FIG. 56 is sequentially replaced with four types of biaxial retardation plates having four different $n_Z$ ratios, i.e., 0.3, 0.5, 0.7, and 1.0. In each chart, each black circle (●) represents that the contrast is less than 1, i.e., brightness/darkness inversion occurs. Similarly, each black square (■) represents that the contrast is 10; each white square (□) 50; each black triangle (▲), 100; each white triangle (△), 150; each black star (★), 200; each white star (☆), 250; each plus (+), 300; each cross (×), 350; and each asterisk (*), 400.

Figure 58A:
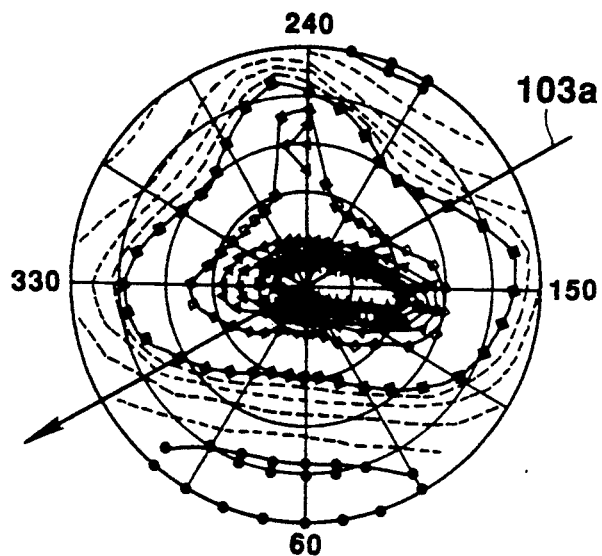
FIGS. 58A and 58B are an equi-contrast curve chart and an equi-Y curve chart in a comparative example of the fifth embodiment.

In the cases wherein the $n_Z$ ratios are set to be 0.3, 0.5, and 0.7 to satisfy inequality (5), the regions where the contrast is 10 or 50 or more are larger than those in the comparative example shown in FIG. 58A in which the $n_Z$ ratio is 0.0. Even if the $n_Z$ ratio is 1.0 and falls outside the range defined by inequality (5), the region where the contrast is 10 or more remains almost the same.

FIGS. 59A to 59D are equi-Y curve charts respectively representing transmittances (Y) in an OFF state for four different values of the $n_Z$ ratio. These charts respectively indicate states of light leakage in an OFF state. In each chart, each black square (■) represents a transmittance of 10%; each white square (□), a transmittance of 20%; each black triangle (▲), a transmittance of 30%; each white triangle (△), a transmittance of 40%; and each black star (★), a transmittance of 50%. Although light leakage regions appear at lower positions, it is clear that each light leakage region is smaller than that in the comparative example shown in FIG. 58B. In addition, as the $n_Z$ ratio increases from 0.3 to 0.5 and 0.7, the light leakage region is reduced.

FIGS. 60A to 62D respectively show the color difference ΔE*, brightness index difference ΔL*, and chroma difference ΔC* characteristics of the liquid crystal display device of the fifth embodiment. In each chart, each black square (■) represents a characteristic value of 10; each white square (□), a characteristic value of 20; each black triangle (▲), a characteristic value of 30; each white triangle (△), a characteristic value of 40; each black star (★), a characteristic value of 50; each white star (☆), a characteristic value of 60; each plus (+), a characteristic value of 70; and each cross (×), a characteristic value of 80.

FIGS. 60A to 60D, 61A to 61D, and 62A to 62D are equi-ΔE* curve charts, equi-ΔL* curve charts, and equi-ΔC* curve charts, respectively, for four different $n_Z$ ratios, i.e., 0.3, 0.5, 0.7, and 1.0. According to the respective charts, in either one of the three types of characteristics, when the $n_Z$ ratio falls within the range defined by inequality (5), i.e., 0.3, 0.5, and 0.7 in the region where the visual angle is 30° or less, the equi-curves become closer in shape to concentric circles than those in the comparative example in which the $n_Z$ ratio is 0.0. That is, the azimuth dependence of the color difference ΔE*, brightness index difference ΔL*, and chroma difference ΔC* characteristics is lower in the cases of the $n_Z$ ratios=0.3 and 0.7 than that in the comparative example. The direction dependency of these three characteristics starts increasing when $n_Z$ ratio becomes 1.0.

As described above, as shown in FIG. 55, the uniaxial retardation plate 120 and the biaxial retardation plate 121 are respectively arranged between the polarizer 110 and the liquid crystal cell 101 and between the liquid crystal cell 101 and the analyzer 111 to sandwich the liquid crystal cell 101, and the biaxial retardation plate 121 is formed such that the refractive indexes in the three directions satisfy inequality (4). With this arrangement, a large viewing angle can be set. In addition, not only the visual angle dependence of display colors but also the azimuth dependence of display colors can be reduced.

Sixth Embodiment

Figure 64:
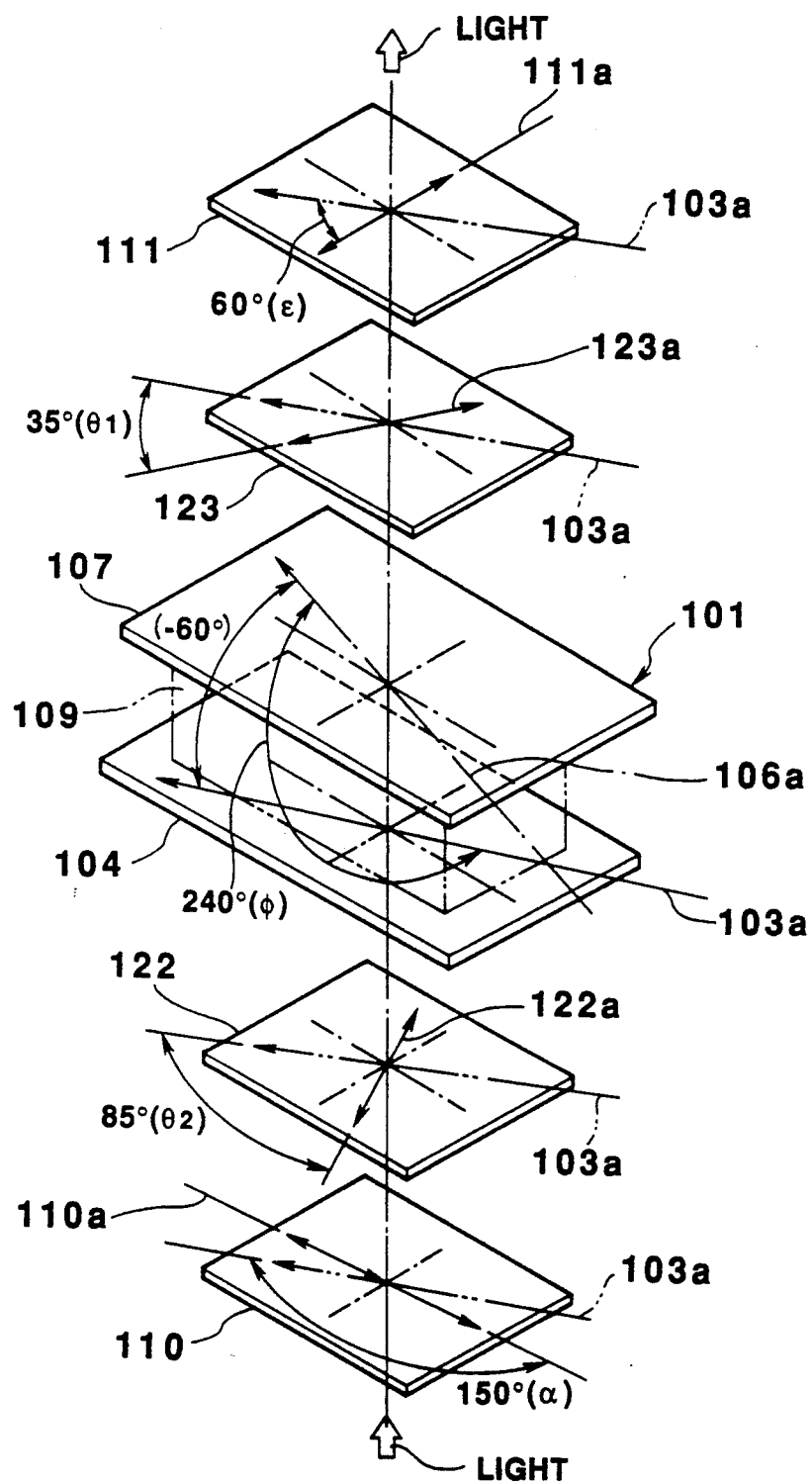
FIG. 64 is an exploded perspective view showing the schematic arrangement of a liquid crystal display device according to a sixth embodiment of the present invention.
Figure 65A:
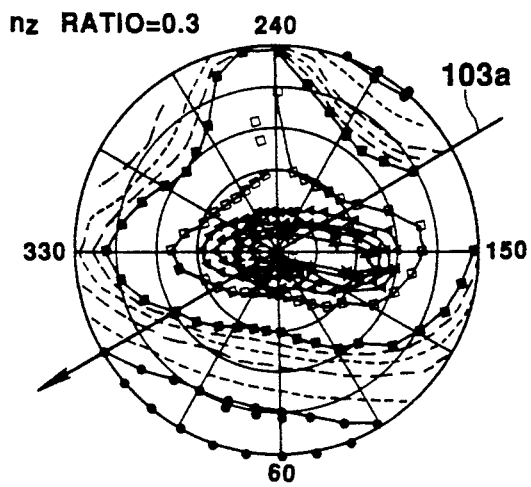
FIGS. 65A, 65B, 65C, and 65D are equi-contrast curve charts for four different values of the $n_Z$ ratio in the liquid crystal display device of the sixth embodiment.
Figure 65B:
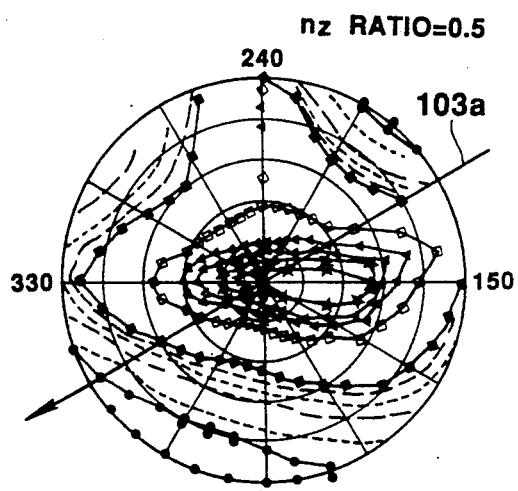
Figure 65C:
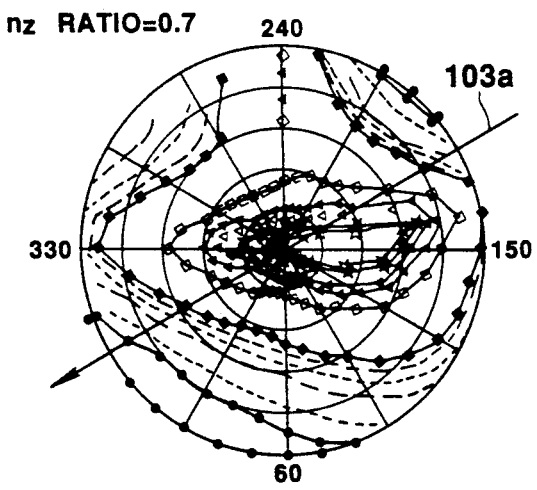
Figure 65D:
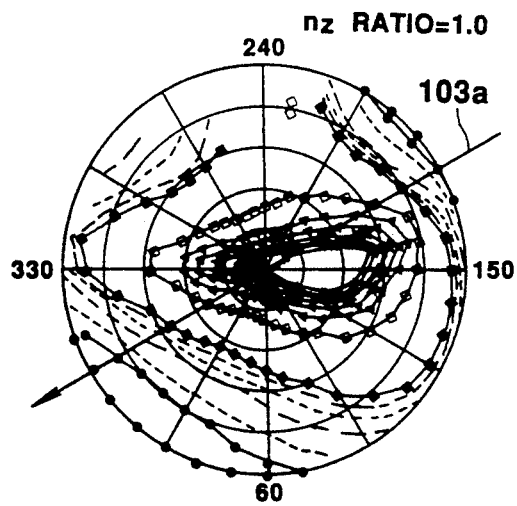
Figure 66A:
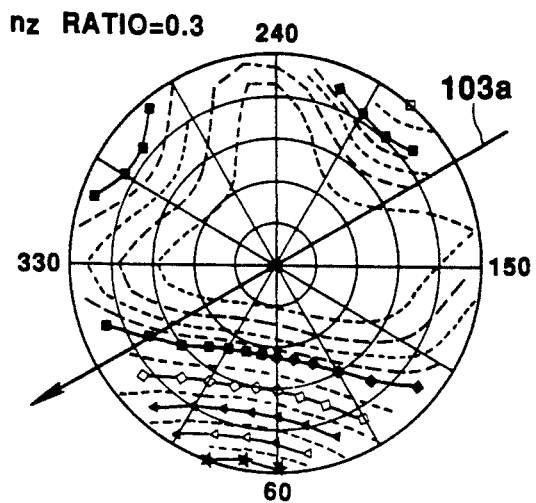
FIGS. 66A, 66B, 66C, and 66D are equi-Y curve charts for the four different values of the $n_Z$ ratio in the liquid crystal display device of the sixth embodiment.
Figure 66B:
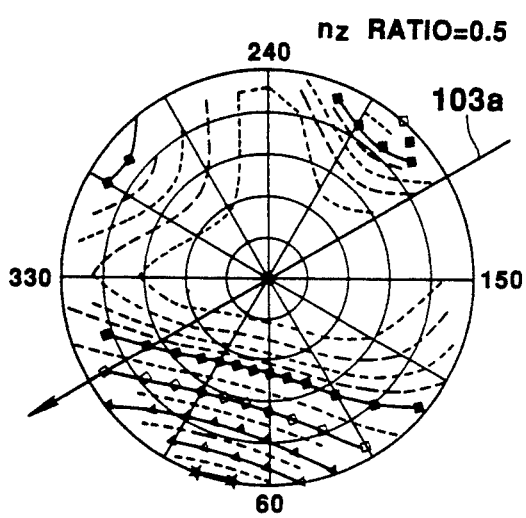
Figure 66C:
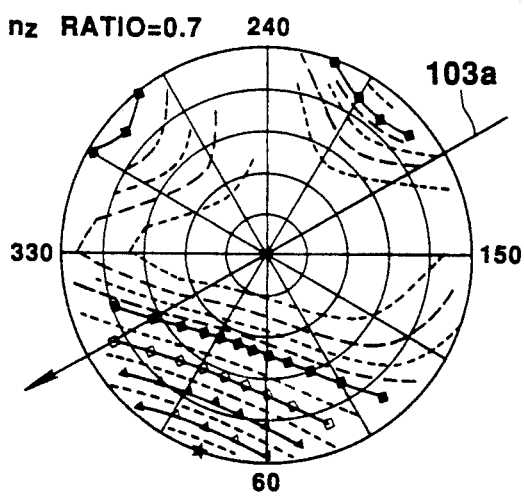
Figure 66D:
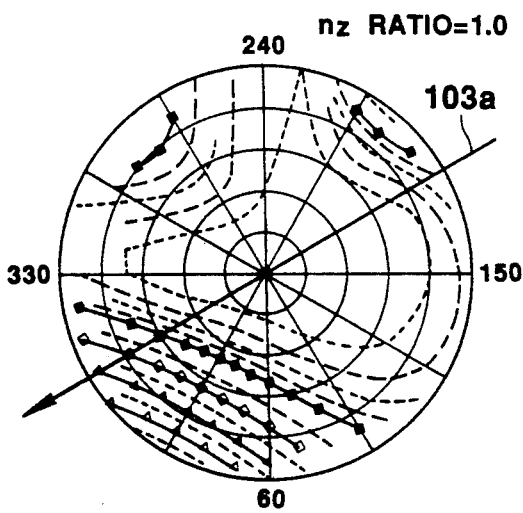
Figure 67A:
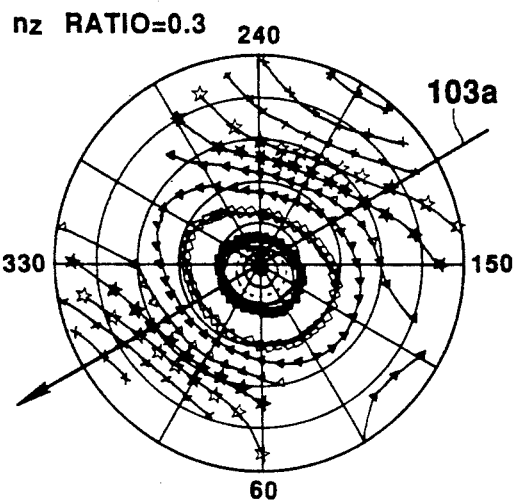
FIGS. 67A, 67B, 67C, and 67D are equi-ΔE* curve charts for the four different values of the $n_Z$ ratio in the liquid crystal display device of the sixth embodiment.
Figure 67B:
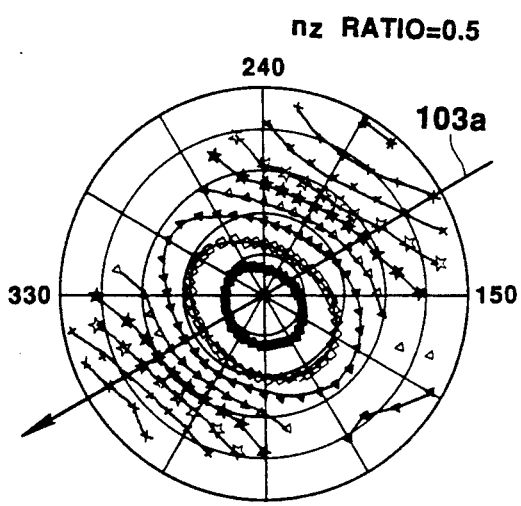
Figure 67C:
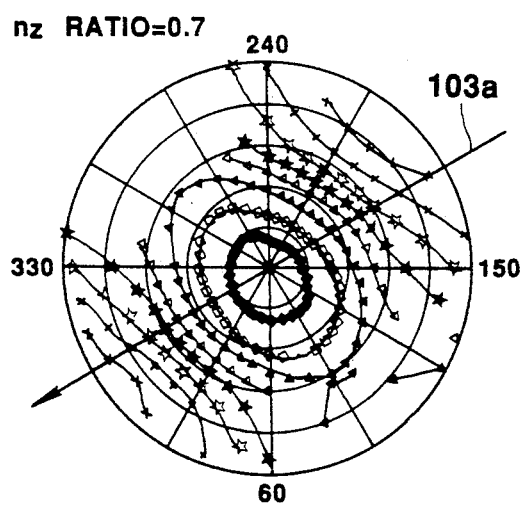
Figure 67D:
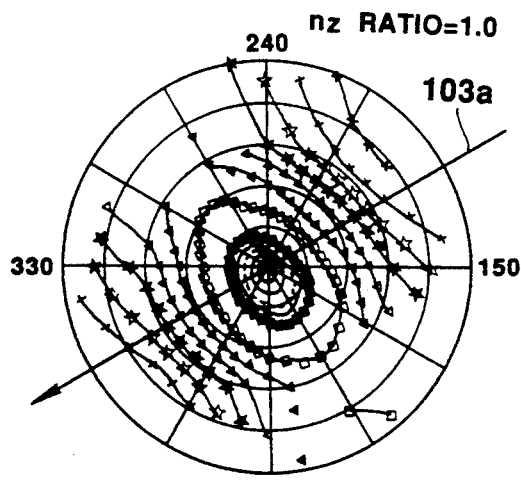
Figure 68A:
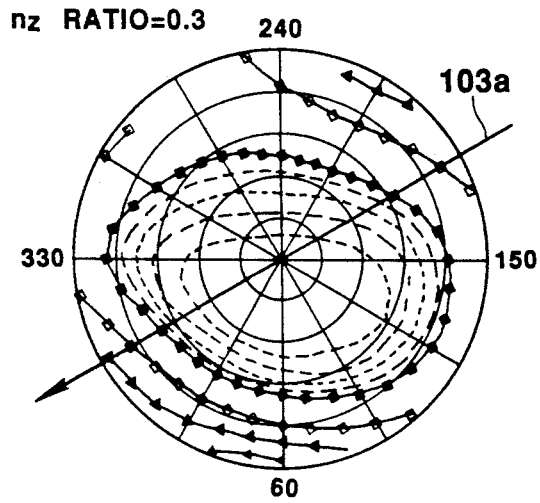
FIGS. 68A, 68B, 68C, and 68D are equi-ΔL* curve charts for the four different values of the $n_Z$ ratio in the liquid crystal display device of the sixth embodiment.
Figure 68B:
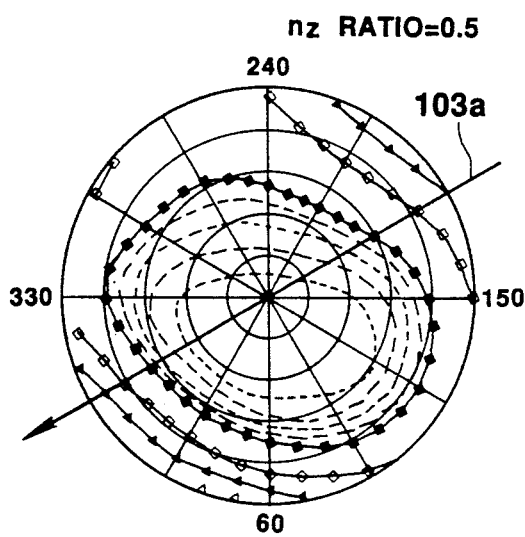
Figure 68C:
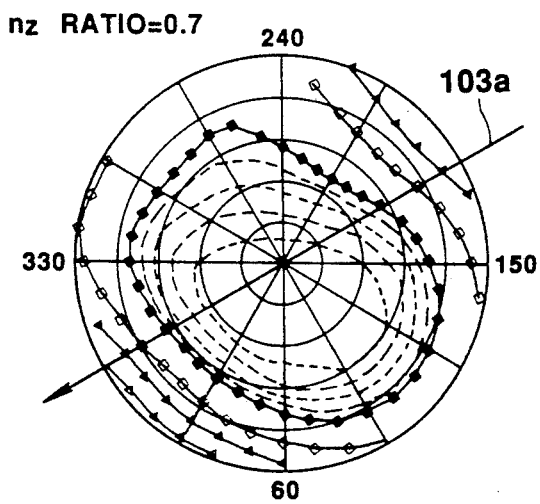
Figure 68D:
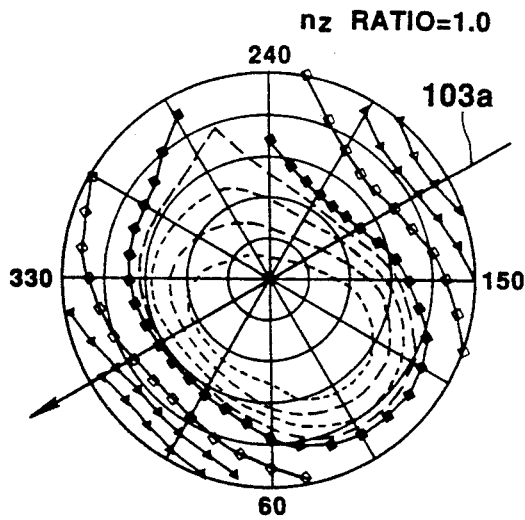

In the sixth embodiment, as shown in FIG. 64, a biaxial retardation plate 122 is arranged between a liquid crystal cell 101 and a polarizer 110, and a uniaxial retardation plate 123 is arranged between the liquid crystal cell 101 and the analyzer 111. That is, in contrast to the fifth embodiment, the biaxial retardation plate 122 and the uniaxial retardation plate 123 are respectively arranged on the incident side and the exit side to sandwich the liquid crystal cell 101. In this case, the biaxial retardation plate 122 is arranged such that its phase delay axis 122a is inclined at about 85° ($\theta_2$) with respect to an incident-side aligning treatment direction 103a, while the uniaxial retardation plate 123a is arranged such that its phase delay axis 123a is inclined at about 35° ($\theta_1$) with respect to the incident-side aligning treatment direction 103a. The biaxial retardation plate 122 in the sixth embodiment is also formed such that the refractive indexes $n_X$, $n_Y$, and $n_Z$ in the three directions satisfy inequality (4). Other arrangements are the same as those in the fifth embodiment.

FIG. 65A to 65D are equi-contrast curve charts obtained when the biaxial retardation plate 122 of the liquid crystal display device of the sixth embodiment is replaced with four types of biaxial retardation plates having four different $n_Z$ ratios, i.e., 0.3, 0.5, 0.7, and 1.0. In each chart, each black circle (●) represents that the contrast is less than 1, i.e., brightness/darkness inversion occurs. Similarly, each black square (■) represents that the contrast is 10; each white square (□), 50; each black triangle (▲), 100; each white triangle (△), 150; each black star (★), 200; each white star (☆), 250; each plus (+), 300; each cross (×), 350; and each asterisk (*), 400.

In the cases wherein the $n_Z$ ratios are set to be 0.3, 0.5, and 0.7 in the range defined by inequality (5), each region where the contrast is 10 or more is larger than that in the comparative example shown in FIG. 58A in which the $n_Z$ ratio is 0.0, and the inversion region is slightly reduced.

Figure 58B:
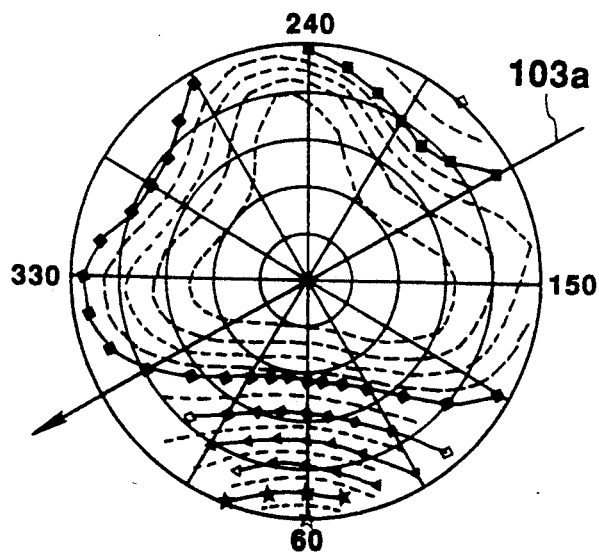
Figure 59A:
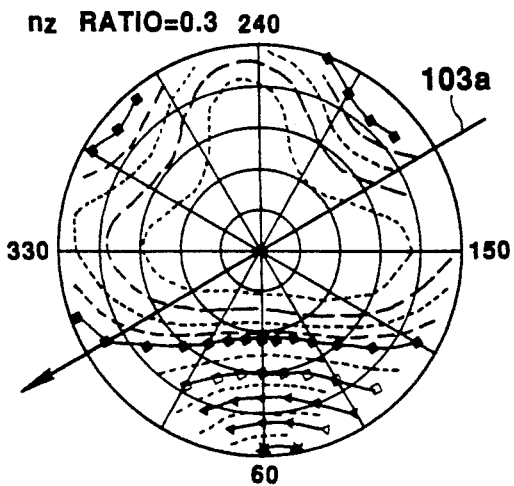
FIGS. 59A, 59B, 59C, and 59D are equi-Y curve charts for the four different values of the $n_Z$ ratio in the liquid crystal display device of the fifth embodiment.
Figure 59B:
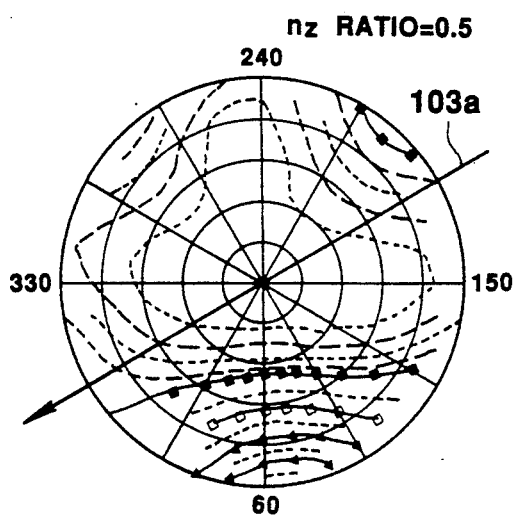
Figure 59C:
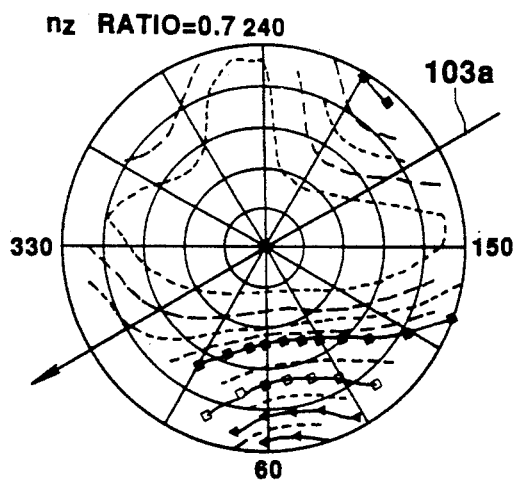
Figure 59D:
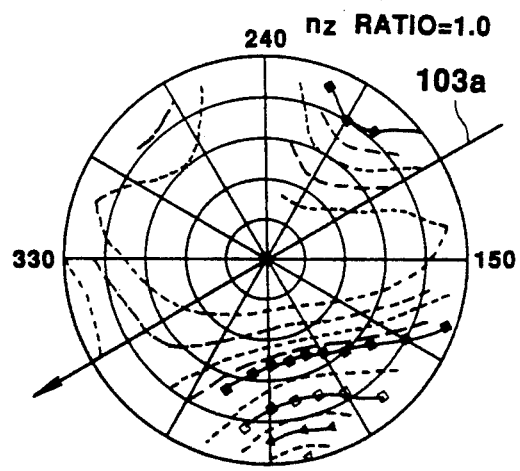
Figure 60A:
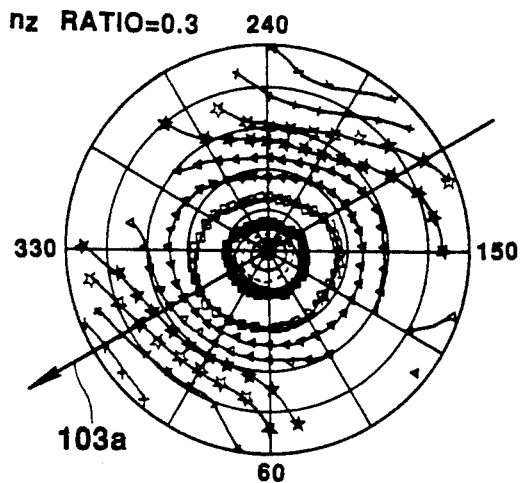
FIGS. 60A, 60B, 60C, and 60D are equi-ΔE* curve charts for the four different values of the $n_Z$ ratio in the liquid crystal display device of the fifth embodiment.
Figure 60B:
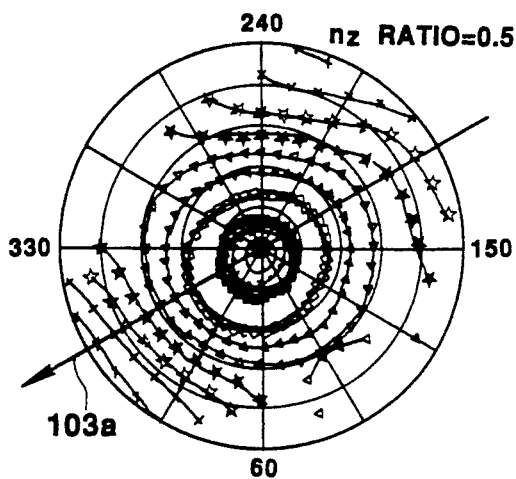
Figure 60C:
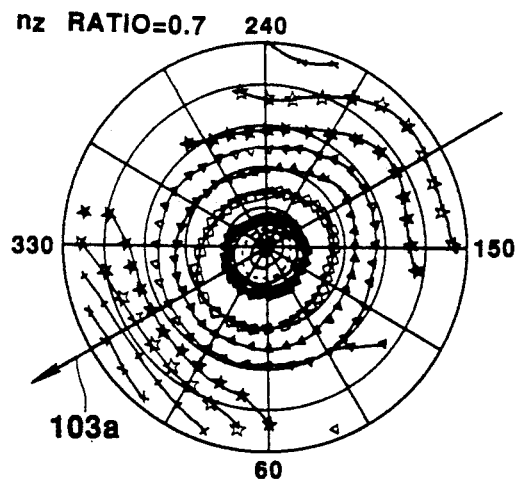
Figure 60D:
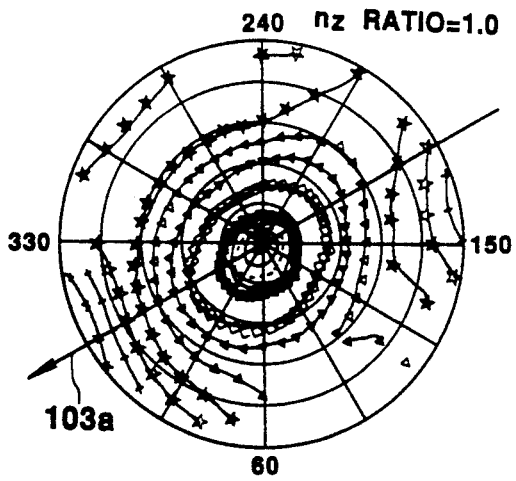
Figure 61A:
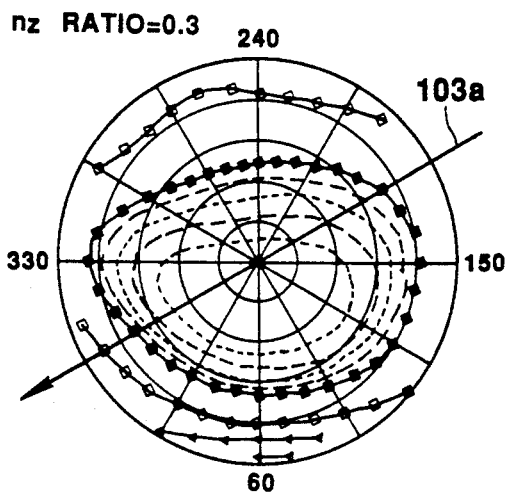
FIGS. 61A, 61B, 61C, and 61D are equi-ΔL* curve charts for the four different values of the $n_Z$ ratio in the liquid crystal display device of the fifth embodiment.
Figure 61B:
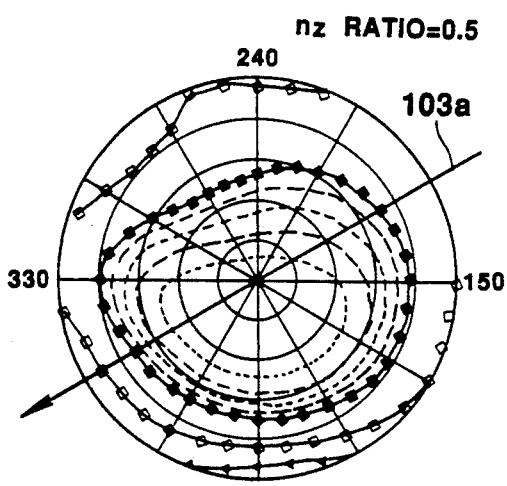
Figure 61C:
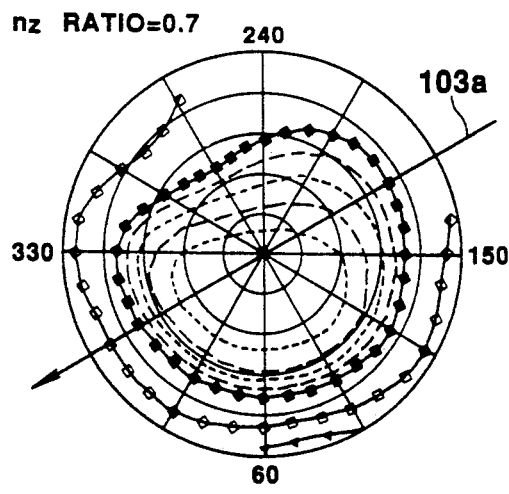
Figure 61D:
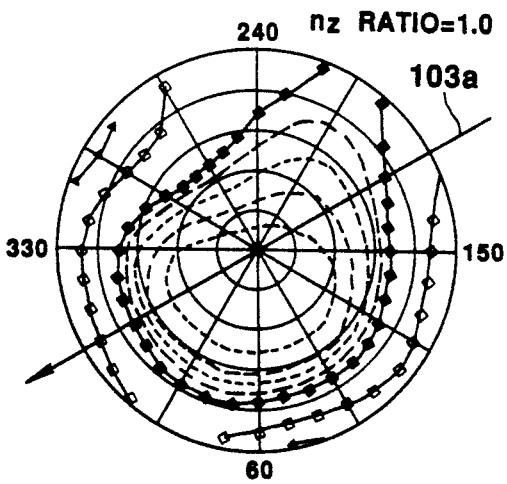
Figure 62A:
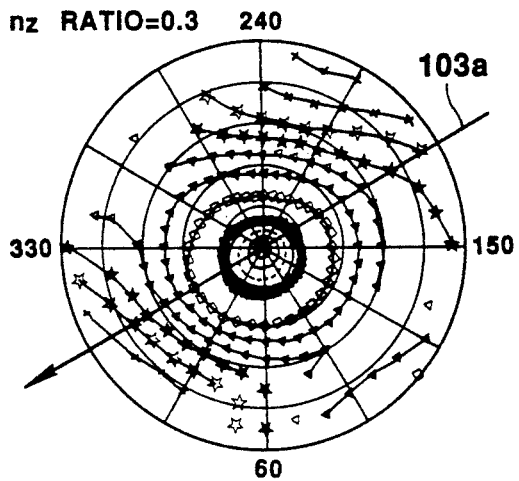
FIGS. 62A, 62B, 62C, and 62D are equi-ΔC* curve charts for the four different values of the $n_Z$ ratio in the liquid crystal display device of the fifth embodiment.
Figure 62B:
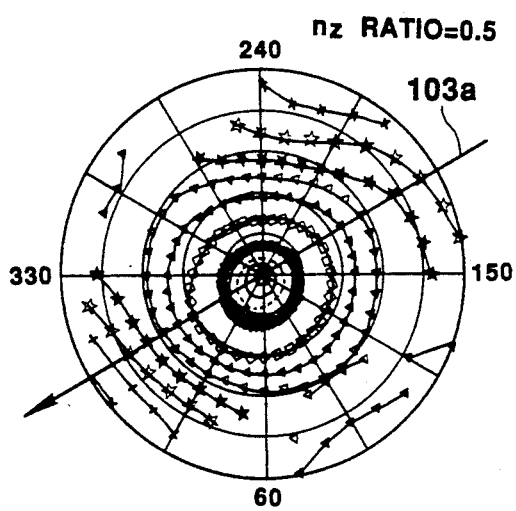
Figure 62C:
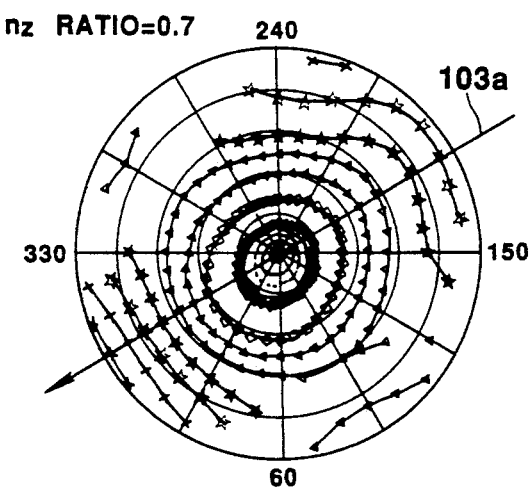
Figure 62D:
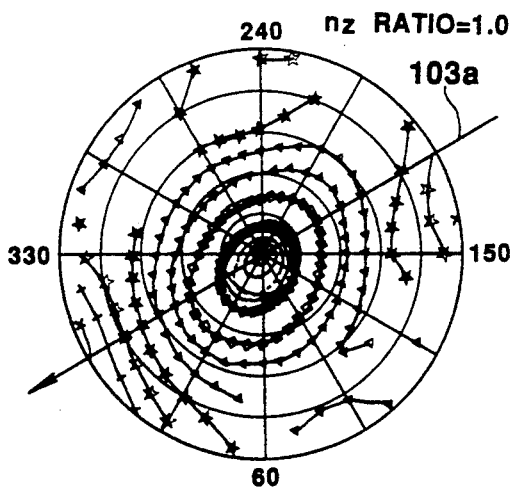

With regard to the light leakage characteristics in an OFF state, as indicated by the equi-Y curve charts of FIGS. 66A to 66D, each of the light leakage regions in the cases wherein the $n_Z$ ratios are 0.3, 0.5, and 0.7 is smaller than that in the comparative example shown in FIG. 58B. When the $n_Z$ ratio becomes 1.0, the light leakage region tends to expand. In each chart, each black square (■) represents a transmittance of 10%; each white square (□), a transmittance of 20%; each black triangle (▲), a transmittance of 30%; each white triangle (△), a transmittance of 40%; and each black star (★), a transmittance of 50%.

FIGS. 67A to 69D respectively show the color difference $\Delta E^*$, brightness index difference $\Delta L^*$, and chroma difference $\Delta C^*$ characteristics of the liquid crystal display device of the sixth embodiment. FIGS. 67A to 67D, 68A to 68D, and 69A to 69D are equi-$\Delta E^*$ curve charts, equi-$\Delta L^*$ curve charts, and equi-$\Delta C^*$ curve charts, respectively, obtained when the biaxial retardation plate is replaced with four types of biaxial retardation plates having four different $n_Z$ ratios, i.e., 0.3, 0.5, 0.7, and 1.0. In each chart, each black square (■) represents a characteristic value of 10; each white square (□), a characteristic value of 20; each black triangle (▲), a characteristic value of 30; each white triangle (△), a characteristic value of 40; each black star (★), a characteristic value of 50; each white star (☆), a characteristic value of 60; each plus (+), a characteristic value of 70; each cross (×), a characteristic value of 80; and each asterisk (*), a characteristic value of 90.

Figure 63A:
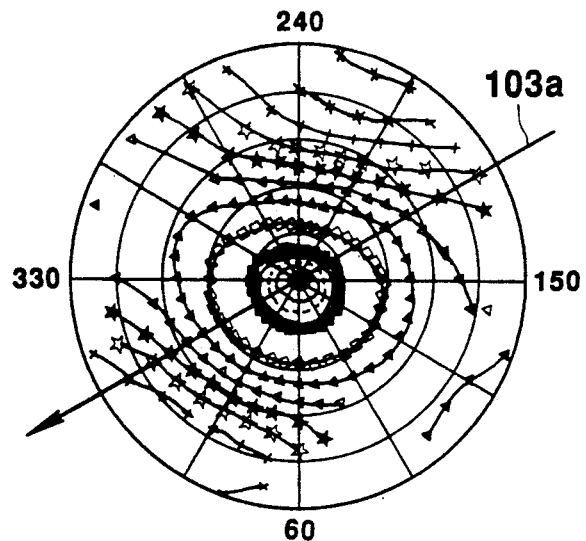
FIGS. 63A, 63B, and 63C are equi-ΔE*, equi-ΔL*, and equi-ΔC* curve charts in the comparative example of the fifth embodiment.
Figure 63B:
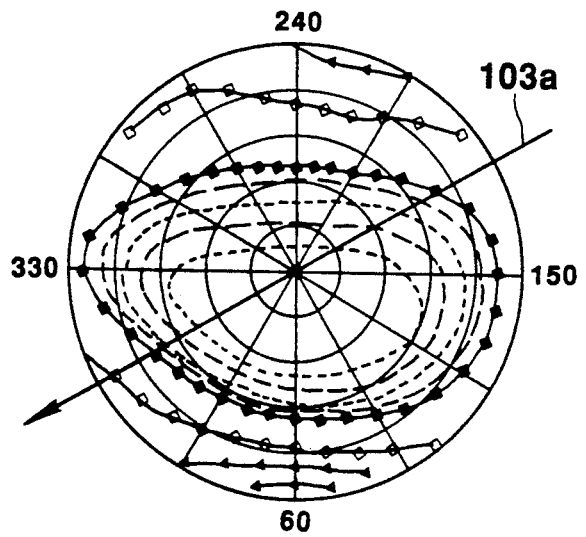
Figure 63C:
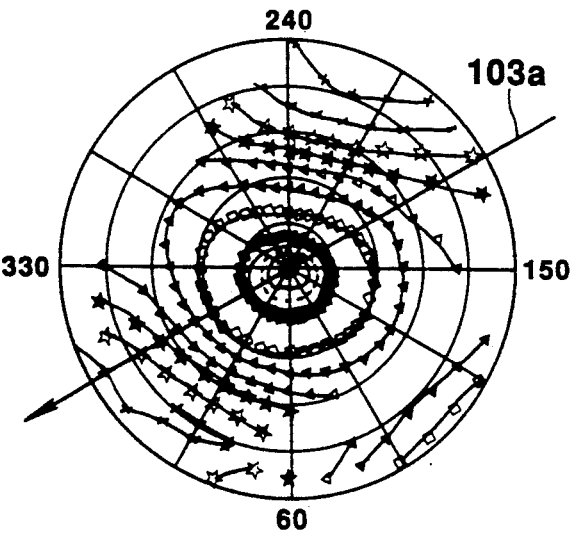

According to the respective charts, in either one of the three types of characteristics, when the $n_Z$ ratios are set to be 0.3, 0.5, and 0.7, the equi-curves become closer in shape to concentric circles than those in the comparative examples shown in FIGS. 63A to 63C in which the $n_Z$ ratio is 0.0, and hence an improvement in symmetry is achieved. That is, when the $n_Z$ ratios are 0.3, 0.5, and 0.7, the azimuth dependence of the color difference $\Delta E^*$, brightness index difference $\Delta L^*$, and chroma difference $\Delta C^*$ characteristics is lower than that in the comparative example.

As described above, the biaxial retardation plate 122 and the uniaxial retardation plate 123 are respectively arranged between the liquid crystal cell 101 and the polarizer 110 and between the liquid crystal cell 101 and the analyzer 111, and the biaxial retardation plate 122 is formed such that the refractive indexes in the three directions satisfy inequality (4). With this arrangement, similar to the first embodiment, a large viewing angle can be set. In addition, not only the visual angle dependence of display colors but also the azimuth dependence of display colors can be reduced.

Note that the present invention is not limited to the above-described preferred embodiments, and that various modifications can be made within the technical range of the invention.

For example, the angles at which the uniaxial phase plate, the biaxial retardation plate, the polarizer, the analyzer, and the like are arranged are not limited those in the above embodiments, but other appropriate combinations of such angles may be employed.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A liquid crystal display device comprising:
   a pair of substrates having opposing surfaces on which crossing electrodes and aligning films covering said electrodes are formed, said aligning films having undergone aligning treatment in a predetermined direction;
   a liquid crystal material existing between said aligning films and having molecules twisted at an angle falling within a range of 230° to 250° from one substrate to the other substrate of said pair of substrates;
   a pair of polarizing plates arranged outside said pair of substrates to sandwich said substrates; and
   a plurality of retardation plates including at least one biaxial retardation plate arranged between said polarizing plates and having a refractive index $n_X$ in an extending direction of said retardation plate, a refractive index $n_Y$ in a direction perpendicular to the extending direction, and a refractive index $n_Z$ in a direction of thickness, which satisfy $n_Y < n_Z < n_X$, the directions being perpendicular to each other.

2. A liquid crystal display device according to claim 1, wherein said plurality of retardation plates are two biaxial retardation plates.

3. A liquid crystal display device according to claim 2, wherein said two biaxial retardation plates are arranged between one of said polarizing plates and said one substrate which opposes said polarizing plate.

4. A liquid crystal display device according to claim 3, wherein each of said biaxial retardation plates has refractive indexes $n_X$, $n_Y$, and $n_Z$ in three directions which satisfy $n_Y < n_Z \leq n_Y + 0.3 \cdot \Delta n$ where $\Delta n$ is a refractive index anisotropy defined by $n_X - n_Y$.

5. A liquid crystal display device according to claim 4, wherein said liquid crystal material has a refractive index anisotropy $\Delta n_c$ and a thickness $d_c$, a product $\Delta n_c \cdot d_c$ of which falls within a range of 800 to 910 nm, and each of said biaxial retardation plates has a refractive index anisotropy $\Delta n$ and a thickness $d$, a product $\Delta n \cdot d$ of which falls within a range of 350 to 420 nm.

6. A liquid crystal display device according to claim 2, wherein one of said biaxial retardation plates is arranged between one of said polarizing plates and said one substrate which opposes said polarizing plate, and said other biaxial retardation plate is arranged between the other polarizing plate of said polarizing plates and said other substrate which opposes said other polarizing plate.

7. Liquid crystal display device according to claim 6, wherein each of said biaxial retardation plates has refractive indexes $n_X$, $n_Y$, and $n_Z$ in three directions which satisfy $n_Y + 0.3 \cdot \Delta n \leq n_Z \leq n_Y + 0.7 \cdot \Delta n$ where $\Delta n$ is a refractive index anisotropy defined by $n_X - n_Y$.

8. A liquid crystal display device according to claim 7, wherein said liquid crystal material has a refractive index anisotropy $\Delta n_c$ and a thickness $d_c$, a product $\Delta n_c \cdot d_c$ of which falls within a range of 800 to 910 nm, and each of said biaxial retardation plates has a refractive index anisotropy $\Delta n$ and a thickness $d$, a product $\Delta n \cdot d$ of which falls within a range of 340 to 450 nm.

9. A liquid crystal display device according to claim 2, wherein said plurality of retardation plates are two biaxial retardation plates, said liquid crystal material has a refractive index anisotropy $\Delta n_c$ and a thickness $d_c$, a product $\Delta n_c \cdot d_c$ of which falls within a range of 800 to 910 nm, and each of said biaxial retardation plates has a refractive index anisotropy $\Delta n$ and a thickness $d$, a product $\Delta n \cdot d$ of which falls within a range of 340 to 450 nm.

10. A liquid crystal display device according to claim 1, wherein said plurality of retardation plates comprise a uniaxial retardation plate having refractive indexes $n_X$, $n_Y$, and $n_Z$ in three orthogonal directions as an extending direction of said retardation plate, a direction perpendicular to the extending direction, and a direction of thickness, which indexes satisfy $n_Y = n_Z < n_X$, and said one biaxial retardation plate.

11. A liquid crystal display device according to claim 10, wherein said uniaxial retardation plate and said biaxial retardation plate are arranged between one of said pair of polarizing plates and said one substrate which opposes said polarizing plate.

12. A liquid crystal display device according to claim 11, wherein said biaxial retardation plate has refractive indexes $n_X$, $n_Y$, and $n_Z$ in three directions which satisfy $n_X < n_Z \leq n_Y + 0.5 \cdot \Delta n$ where $\Delta n$ is a refractive index anisotropy defined by $n_X - n_Y$.

13. A liquid crystal display device according to claim 12, wherein said biaxial retardation plate is arranged between said uniaxial retardation plate and said one polarizing plate.

14. A liquid crystal display device according to claim 12, wherein said biaxial retardation plate is arranged between said uniaxial retardation plate and said one substrate.

15. A liquid crystal display device according to claim 10, wherein said uniaxial retardation plate is arranged between one of said pair of polarizing plates and said one substrate which opposes said one polarizing plate, and said biaxial retardation plate is arranged between the other polarizing plate of said pair of polarizing plates and said other substrate which opposes said other polarizing plate.

16. A liquid crystal display device according to claim 15, wherein said biaxial retardation plate has refractive indexes $n_X$, $n_Y$, and $n_Z$ in three directions which satisfy $n_Y + 0.3 \cdot \Delta n \leq n_Z \leq n_Y + 0.7 \cdot \Delta n$ where $\Delta n$ is a refractive index anisotropy defined by $n_X - n_Y$.

17. A liquid crystal display device according to claim 16, wherein said biaxial retardation plate is arranged between a polarizing plate and a substrate which are located on a side from which light emerges.

18. A liquid crystal display device according to claim 16, wherein said biaxial retardation plate is arranged between a polarizing plate and a substrate which are located on a side on which light is incident.

* * * * *